US 012409846B2

(12) United States Patent
Yamamoto et al.

(10) Patent No.: US 12,409,846 B2
(45) Date of Patent: Sep. 9, 2025

(54) DRIVING CONTROL DEVICE AND HMI CONTROL DEVICE

(71) Applicant: DENSO CORPORATION, Kariya (JP)

(72) Inventors: Takeshi Yamamoto, Kariya (JP); Asako Nagata, Kariya (JP); Shizuka Yokoyama, Kariya (JP); Yuji Ota, Kariya (JP); Takuya Kume, Kariya (JP); Kazuki Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 178 days.

(21) Appl. No.: 17/886,661

(22) Filed: Aug. 12, 2022

(65) Prior Publication Data

US 2023/0037467 A1 Feb. 9, 2023

Related U.S. Application Data

(63) Continuation of application No. PCT/JP2021/001271, filed on Jan. 15, 2021.

(30) Foreign Application Priority Data

Feb. 18, 2020 (JP) .................................. 2020-025305
Dec. 15, 2020 (JP) .................................. 2020-207628

(51) Int. Cl.
B60K 35/00 (2024.01)
B60W 30/14 (2006.01)
(Continued)

(52) U.S. Cl.
CPC ............. *B60W 50/14* (2013.01); *B60K 35/00* (2013.01); *B60W 30/143* (2013.01);
(Continued)

(58) Field of Classification Search
CPC ...... G08G 1/16; B60W 40/04; B60W 30/165; B60W 30/143; B60W 40/09;
(Continued)

(56) References Cited

U.S. PATENT DOCUMENTS

2005/0150701 A1\* 7/2005 Michi .................... B60W 30/17
180/170
2016/0209840 A1\* 7/2016 Kim .................. B60W 60/0059
(Continued)

FOREIGN PATENT DOCUMENTS

JP H11115710 A 4/1999
JP 2005324661 A 11/2005
(Continued)

Primary Examiner — Stephen Holwerda
(74) Attorney, Agent, or Firm — Harness, Dickey & Pierce, P.L.C.

(57) ABSTRACT

An HMI control device, which controls an HMI device mounted on a vehicle. The HMI device presents information to a driver of the vehicle in a recognizable manner. The vehicle is capable of automated driving and travels following a preceding vehicle at a speed equal to or lower than a predetermined speed. The HMI control device is configured to: present attention information for calling attention of the driver when a congestion is determined to be cleared; acquire a behavior of the driver; and end a second task presented on the HMI device at an end timing corresponding to the behavior of the driver acquired after presentation of the attention information.

22 Claims, 33 Drawing Sheets

(51) Int. Cl.
*B60W 30/165* (2020.01)
*B60W 40/04* (2006.01)
*B60W 40/09* (2012.01)
*B60W 50/14* (2020.01)
*B60W 60/00* (2020.01)
*B60K 35/10* (2024.01)
*B60K 35/28* (2024.01)
*B60K 35/29* (2024.01)
*B60K 35/81* (2024.01)

(52) U.S. Cl.
CPC .......... *B60W 30/165* (2013.01); *B60W 40/04* (2013.01); *B60W 40/09* (2013.01); *B60W 60/0053* (2020.02); *B60K 35/10* (2024.01); *B60K 35/28* (2024.01); *B60K 35/285* (2024.01); *B60K 35/29* (2024.01); *B60K 35/81* (2024.01); *B60K 2360/149* (2024.01); *B60K 2360/172* (2024.01); *B60K 2360/1868* (2024.01); *B60K 2360/195* (2024.01); *B60W 2050/146* (2013.01); *B60W 2540/215* (2020.02); *B60W 2540/225* (2020.02); *B60W 2540/229* (2020.02); *B60W 2554/406* (2020.02)

(58) Field of Classification Search
CPC ............ B60W 60/0053; B60W 50/14; B60W 2540/229; B60W 2554/406; B60W 2050/146; B60W 2540/225; B60W 2540/215; B60K 31/00; B60K 35/00; B60K 35/81; B60K 2360/1868; B60K 35/29; B60K 35/285; B60K 35/28; B60K 2360/149; B60K 2360/172; B60K 2360/195; B60K 35/10
See application file for complete search history.

(56) References Cited

U.S. PATENT DOCUMENTS

| | | | |
|---|---|---|---|
| 2017/0203766 A1* | 7/2017 | Prokhorov | B60W 40/09 |
| 2017/0267238 A1* | 9/2017 | Mimura | B60W 50/082 |
| 2017/0371334 A1* | 12/2017 | Nagy | G05D 1/0061 |
| 2020/0307596 A1* | 10/2020 | Yashiro | B60W 30/12 |

FOREIGN PATENT DOCUMENTS

| | | |
|---|---|---|
| JP | 2016164714 A | 9/2016 |
| JP | 2017107502 A | 6/2017 |
| JP | 2017165289 A | 9/2017 |
| JP | 2018037001 A | 3/2018 |
| JP | 2019001350 A | 1/2019 |
| WO | WO-2019176037 A1 | 9/2019 |

* cited by examiner

DRIVING CONTROL DEVICE AND HMI CONTROL DEVICE

CROSS REFERENCE TO RELATED APPLICATIONS

The present application is a continuation application of International Patent Application No. PCT/JP2021/001271 filed on Jan. 15, 2021, which designated the U.S. and claims the benefit of priority from based on Japanese Patent Application No. 2020-025305 filed on Feb. 18, 2020 and Japanese Patent Application No. 2020-207628 filed on Dec. 15, 2020. The entire disclosures of all of the above applications are incorporated herein by reference.

TECHNICAL FIELD

The present disclosure relates to a driving control device that controls drive of a vehicle capable of automated driving, and an HMI control device that controls an HMI device to present information to a driver of the vehicle in a recognizable manner. HMI is abbreviation of human-machine interface.

BACKGROUND

Conventionally, vehicle control that controls a vehicle to perform automated driving while traveling in a congestion section is known.

SUMMARY

The present disclosure provides an HMI control device, which controls an HMI device mounted on a vehicle. The HMI device presents information to a driver of the vehicle in a recognizable manner. The vehicle is capable of automated driving and travels following a preceding vehicle at a speed equal to or lower than a predetermined speed. The HMI control device is configured to: present attention information for calling attention of the driver when a congestion is determined to be cleared; acquire a behavior of the driver; and end a second task presented on the HMI device at an end timing corresponding to the behavior of the driver acquired after presentation of the attention information.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
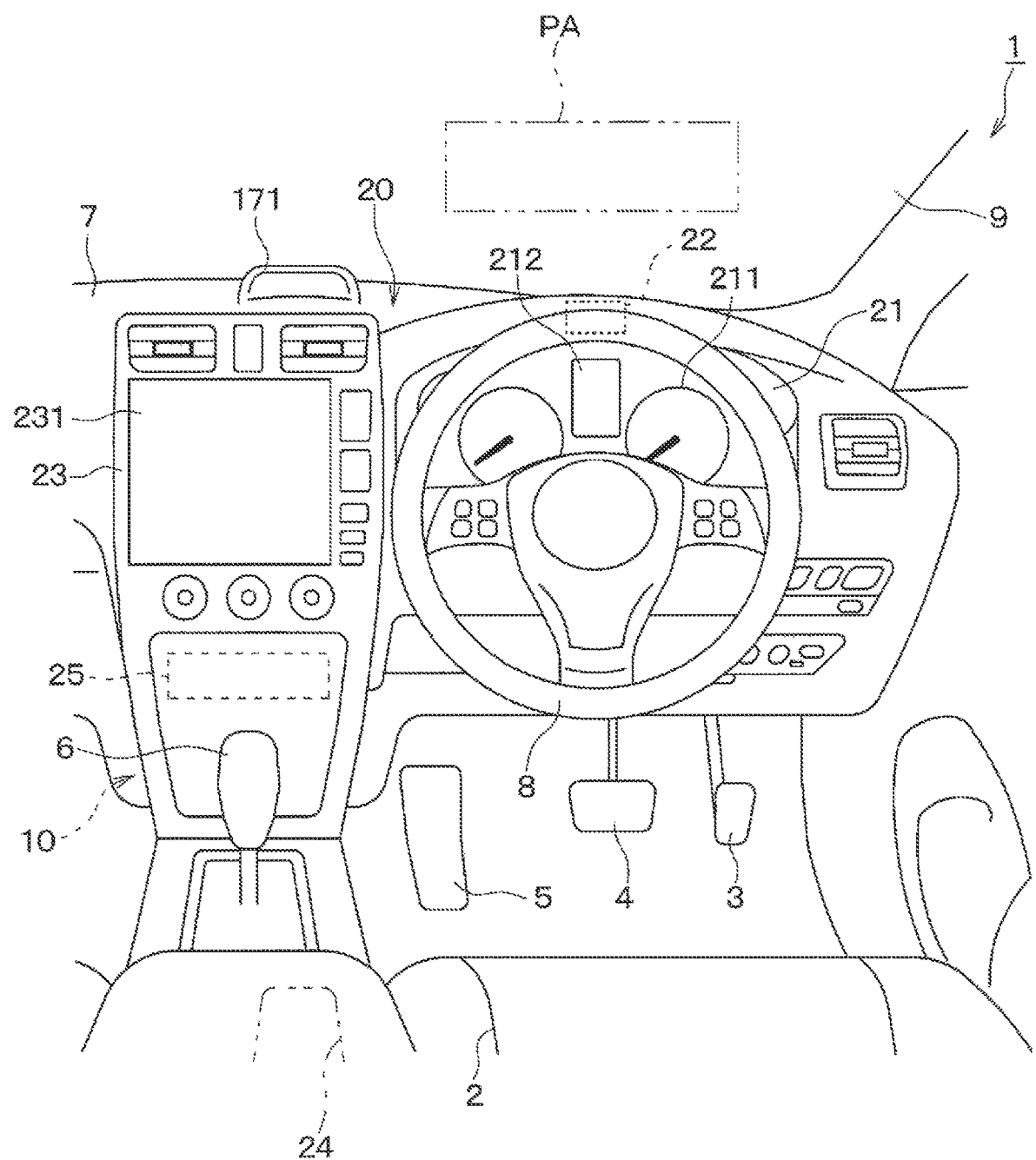
FIG. 1 is a schematic view illustrating an external appearance of an interior of a vehicle mounted with an in-vehicle system including a driving control device and an HMI control device according to an embodiment.

Before describing embodiments of the present disclosure, known vehicle driving control will be described. A vehicle control which controls a vehicle to perform automated driving while traveling in a congestion section is conventionally known. For example, the known vehicle control device includes a congestion determination unit, an automated driving start determination unit, and an automated driving stop determination unit. The congestion determination unit determines an occurrence of congestion. The automated driving start determination unit starts the automated driving if the length of a section with the congestion is equal to or greater than a predetermined value when congestion is occurred. The automated driving stop determination unit stops the automated driving when an automated driving stop condition is satisfied after the automated driving is started.

During automated driving, the driver, who is a passenger in a driver's seat in a vehicle, can freely execute a second task. The second task is a task other than the driving operation executed by the driver. Specifically, the second task includes, for example, viewing of video content and operation of a portable or wearable terminal device carried in the vehicle. The "video content" is, for example, movies, concert videos, music video, television broadcasts, and the like. The second task is also referred to as "task other than driving" or "secondary activity". Note that video content viewing can also be performed by the above-described terminal device.

When the automated driving ends due to congestion clearing, it sometimes becomes necessary to transfer the authority to the driver regarding vehicle motion control and/or driving environment monitoring. In this case, it is required to end the second task during automated driving and smoothly transfer the authority while not offering the driver an uneasy feeling or an uncomfortable feeling as much as possible. It is required not to offer the driver an uneasy feeling or an uncomfortable feeling as much as possible by the vehicle behavior (for example, acceleration) when automated driving ends due to congestion clearing to transition to another driving control mode.

According to one aspect of the present disclosure, an HMI control device that controls an HMI device is provided. The HMI device presents information to a driver of a vehicle in a recognizable manner, and the vehicle is capable of performing automated driving as a first task and traveling following a preceding vehicle at a traveling speed equal to or lower than a predetermined speed. The HMI control device includes:
  an attention information presentation unit presenting attention information for calling attention of the driver when a congestion is determined to be cleared;
  a behavior acquisition unit acquiring a behavior of the driver; and
  a second task control unit ending a second task presented on the HMI device at an end timing corresponding to the behavior of the driver acquired by the behavior acquisition unit after presentation of the attention information.

According to another aspect of the present disclosure, an HMI control device that controls an HMI device is provided. The HMI device presents information to a driver of a vehicle in a recognizable manner, and the vehicle is capable of performing automated driving as a first task and traveling following a preceding vehicle at a traveling speed equal to or lower than a predetermined speed. The HMI control device includes:
  a behavior acquisition unit acquiring a behavior of the driver; and
  an attention information presentation unit presenting attention information for calling attention of the driver in a presentation mode corresponding to the behavior acquired by the behavior acquisition unit when a congestion is determined to be cleared.

According to still another aspect of the present disclosure, a driving control device controlling a driving of a vehicle is provided. The vehicle is capable of performing automated driving to travel following a preceding vehicle at a traveling speed equal to or less than a predetermined speed. The driving control device includes:
  a congestion state determination unit determining clearing of a congestion;
  a behavior acquisition unit acquiring a behavior of a driver of the vehicle; and
  a vehicle control unit that controls an acceleration or a deceleration of the vehicle.

The vehicle control unit decreases the acceleration of the vehicle in a case where an acceleration approval behavior that approves the acceleration of the vehicle is not acquired by the behavior acquisition unit after the congestion is determined to be cleared by the congestion state determination unit compared with a case where the acceleration approval behavior is acquired after the congestion is determined to be cleared.

EMBODIMENTS

Embodiments of the present disclosure will be described below with reference to the drawings. Note that when inserted in the middle of a series of description regarding one embodiment, descriptions of various modifications applicable to the embodiment are liable to hinder understanding of the embodiment. Therefore, modifications will be described not in the middle of but collectively after the series of description regarding the embodiment. In some part of the detailed description, some elements may be indicated by reference symbols with or without parentheses. In this case, the reference symbol merely indicates an example of correspondence between the element and the specific configuration of the embodiment described later. Therefore, the present disclosure is not limited by the configurations indicated by the reference symbols.

First Embodiment: Configuration

With reference to FIG. 1, a vehicle 1 is a so-called ordinary automobile, and includes a plurality of passenger seats such as a driver's seat 2 in a vehicle interior, which is an internal space of a box-shaped vehicle body. A passenger on board in the driver's seat 2 is hereinafter referred to as "driver". A direction in which the driver's face and chest face in a state where the driver takes a standard driving posture in the driver's seat 2 is hereinafter referred to as "front". The "standard driving posture" refers to a driving posture of a driver of the vehicle 1 traveling forward and straight with both the right and left eyeballs and the right and left shoulders arranged in a direction substantially parallel to the vehicle width direction sits on the driver's seat 2 so as to be appropriately manually drivable. The "driving posture" refers to a driver's riding posture that enables the driver to appropriately respond to a driving automation level corresponding to any one of Levels 0 to 2 described later. The "riding posture" of the driver includes a seating posture in the driver's seat 2, a positional relationship between the foot and an accelerator pedal 3 or the like, a state of gripping and operation of a steering wheel 8, and a visual line direction.

Front of the driver's seat 2 is provided with the accelerator pedal 3, a brake pedal 4, and a footrest 5. Diagonal front of the driver's seat 2 is provided with a shift lever 6. The accelerator pedal 3, the brake pedal 4, and the footrest 5 are arranged below a dashboard 7 provided in front of the driver's seat 2. The steering wheel 8 is attached to a steering column not illustrated extending at the rear from the dashboard 7 toward the driver's seat 2. A front windshield 9 is provided above the dashboard 7. Note that FIG. 1 illustrates the structure of the vehicle interior in a case where the vehicle 1 is a so-called right-hand drive automatic car. In this case, the standard driving posture is a posture in which the driver sits on the driver's seat 2 in such a manner that the back of the driver is not away from the backrest, grips the steering wheel 8 with both hands, and places the right foot on the accelerator pedal 3 or the brake pedal 4. The back is a part of the human body from the shoulder corresponding to the scapula to the lumbar vertebrae.

Figure 2:
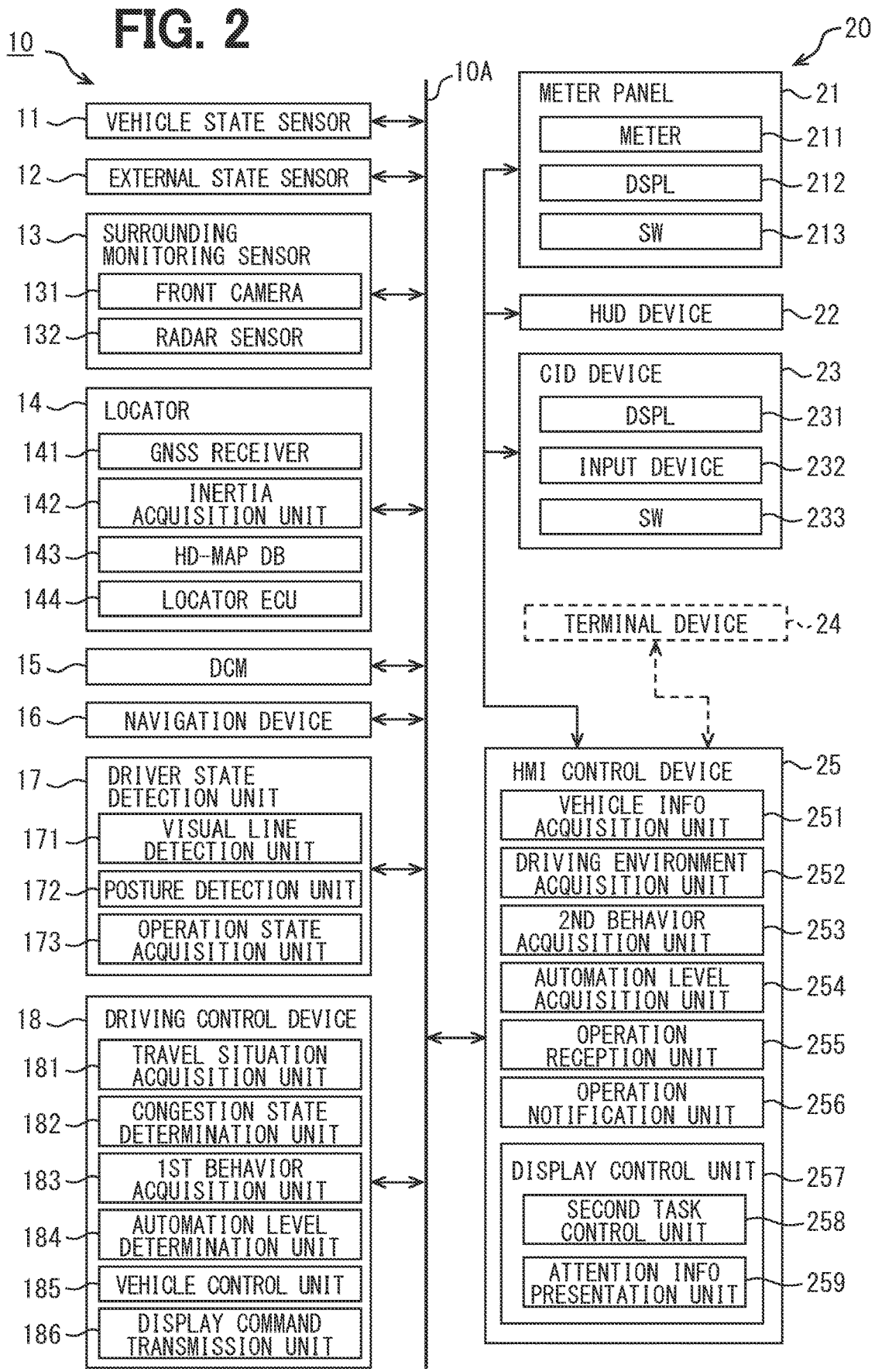
FIG. 2 is a block diagram illustrating a schematic configuration of the in-vehicle system illustrated in FIG. 1.

The vehicle 1 is mounted with an in-vehicle system 10. The vehicle 1 mounted with the in-vehicle system 10 is sometimes referred to as "subject vehicle" below. FIG. 2 schematically illustrates the block configuration of the in-vehicle system 10. Hereinafter, a schematic configuration of the in-vehicle system 10 will be described with reference to FIGS. 1 and 2.

The in-vehicle system 10 is configured to exhibit a function as a driving automation system in the subject vehicle when mounted on the subject vehicle. The "driving automation system" is a generic term for a "drive assistance system", which executes drive assistance below automated driving and an "automated driving system", which is capable of executing automated driving. In the present embodiment, the subject vehicle is configured to be able to execute drive assistance and automated driving when mounted with the in-vehicle system 10.

The "automated driving" refers to driving automation levels in the standard "SAE J3016" published by the SAE International corresponding to Levels 3 to 5 in which the driving automation system is in charge of, i.e., executes all dynamic driving tasks. SAE stands for Society of Automotive Engineers. The "dynamic driving task" is all operational and tactical functions that need to be performed in real time when the vehicle 1 is operated in road traffic, from which strategic functions are excluded. The "strategic functions" include a journey plan and waypoint selection. Level X in "SAE J3016" is hereinafter simply referred to as "Level X". X is any of 0 to 5. Hereinafter, as the numerical value of the X is larger, or as the number of dynamic driving tasks that the driving automation system is in charge of, i.e., executes increases, it is expressed as "driving automation level is higher". On the other hand, as the numerical value of the X is smaller, or as the number of dynamic driving tasks that the driving automation system is in charge of, i.e., executes decreases, it is expressed as "driving automation level is lower".

In "SAE J3016", the content of Levels 0 to 5 is specifically as follows. Note that the name of the driving automation level described together with each level is not described in "SAE J3016" but is used in the present description for convenience. In the following description of the level content, "OEDR" is an abbreviation for Object and Event Detection and Response. The OEDR includes monitoring of the driving environment. Monitoring of the driving environment includes detection, recognition, and classification of objects and events. Monitoring of the driving environment includes preparation for responding to objects and events as necessary. A "limited domain" is a specific condition under which a certain driving automation system or its function is designed to operate, and is also referred to as operational design domain or ODD. ODD stands for operational design domain. The limited domain includes at least one of a plurality of constraints such as, for example, geographical, environmental, speed, and time.

Level 0: Manual driving. The driver executes all dynamic driving tasks.

Level 1: Drive assistance. The driving automation system continuously executes, in a specific limited domain, any one of the longitudinal vehicle motion control subtask and the lateral vehicle motion control subtask (that is, steering control) of the dynamic driving tasks. The longitudinal vehicle motion control subtask includes control of start, acceleration/deceleration, and stop. However, the driving automation system does not simultaneously execute both the longitudinal vehicle motion control subtask and the lateral vehicle motion control subtask.

Level 2: Advanced drive assistance. The driving automation system continuously executes, in a specific limited domain, the longitudinal vehicle motion control subtask and the lateral vehicle motion control subtask of the dynamic driving tasks. The driver is expected to supervise the driving automation system by executing the OEDR that is a subtask of the dynamic driving task.

Level 3: Conditional automated driving. The driving automation system continuously executes all dynamic driving tasks in a specific limited domain. In principle, the driver is not obliged to execute the OEDR such as monitoring of surroundings of subject vehicle. However, in a case where it becomes difficult to continue the driving automation level, the driving automation system makes a request to the driver for driving changeover with sufficient time margin. The "driving changeover" is that, when automated driving ends and the driving automation level decreases, the driver takes a driving posture corresponding to the decreased driving automation level, and receives transferred authority of the dynamic driving task such as surrounding monitoring corresponding to the driving automation level from the driving automation system side. That is, the driving changeover is handover behavior of at least part of the automated driving function to the driver. The driver needs to appropriately respond to the request for the driving changeover.

Level 4: Advanced automated driving. The driving automation system continuously executes all dynamic driving tasks in a specific limited domain. Response to a case where it becomes difficult to continue the driving automation level in a limited domain is executed by the driving automation system.

Level 5: Fully automated driving. The driving automation system continuously executes all dynamic driving tasks unrestrictedly without limitation to a specific limited domain. The response to a case where it becomes difficult to continue the driving automation level is also continuously executed by the driving automation system unrestrictedly without limitation to a specific limited domain.

In the present embodiment, the in-vehicle system 10 is configured to be able to achieve the driving automation level of Levels 0 to 3 in the subject vehicle. Specifically, the in-vehicle system 10 is configured to be able to execute ACC and LKA corresponding to Level 1. ACC is adaptive cruise control, that is, inter-vehicle distance control. LKA stands for lane keeping assistance and is lane keeping assistance control. The in-vehicle system 10 is configured to be able to execute "hands-off driving" and "advanced safe drive assistance" corresponding to Level 2. The "hands-off driving" is that the driving automation system automatically executes start, steering, acceleration/deceleration, and stop control on condition that the driver appropriately responds to an intervention request or the like from the driving automation system. The "advanced safe drive assistance" is that a concurrently operating driving automation system timely executes a drive assistance operation in a scene where there is a possibility of collision or the like on an assumption that the driver drives the subject vehicle. Furthermore, the in-vehicle system 10 is configured to be able to execute "automated driving in congestion" corresponding to Level 3. The "automated driving in congestion" is automated driving of Level 3 executed with a congestion section as a limited domain, in which the vehicle travels following the preceding vehicle at equal to or lower than a predetermined speed in congestion. According to the definition by East Nippon Expressway Company Limited and Metropolitan Police Department, "congestion" means a state in which a line of cars travel at a low speed equal to or lower than a threshold speed or repeat stopping and starting continues to a predetermined degree. The threshold speed is, for example, 20 km/h on ordinary roads and main roads, and 40 km/h on expressways. The "predetermined degree" is, for example, 1 km or more and 15 minutes or more. On the other hand, a state that is not congestion is referred to as "non-congestion". Hereinafter, in the present description, unless otherwise supplementarily explained, the expression "automated driving" is used in a case of referring collectively to the automated driving at Level 3 including the automated driving in congestion. The "hands-off driving" is simply referred to as "Level 2", and the "advanced safe drive assistance" is referred to as "Level 2 [G mode]".

(Overall System Configuration)

As illustrated in FIG. 2, the in-vehicle system 10 is an in-vehicle network including an in-vehicle communication line 10A and a plurality of nodes and the like connected to one another via this in-vehicle communication line 10A, and is configured to be able to execute various vehicle controls during driving of the subject vehicle, various display operations accompanying this, and the like. The in-vehicle system 10 is configured to conform to a predetermined communication standard such as CAN (international registered trademark: international registration number 1048262A). CAN (international registered trademark) stands for controller unit area network.

The in-vehicle system 10 includes a vehicle state sensor 11, an external state sensor 12, a surrounding monitoring sensor 13, a locator 14, a DCM 15, a navigation device 16, a driver state detection unit 17, a driving control device 18, and an HMI device 20. DCM is an abbreviation of data communication module. The vehicle state sensor 11 to the HMI device 20 are connected to the in-vehicle communication line 10A.

The HMI device 20 is provided to present information in such a manner to be recognizable by the subject vehicle passengers including at least the driver. That is, the HMI device 20 is configured to display an image visually recognizable to the subject vehicle passengers and output a sound audible to the subject vehicle passengers.

Specifically, the HMI device 20 is configured to provide various types of information and/or entertainment to the subject vehicle passengers by way of image and/or sound input/output equipment, including a meter panel 21, an HUD device 22, a CID device 23, and a terminal device 24. HUD stands for head-up display. CID stands for center information display. The terminal device 24 is a piece of portable or wearable electronic equipment carried into the subject vehicle by a subject vehicle passenger including the driver, and is, for example, a mobile phone, a tablet terminal, a laptop computer, a handheld game console, a smartwatch, or the like. Hereinafter, the expression "display device" or "information presentation device" is sometimes used as a generic term for the meter panel 21, the HUD device 22, the CID device 23, and the terminal device 24.

The HMI device 20 includes an HMI control device 25 configured to control output of an image and/or a sound in the information presentation device. That is, the HMI control device 25 is configured to control the operation of the HMI device 20 constituting the in-vehicle infotainment system. The meter panel 21, the HUD device 22, and the CID device 23 are connected to the HMI control device 25 in such a manner to be able to perform information communication via a sub communication line different from the in-vehicle communication line 10A. When carried into the subject vehicle, the terminal device 24 is connected to the HMI control device 25 in such a manner to be able to perform information communication by short-range wireless communication such as Bluetooth (registered trademark) or TransferJet (registered trademark). The HMI control device 25 is provided as a node connected to the in-vehicle communication line 10A. Details of the configurations of the HMI device 20 and the HMI control device 25 will be described later.

(Various Sensors)

The vehicle state sensor 11 is provided to generate output corresponding to various amounts related to the driving state of the subject vehicle. The "various amounts related to the driving state" include various amounts related to the driving operation states by the driver or the driving automation system, such as an accelerator position, a braking amount, a transition position, and a steering angle. The "various amounts related to the driving state" include, for example, physical amounts related to the behavior of the subject vehicle, such as a vehicle speed (that is, traveling speed of the subject vehicle), an angular velocity, longitudinal acceleration, and lateral acceleration. That is, the vehicle state sensor 11 is a collective term for the purpose of simplification of illustration and description of known sensors necessary for vehicle driving control, such as an accelerator position sensor, a steering angle sensor, a wheel speed sensor, an angular velocity sensor, and an acceleration sensor. The vehicle state sensor 11 is provided to be able to provide detection output to each unit such as the driving control device 18 via the in-vehicle communication line 10A.

The external state sensor 12 is provided to generate output corresponding to various amounts mainly related to the natural environment in the driving environment of the subject vehicle. The "various amounts related to the natural environment" includes physical amounts such as an outside temperature, a rainfall amount, and illuminance, for example. That is, the external state sensor 12 is a collective term for the purpose of simplification of illustration and description of known sensors such as an outside temperature sensor, a raindrop sensor, and an illuminance sensor. The external state sensor 12 is provided to be able to provide detection output to each unit such as the driving control device 18 via the in-vehicle communication line 10A.

The surrounding monitoring sensor 13 is provided to mainly detect things other than those detectable by the external state sensor 12 in the driving environment of the subject vehicle. Specifically, the surrounding monitoring sensor 13 is configured to be able to detect a moving object and a stationary object in a predetermined detection range around the subject vehicle. The "moving object" includes a pedestrian, a cyclist, an animal, and other vehicles that are driving. The "stationary object" includes a roadside structure (for example, a wall, a building, and the like) in addition to an on-road dropped object, a guardrail, a curb, a parked or stopped vehicle, a road sign, and road marking. The surrounding monitoring sensor 13 can also be referred to as "ADAS sensor". ADAS stands for advanced driver-assistance systems.

In the present embodiment, the surrounding monitoring sensor 13 includes a front camera 131 and a radar sensor 132 as a configuration for detecting a moving object and a stationary object. The front camera 131 is provided to capture images of the front and front sides of the subject vehicle. The front camera 131 is a digital camera device, and includes an image sensor such as a CCD or a CMOS. CCD stands for charge coupled device. CMOS stands for complementary MOS.

The radar sensor 132 is a millimeter-wave radar sensor, a submillimeter-wave radar sensor, or a laser radar sensor configured to transmit/receive radar waves, and is mounted on a front surface part of the body of the subject vehicle. The radar sensor 132 is configured to output a signal corresponding to a position and a relative speed of a reflection point. The "reflection point" is a point estimated to have reflected a radar wave on the surface of an object present around the subject vehicle. The "relative speed" is a relative speed of a reflection point, that is, an object reflecting a radar wave, with respect to the subject vehicle.

(Locator)

The locator 14 is configured to acquire highly accurate position information and the like of the subject vehicle by so-called complex positioning. Specifically, the locator 14 includes a GNSS receiver 141, an inertia acquisition unit 142, a high-accuracy map DB 143, and a locator ECU 144. GNSS stands for global navigation satellite system. DB stands for database. ECU stands for electronic control unit. The "highly accurate position information" is, for example, position information having position accuracy to the extent of being usable for the driving automation level of Level 2 or higher, specifically, to the extent of having an error less than 10 cm.

The GNSS receiver 141 is provided to receive positioning signals transmitted from a plurality of positioning satellites, that is, artificial satellites. In the present embodiment, the GNSS receiver 141 is configured to be able to receive a positioning signal from a positioning satellite in at least one of satellite positioning systems such as GPS, QZSS, GLONASS, Galileo, IRNSS, and the BeiDou Navigation Satellite System. GPS stands for global positioning system. QZSS stands for quasi-zenith satellite system. GLONASS is an abbreviation for global navigation satellite system. IRNSS stands for Indian regional navigation satellite system.

The inertia acquisition unit 142 is configured to acquire acceleration and angular velocity acting on the subject vehicle. In the present embodiment, the inertia acquisition unit 142 is provided as a three-axis gyro sensor and a three-axis acceleration sensor built in a box-shaped housing of the locator 14.

The high-accuracy map DB 143 is configured mainly by a nonvolatile rewritable memory in such a manner to store the high-accuracy map information in a rewritable manner and to retain the stored content even during power interruption. The nonvolatile rewritable memory is, for example, a hard disk, an EEPROM, a flash ROM, or the like. EEPROM stands for electronically erasable and programmable ROM. ROM stands for read only memory. The high-accuracy map information can also be referred to as high-accuracy map data. The high-accuracy map information includes map information with higher accuracy than map information corresponding to a position error of about several meters used in a conventional car navigation system. Specifically, the high-accuracy map DB 143 stores information that can be used for driving automation levels of Level 2 or higher, such as three-dimensional road shape information, lane number information, and regulation information, in conformity to a predetermined standard such as the ADASIS standard. ADASIS stands for advanced driver assistance systems interface specification.

The locator ECU 144 is configured as a so-called in-vehicle microcomputer including a CPU, a ROM, a RAM, and an input/output interface that are not illustrated. CPU is an abbreviation for central processing unit. RAM stands for random access memory. The locator ECU 144 is configured to sequentially determine the position, the direction, and the like of the subject vehicle based on a positioning signal received by the GNSS receiver 141, acceleration and an angular velocity acquired by the inertia acquisition unit 142, a vehicle speed acquired from the vehicle state sensor 11, and the like. The locator 14 is provided to be able to provide a determination result of the position, the direction, and the like by the locator ECU 144 to each unit such as the navigation device 16, the driving control device 18, and the HMI control device 25 via the in-vehicle communication line 10A.

(DCM)

The DCM 15 is an in-vehicle communication module, and is provided to be able to communicate information with a base station around the subject vehicle by wireless communication conforming to a communication standard such as LTE or 5G. LTE stands for long term evolution. 5G stands for 5th generation.

Specifically, for example, the DCM 15 is configured to acquire the latest high-accuracy map information from a probe server on a cloud. The DCM 15 stores the acquired latest high-accuracy map information into the high-accuracy map DB 143 in cooperation with the locator ECU 144. Furthermore, the DCM 15 is configured to acquire traffic information such as congestion information from the above-described probe server and/or a predetermined database. The "congestion information" includes the position and length of a congestion section. Specifically, the congestion information includes a congestion head position, a congestion tail position, an approximate congestion distance, and approximate congestion time. The traffic information is also referred to as "road traffic information".

(Navigation Device)

The navigation device 16 is provided to acquire a planned travel route from the current position of the subject vehicle to a predetermined destination. In the present embodiment, the navigation device 16 is configured to calculate the planned travel route based on the destination set by the driver or the like of the subject vehicle, the high-accuracy map information acquired from the locator 14, and the position information and the direction information of the subject vehicle acquired from the locator 14. The navigation device 16 is provided to be able to provide various types of information including route information that is a calculation result to each unit such as the driving control device 18 and the HMI control device 25 via the in-vehicle communication line 10A. That is, the navigation device 16 displays a navigation screen display for map display, route display, and the like on the HMI device 20.

(Driver State Detection Unit)

The driver state detection unit 17 is provided to detect a driver state. The "driver state" is a state of the driver on board in the driver's seat 2 in the subject vehicle, and includes at least any one of a visual line direction, posture, body motion, and a state of mind. The driver state detection unit 17 is provided to be able to provide a detection result of the driver state to each unit such as the driving control device 18 and the HMI control device 25 via the in-vehicle communication line 10A.

In the present embodiment, the driver state detection unit 17 includes a visual line detection unit 171, a posture detection unit 172, and an operation state acquisition unit 173. The visual line detection unit 171 is provided to detect an orientation and/or a visual line direction of the driver's face by image recognition based on an image captured by an in-vehicle camera including an image sensor such as a CCD or a CMOS. That is, the visual line detection unit 171 has a configuration similar to that of a DSM device that issues warning or the like regarding inattentive driving of the driver or the like. DSM stands for driver status monitor.

The posture detection unit 172 is provided to detect the seating posture of the driver in the driver's seat 2 using the above-described in-vehicle camera and/or a physical quantity sensor such as a seating pressure sensor provided inside the driver's seat 2. The operation state acquisition unit 173 is provided to acquire a placement state of the driver's foot on the accelerator pedal 3, the brake pedal 4, and the footrest 5, and an operation state of the accelerator pedal 3 and the brake pedal 4. The operation state acquisition unit 173 is provided to acquire the gripping state and the operation state of the steering wheel 8 by the driver. Furthermore, the operation state acquisition unit 173 is provided to acquire an input operation state in the HMI device 20 from the HMI control device 25.

(Driving Control Device)

The driving control device 18 has a configuration as an "automated driving ECU" or a "drive assistance ECU". That is, the driving control device 18 is provided to control driving of the subject vehicle based on signals and information acquired from the vehicle state sensor 11, the external state sensor 12, the surrounding monitoring sensor 13, the locator 14, and the like. Specifically, the driving control device 18 is configured to execute a predetermined driving control operation. In the present embodiment, the "predetermined driving control operation" includes a vehicle control operation, that is, a dynamic driving task execution operation corresponding to Levels 1 to 3. In the present embodiment, the driving control device 18 is configured to be able to set the driving automation level in the subject vehicle to any of Level 0, Level 1 [ACC], Level 1 [LKA], Level 2, Level 2 [G mode], and automated driving in congestion.

The driving control device 18 has a configuration as a so-called in-vehicle microcomputer including a CPU, a ROM, a nonvolatile rewritable memory, a RAM, and an input/output interface that are not illustrated. Specifically, the driving control device 18 has the following functional configuration or functional unit implemented on an in-vehicle microcomputer. That is, the driving control device 18 includes a travel situation acquisition unit 181, a congestion state determination unit 182, a first behavior acquisition unit 183, an automation level determination unit 184, a vehicle control unit 185, and a display command transmission unit 186.

The travel situation acquisition unit 181 is provided to acquire the travel situation of at least the subject vehicle. The "travel situation" includes a driving state and a driving environment detected or acquired by the vehicle state sensor 11, the external state sensor 12, the surrounding monitoring sensor 13, and the like. The travel situation acquisition unit 181 is provided to acquire high-accuracy map information on the current position and the surroundings of the subject vehicle, and traffic information on the road on which the subject vehicle is currently traveling and roads in the surroundings. That is, the travel situation acquisition unit 181 acquires information necessary for vehicle control corresponding to Levels 1 to 3 from the vehicle state sensor 11, the external state sensor 12, the surrounding monitoring sensor 13, the locator 14, the DCM 15, and the like.

Based on an acquisition result by the travel situation acquisition unit 181, the congestion state determination unit 182 is provided to determine congestion entry, which is a start condition of automated driving in congestion, and congestion clearing, which is an end condition of automated driving in congestion. The "congestion entry", which is a determination target in the congestion state determination unit 182, means that the travel situation of the subject vehicle is altered from non-congestion to congestion at the present time point or within a predetermined time or a predetermined travel distance from the present time point. The "congestion clearing", which is a determination target in the congestion state determination unit 182, means that the travel situation of the subject vehicle is altered from congestion to non-congestion at the present time point or within a predetermined time or a predetermined travel distance from the present time point. The "predetermined time" is, for example, about 30 seconds. The "predetermined travel distance" is, for example, about 300 m. Specifically, the congestion state determination unit 182 determines congestion entry and congestion clearing based on an existence state and the inter-vehicle distance of the preceding vehicle acquired by the surrounding monitoring sensor 13 and the current position of the subject vehicle and congestion information acquired by the locator 14 or the like.

The first behavior acquisition unit 183 as a "behavior acquisition unit" in the present disclosure is provided to acquire driver behavior. The "driver behavior" is behavior of the driver of the subject vehicle, and includes a visual line direction, posture, body motion, and various operation states. Specifically, the first behavior acquisition unit 183 acquires, that is, detects the driver behavior based on a detection result of the driver state by the driver state detection unit 17 and acquisition results of various operation states by the operation state acquisition unit 173.

The automation level determination unit 184 is provided to determine the driving automation level based on a travel situation acquired by the travel situation acquisition unit 181, a determination result by the congestion state determination unit 182, and driver behavior acquired by the first behavior acquisition unit 183. The driving control device 18 is provided to be able to provide a determination result of the driving automation level by the automation level determination unit 184 to each unit such as the HMI control device 25 via the in-vehicle communication line 10A. Details of determination of the driving automation level by the automation level determination unit 184 will be described in detail in an operation outline and an operation example described later.

The vehicle control unit 185 is provided to execute a vehicle motion control subtask corresponding to the driving automation level determined by the automation level determination unit 184. That is, the vehicle control unit 185 executes longitudinal and/or lateral motion control of the subject vehicle depending on the driving automation level determined by the automation level determination unit 184. As described above, the longitudinal motion control includes start control, acceleration/deceleration control, and stop control.

The display command transmission unit 186 is provided to cause the HMI device 20 to execute presentation of the level-related information by transmitting display command information to the HMI control device 25, which controls the HMI device 20. The "level-related information" is information related to an execution plan, execution, or transition of the driving automation level.

(HMI Device)

The HMI device 20 is provided to at least visually present various types of information regarding the subject vehicle to the driver, and to be able to receive input operation of the driver corresponding to the presentation content. In the present embodiment, the HMI device 20 mounted on the subject vehicle capable of automated driving in congestion is configured to be able to execute presentation of various types of information regarding automated driving in congestion and the like and reception of input operation by the driver. The "information presentation" is, for example, various types of guidance, an input operation instruction, input operation content notification, warning, and the like.

As described above, the HMI device 20 includes the meter panel 21, the HUD device 22, and the CID device 23 provided on the dashboard 7. That is, in the present embodiment, the HMI device 20 has a configuration as a so-called "dashboard HMI". The HMI device 20 includes a speaker not illustrated for executing information presentation by sound.

The meter panel 21 includes a meter 211, a meter display 212, and a meter switch 213. The meter 211 is provided to execute meter display such as a vehicle speed, an engine speed, a cooling water temperature, and a remaining fuel amount of the subject vehicle. The meter display 212 is an information display unit or an information display area provided at substantially the center of the meter panel 21 in the vehicle width direction, and is provided to be able to execute display of various types of information such as date and time, outside temperature, travel distance, and a radio receiving station. In the present embodiment, the meter display 212 has a configuration as image display equipment that is a liquid crystal display or an organic EL display including a substantially rectangular displayable area. EL stands for electroluminescence. The meter switch 213 is provided to be able to receive various types of operation related to a display state or display content in the meter 211 and/or the meter display 212.

The HUD device 22 is provided to display a display image including characters and/or symbols in front of the driver. In the present embodiment, the HUD device 22 is configured to perform superimposition display of a display image on the foreground including the road surface ahead of the subject vehicle by forming a virtual display image in front of the driver using the AR technology to. AR stands for augmented reality. The "superimposition display" means displaying, while being associated with each other, a superimposition target object and related information (for example, building name) of the superimposition target object (for example, building) included in the foreground by displaying the related information in such a manner to overlap the superimposition target or in the vicinity of the superimposition target object. Route display, travel direction display, traffic information display, and the like with respect to the front road surface also fall into "superimposition display". Specifically, the HUD device 22 displays a display image by AR by projecting display image light constituting a display image onto a predetermined the projection area PA on the front windshield 9 and causing the driver to visually recognize reflected light by the front windshield 9 of the display image light.

The CID device 23 is provided at substantially the center of the dashboard 7 in the vehicle width direction. The CID device 23 is provided to be able to display a navigation screen for map display, route display, and the like by the navigation device 16. The CID device 23 is provided to be able to display information and content different from those on the navigation screen. Specifically, the CID device 23 is configured to be able to execute display related to travel mode setting, such as "comfort", "normal", "sports", and "circuit".

The CID device 23 is provided to be able to execute display related to a second task available to the driver during automated driving. Specifically, for example, the CID device 23 is configured to be able to execute video content viewing as a second task.

The CID device 23 includes a CID display 231, an input device 232, and a CID switch 233. The CID display 231 is provided to be visually recognizable to at least the driver at a substantially central position of the dashboard 7 in the vehicle width direction, that is, a position between the driver's seat 2 and the passenger's seat. The CID display 231 has a configuration as image display equipment that is a liquid crystal display or an organic EL display. The CID display 231 is configured to perform image display of a video of video content in a case where the second task is to view the video content.

The input device 232 is a transparent touchscreen, and is provided to cover the CID display 231 when superimposed on the CID display 231. That is, the input device 232 is configured to be able to receive input operation by the driver or the like corresponding to display while allowing the driver or the like to visually recognize the display on the CID display 231. The CID switch 233 has a plurality of manual operation switches arranged around the CID display 231 and the input device 232.

The HMI device 20 has a steering switch and the like in addition to the meter switch 213 and the CID switch 233. The steering switch is provided on a spoke or the like of the steering wheel 8. The HMI device 20 is provided to be able to provide a reception result of input operation by the driver to each unit such as the driving control device 18 via the in-vehicle communication line 10A.

(HMI Control Device)

The HMI control device 25 has a configuration as an HCU that controls operations of the meter panel 21, the HUD device 22, and the like included in the HMI device 20. HCU stands for HMI control unit.

The HMI control device 25 has a configuration as a so-called in-vehicle microcomputer including a CPU, a ROM, a nonvolatile rewritable memory, a RAM, and an input/output interface that are not illustrated. Specifically, the HMI control device 25 has the following functional configuration or functional unit implemented on an in-vehicle microcomputer. That is, the HMI control device 25 includes a vehicle information acquisition unit 251, a driving environment acquisition unit 252, a second behavior acquisition unit 253, an automation level acquisition unit 254, an operation reception unit 255, an operation notification unit 256, and a display control unit 257.

The vehicle information acquisition unit 251 is provided to acquire information related to the driving state of the subject vehicle. Specifically, the vehicle information acquisition unit 251 acquires, from the vehicle state sensor 11, various amounts related to the driving state of the subject vehicle detected or acquired by the vehicle state sensor 11.

The driving environment acquisition unit 252 is provided to acquire information related to the driving environment of the subject vehicle. Specifically, the driving environment acquisition unit 252 acquires, from the external state sensor 12, various amounts related to the natural environment around the subject vehicle detected or acquired by the external state sensor 12. The driving environment acquisition unit 252 acquires, from the surrounding monitoring sensor 13, an object detection result by the surrounding monitoring sensor 13. The driving environment acquisition unit 252 acquires, from the locator 14 and the navigation device 16, the current position of the subject vehicle, the planned travel route, and traffic information including congestion information on the planned travel route. Furthermore, the driving environment acquisition unit 252 acquires a determination result of congestion entry or congestion clearing by the congestion state determination unit 182 from the driving control device 18.

The second behavior acquisition unit 253 as a "behavior acquisition unit" in the present disclosure is provided to acquire driver behavior. Specifically, similarly to the first behavior acquisition unit 183, the second behavior acquisition unit 253 acquires the driver behavior based on a detection result of the driver state by the driver state detection unit 17 and acquisition results of various operation states by the operation state acquisition unit 173.

The automation level acquisition unit 254 is provided to acquire a determination result of the driving automation level in the driving control device 18. Specifically, automation level acquisition unit 254 receives, from the driving control device 18, a determination result of the driving automation level by the automation level determination unit 184.

The operation reception unit 255 is provided to receive input operation in the HMI device 20 by the subject vehicle passenger including the driver. Specifically, the operation reception unit 255 monitors a status or a result of reception of input operation by the meter switch 213, the input device 232, the CID switch 233, the terminal device 24, and the like.

The operation notification unit 256 is provided to notify the driving control device 18 of a status or a result of reception of input operation in the operation reception unit 255. Specifically, the operation notification unit 256 corresponding to an "acceleration approval notification unit" in the present disclosure notifies the driving control device 18 of the acquisition situation of the acceleration approval behavior. The "acceleration approval behavior" is driver behavior, that is, an input operation that approves acceleration of the subject vehicle.

The display control unit 257 is provided to control an image and/or sound output operation by the HMI device 20. That is, the display control unit 257 presents various types of information to the subject vehicle passenger including the driver by controlling image output and sound output in the meter panel 21, the HUD device 22, the CID device 23, and the like. The "various information" includes driving state information, driving environment information, level-related information, route information, congestion information, and various messages. By cooperating with the terminal device 24 while the driver executes the second task using the terminal device 24, the display control unit 257 causes the terminal device 24 to present various types of information.

In the present embodiment, the display control unit 257 is configured to control information presentation operation in HMI device 20 depending on the driving automation level acquired by automation level acquisition unit 254. That is, the display control unit 257 causes the information presentation device such as the meter panel 21 included in the HMI device 20 to execute information presentation corresponding to the driving automation level determined by the automation level determination unit 184 and being executed or planned to be executed by the in-vehicle system 10.

Specifically, the display control unit 257 has a second task control unit 258 and an attention information presentation unit 259. The second task control unit 258 is provided to control a second task execution state in the HMI device 20 during automated driving. The attention information presentation unit 259 is provided to present, by screen display and sound by the information presentation device, attention information for calling the driver's attention.

(Operation Outline)

Hereinafter, operation of the driving control device 18 and the HMI control device 25 according to the present embodiment, and an outline of a control method and a control program executed by them will be described together with effects achieved by the present embodiment.

In the driving control device 18, the travel situation acquisition unit 181 acquires various types of information including the travel situation of the subject vehicle. Specifically, the travel situation acquisition unit 181 acquires the driving state and the driving environment of the subject vehicle from the vehicle state sensor 11, the external state sensor 12, and the surrounding monitoring sensor 13. The travel situation acquisition unit 181 acquires, from the locator 14 and the navigation device 16, high-accuracy map information on the current position and the surroundings of the subject vehicle, the planned travel route, and traffic information on the planned travel route.

The congestion state determination unit 182 determines congestion entry and congestion clearing based on an acquisition result by the travel situation acquisition unit 181. Specifically, the congestion state determination unit 182 determines congestion entry and congestion clearing based on an existence state and the inter-vehicle distance of the preceding vehicle acquired by the surrounding monitoring sensor 13 and the current position of the subject vehicle and congestion information acquired by the locator 14 or the like.

The first behavior acquisition unit 183 acquires the driver behavior based on a detection result of the driver state by the driver state detection unit 17 and acquisition results of various operation states by the operation state acquisition unit 173. The driver behavior includes the driver's riding posture, the driving operation state, and the input operation state in the HMI device 20. The "riding posture" includes the seating posture of the driver on the driver's seat 2, the visual line direction of the driver, the placement state of the driver's foot on the accelerator pedal 3, the brake pedal 4, and the footrest 5, and the gripping state of the steering wheel 8. The "driving operation state" includes the operation state of the accelerator pedal 3 and the brake pedal 4 and an operation state of the steering wheel 8.

The automation level determination unit 184 determines the driving automation level based on the travel situation acquired by the travel situation acquisition unit 181, the determination result by the congestion state determination unit 182, and the driver behavior acquired by the first behavior acquisition unit 183. Specifically, the automation level determination unit 184 determines whether or not the start condition of the driving automation level corresponding to Levels 1 to 3 is satisfied based on various types of information such as a travel state acquired by the travel situation acquisition unit 181. When the start condition of a predetermined driving automation level is satisfied, the automation level determination unit 184 determines that the driving automation level can be executed. When approval operation is performed as driver behavior, the automation level determination unit 184 determines execution of the driving automation level. The vehicle control unit 185 executes vehicle speed control, steering control, braking control, and the like depending on the driving automation level determined to be executed by the automation level determination unit 184.

When the end condition of a predetermined driving automation level being executed is satisfied or when a continuation condition of the driving automation level is not satisfied, the automation level determination unit 184 determines transition of the driving automation level. That is, the automation level determination unit 184 determines the end of the predetermined driving automation level being executed and the next executable driving automation level. Then, the vehicle control unit 185 executes vehicle speed control, steering control, braking control, and the like depending on the transition mode of the driving automation level determined by the automation level determination unit 184.

The display command transmission unit 186 cause the HMI device 20 to execute presentation operation of the level-related information by transmitting display command information to the HMI control device 25 that controls the HMI device 20. Due to this, the HMI device 20 notifies, by image display and/or sound, the subject vehicle passenger including the driver of the driving automation level that is being executed or is planned to be executed.

That is, in the HMI device 20, the vehicle information acquisition unit 251 acquires information related to the driving state of the subject vehicle. The driving environment acquisition unit 252 acquires information related to the driving environment of the subject vehicle. The second behavior acquisition unit 253 acquires driver behavior. The automation level acquisition unit 254 acquires a determination result of the driving automation level in the driving control device 18. The operation reception unit 255 receives input operation in the HMI device 20 by the subject vehicle passenger including the driver. The operation notification unit 256 notifies the driving control device 18 of a status or a result of reception of the input operation in the operation reception unit 255. The display control unit 257 controls output operation of an image and/or sound by the HMI device 20 based on acquisition results in the vehicle information acquisition unit 251 to the automation level acquisition unit 254 and the situation or the result of reception of the input operation in the operation reception unit 255.

Specifically, for example, the HMI device 20 displays, on the meter display 212 or the like, the currently executed driving automation level. When alteration of the driving automation level is generated, the HMI device 20 executes information presentation operation related to the level alteration. For example, when automated driving in congestion is enabled, the HMI device 20 displays, on the meter display 212 or the like, that the automated driving in congestion is enabled and an approval operation instruction for receiving approval operation for starting the automated driving in congestion. On the other hand, when the automated driving in congestion ends, the HMI device 20 displays information regarding the end of the automated driving in congestion on the meter display 212 or the like.

(Display Example)

FIGS. 3 to 8 illustrate display examples by the meter display 212 in the meter panel 21, the projection area PA in the HUD device 22, and the CID display 231 in the CID device 23. Note that for convenience of illustration, in FIG. 3 and the like, the meter display 212, the projection area PA, and the CID display 231 are collectively illustrated unlike the positional relationship actually seen from the driver.

(During Manual Driving)

Figure 3:
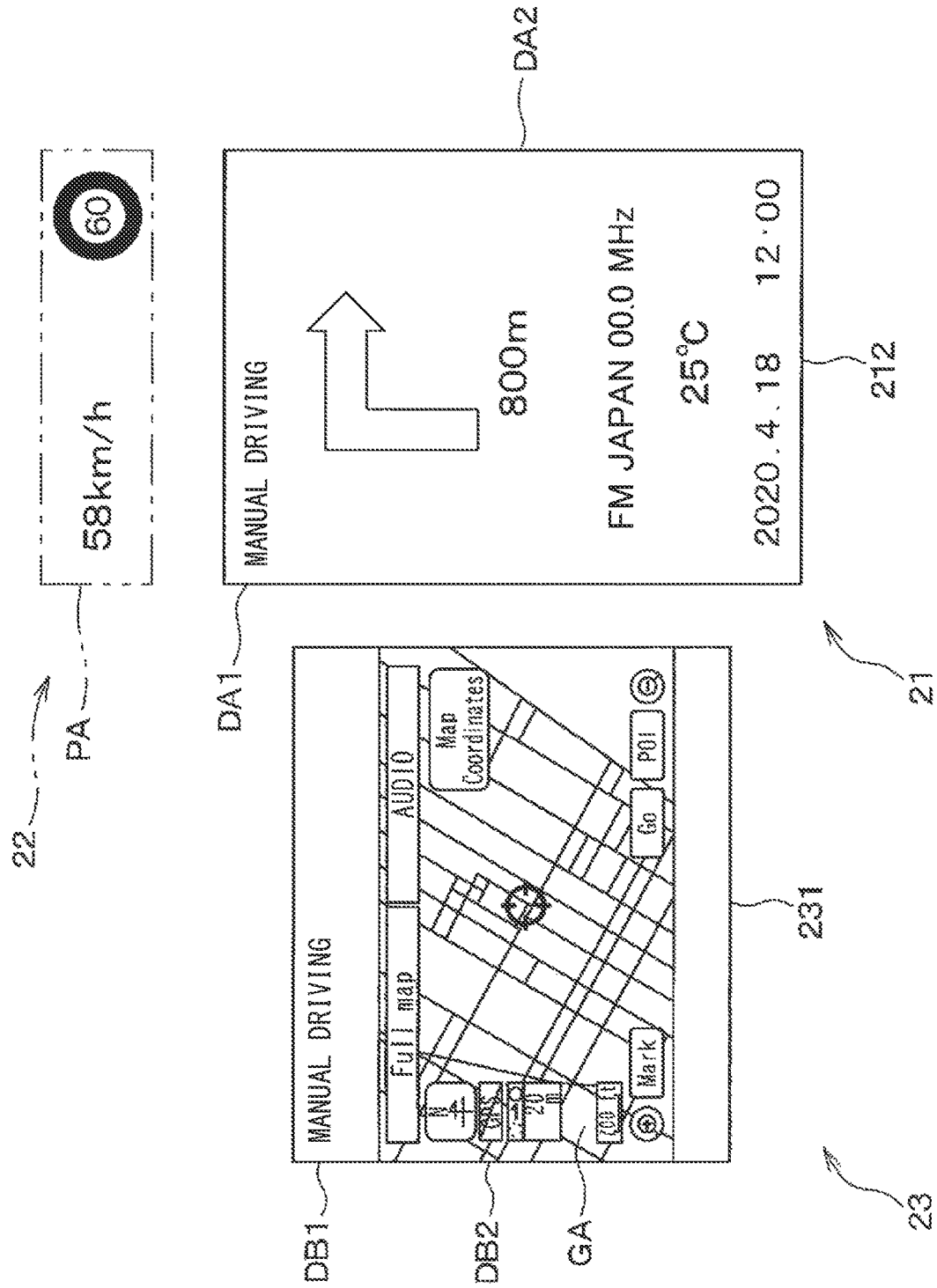
FIG. 3 is a schematic view illustrating a display example of an HMI device according to a first embodiment.

FIG. 3 illustrates a display example during manual driving. As illustrated in FIG. 3, during manual driving, level-related information "during manual driving" clearly indicating the driving automation level being executed is displayed in a level information display area DA1, which is a laterally-long band-shaped area at an upper end of the meter display 212. Various pieces of information such as route information are displayed in a driving information display area DA2, which is located below the level information display area DA1 and occupies most of the displayable area of the meter display 212. FIG. 3 illustrates, as a specific example, an example in which route information for turning right at an intersection 800 m ahead, a radio receiving station, outside temperature, and current date and time are displayed in the driving information display area DA2.

In the projection area PA of the HUD device 22, a current vehicle speed of the subject vehicle and regulation information such as a maximum speed on the road on which the subject vehicle is currently traveling are displayed. In an information display area DB1 provided in an upper part of the CID display 231, level-related information "during manual driving" is displayed. A navigation screen GA is displayed in a screen area DB2, which is located below the information display area DB1 and occupies most of the displayable area of the CID display 231. In this case, the navigation screen GA is displayed in a normal size that occupies almost the entire screen area DB2.

(During Automated Driving in Congestion)

Figure 4:
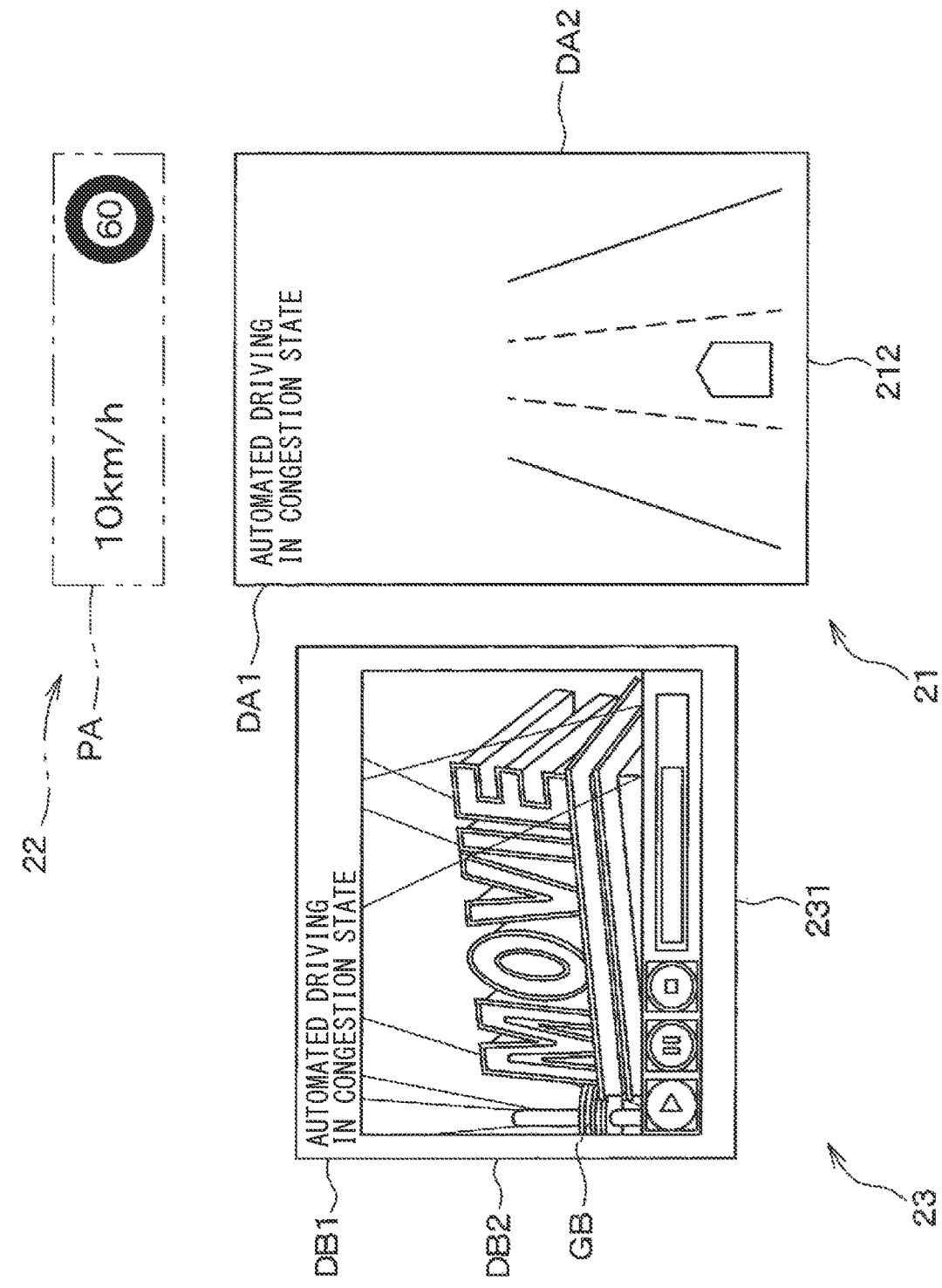
FIG. 4 is a schematic view illustrating a display example of the HMI device according to the first embodiment.

FIG. 4 illustrates a display example in which the video content is being viewed with the CID device 23 as a second task during stable execution of automated driving in congestion. The "during stable execution of automated driving in congestion" is a situation not immediately after the start of the automated driving in congestion and not immediately before the end of the automated driving in congestion. Specifically, "during stable execution of automated driving in congestion" refers to a situation from a time point, for example, when the second task becomes available in the currently executed automated driving in congestion to a time point when the remaining distance of the possible section of the currently executed automated driving in congestion becomes equal to or less than a predetermined distance.

As illustrated in FIG. 4, on the meter display 212 during automated driving in congestion, level-related information that is "during automated driving in congestion" is displayed in the level information display area DA1. In the driving information display area DA2, graphic display and the like indicating a lane and the like on which the subject vehicle is traveling during automated driving are displayed.

In the projection area PA of the HUD device 22, a current vehicle speed of the subject vehicle and regulation information such as a maximum speed on the road on which the subject vehicle is currently traveling are displayed. In the information display area DB1 in the CID display 231, level-related information that is "during automated driving in congestion" is displayed.

During the automated driving, steering control operation and acceleration/deceleration control operation by the driver are not required in principle until there is a driving changeover request or a driving intervention request by the in-vehicle system 10. Therefore, during the automated driving in congestion, the driver is not required to take the manual driving posture, which is a riding posture that enables manual driving. The "manual driving posture" that can respond to manual driving at Level 0 is a posture substantially similar to the standard driving posture described above, and includes a predetermined allowance error regarding the riding posture with respect to the standard driving posture.

During the automated driving, the driver is not obliged to monitor the surroundings of the subject vehicle until there is a driving changeover request or a driving intervention request by the in-vehicle system 10. Therefore, while the automated driving in congestion is stably executed, the driver can freely execute or use the second task. Note that the second task also includes operation on the terminal device 24.

While the video content is being viewed on the CID device 23 as a second task, a second task screen GB, which is a video content screen, is displayed on the screen area DB2 on the CID display 231. In this case, the second task screen GB is displayed in a normal size that occupies almost the entire screen area DB2.

(Attention to Congestion Clearing)

By congestion clearing, the automated driving in congestion ends. When the congestion state determination unit 182 determines congestion clearing in the driving control device 18, the display command transmission unit 186 transmits, to the HMI device 20, display command information for causing the HMI device 20 to present information necessary at the time of congestion clearing. The HMI device 20 presents various types of information regarding the end of automated driving in congestion based on the received display command information.

When the automated driving in congestion ends, the driving automation level of the subject vehicle decreases to Level 2 or less. At this time, the driver is required to change over driving. When the automated driving in congestion ends and the driving automation level transitions to a low driving automation level, the vehicle speed can increase from a low vehicle speed in congestion.

However, the driver who is using the second task happens to have consciousness away from the driving state and driving environment of the subject vehicle, or happens to have a riding posture away from the driving posture. Therefore, when the automated driving in congestion ends and the driving automation level decreases, it is required to smoothly perform driving changeover corresponding to the decreased driving automation level. It is required not to offer the driver an uneasy feeling or an uncomfortable feeling as much as possible when increasing the vehicle speed of the subject vehicle from a low vehicle speed in congestion due to congestion clearing.

Therefore, the display control unit 257, that is, the attention information presentation unit 259 presents attention information for calling the driver's attention by the HMI device 20 when congestion clearing, which is an end condition of automated driving in congestion, is determined. The attention information in this case is character information and/or sound information including, as content, at least any one of congestion clearing, end of automated driving in congestion by congestion clearing, and necessity of driving changeover due to end of automated driving in congestion.

Figure 5:
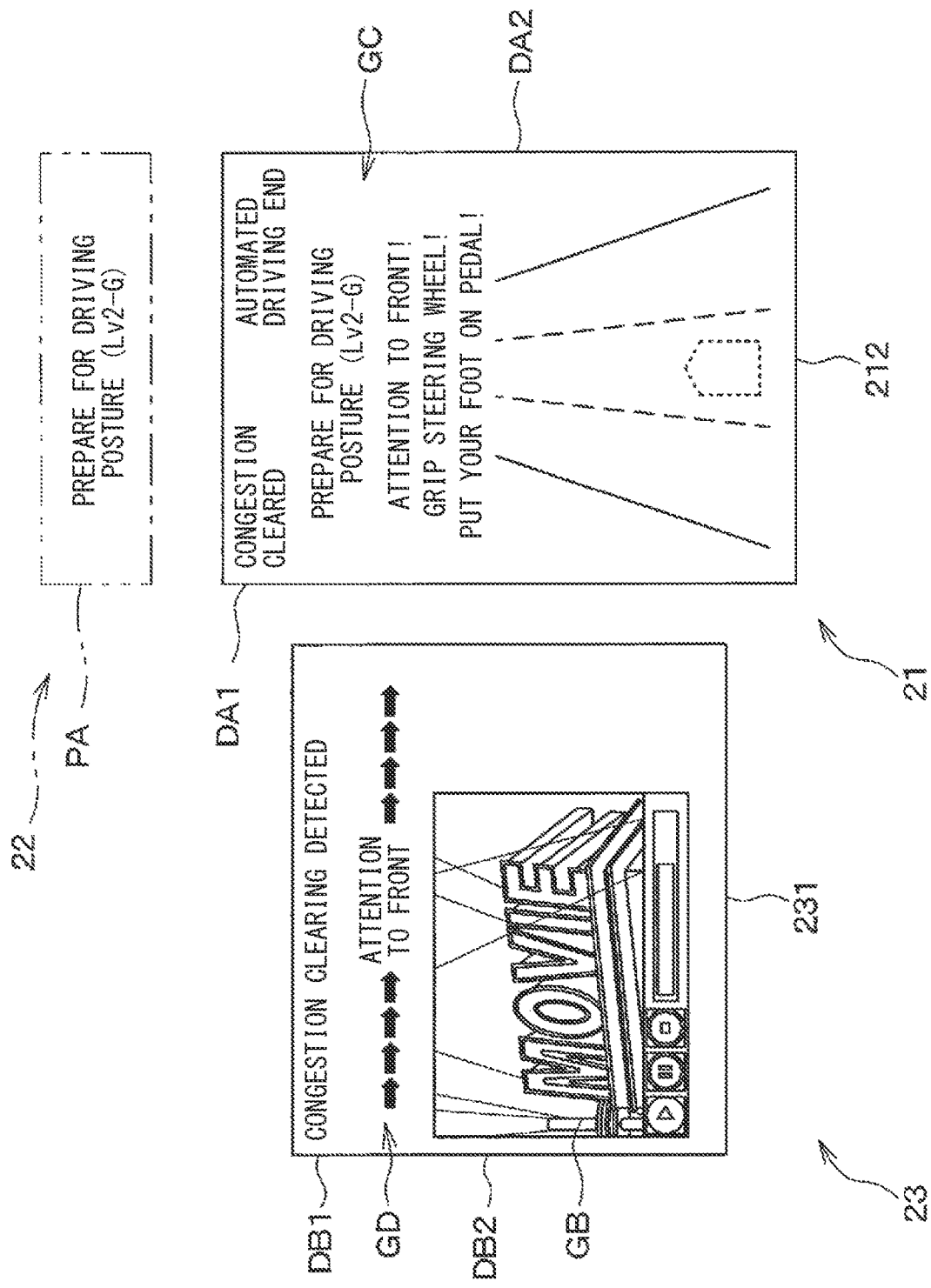
FIG. 5 is a schematic view illustrating a display example of the HMI device according to the first embodiment.

FIG. 5 illustrates a display example in a case where automated driving transitions to Level 2 [G mode] when the congestion clearing is detected while video content is being viewed with the CID device 23 as a second task. In FIG. 5, "Lv" is an abbreviation of "Level". "Level 2 [G mode]" is abbreviated as "Lv2-G". The same applies to FIG. 6 and the like.

In this case, as illustrated in FIG. 5, on the meter display 212, character information that is "congestion cleared, automated driving ended" is displayed in the level information display area DA1. This character information includes attention information for calling attention to congestion clearing and level-related information for clearly indicating a transition or a change of the driving automation level. In the driving information display area DA2, first attention information display GC including character information that are "prepare for driving posture (Lv2-G)", "attention to front!", "grip steering wheel!", and "put your foot on pedal!" is displayed. The character information included in this first attention information display GC includes attention information for requiring or calling attention to driving changeover to the driver. Attention information that is "prepare for driving posture (Lv2-G)" is displayed also in the projection area PA of the HUD device 22.

In the information display area DB1 in the CID display 231, attention information for calling attention to congestion clearing that is "congestion clearing detected" is displayed. In the screen area DB2, second attention information display GD that is "→→→→attention to front →→→→" is displayed up in the second task screen GB. The second attention information display GD is display for urging the driver to transfer the authority related to monitoring of the driving environment or calling attention. Alternatively, the second attention information display GD is display for urging visual check on the HUD device 22 and the meter display 212, which are display equipment that display information related to driving operation. At this time, in order to display, and improve the visibility of, the second attention information display GD, the second task screen GB is displayed in a reduced size smaller than the normal size illustrated in FIG. 4.

An appropriate presentation mode of attention information may vary depending on driver behavior. Specifically, for example, when the driver is executing a second task using the CID device 23, it is effective to present attention information by the CID device 23 as in the example illustrated in FIG. 5. On the other hand, for example, when the driver is executing a second task using the terminal device 24, presentation of attention information by the CID device 23 is not necessarily effective.

Therefore, the display control unit 257, that is, the attention information presentation unit 259 presents attention information in a presentation mode corresponding to the driver behavior acquired by the second behavior acquisition unit 253. That is, the attention information presentation unit 259 alters the presentation mode of the attention information depending on the driver behavior acquired by the second behavior acquisition unit 253. Specifically, the second behavior acquisition unit 253 acquires the visual line direction of the driver as driver behavior. Then, the attention information presentation unit 259 alters the information presentation device that presents the attention information depending on the visual line direction of the driver acquired by the second behavior acquisition unit 253.

Specifically, in a case where it is determined that the visual line of the driver is directed to the CID device 23, the attention information presentation unit 259 causes the CID device 23 to present the attention information. On the other hand, in a case where it is determined that the visual line of the driver is directed to the terminal device 24, the attention information presentation unit 259 presents the attention information to the terminal device 24. Note that the case where the visual line of the driver is directed to the terminal device 24 refers to a case where at least the following condition X1 and condition X2 are satisfied. Condition X1: By near field communication, the HMI control device 25 detects that the terminal device 24 is being operated. Condition X2: The visual line of the driver is not directed to any of the meter panel 21, the projection area PA in the HUD device 22, and the CID device 23.

Figure 6:
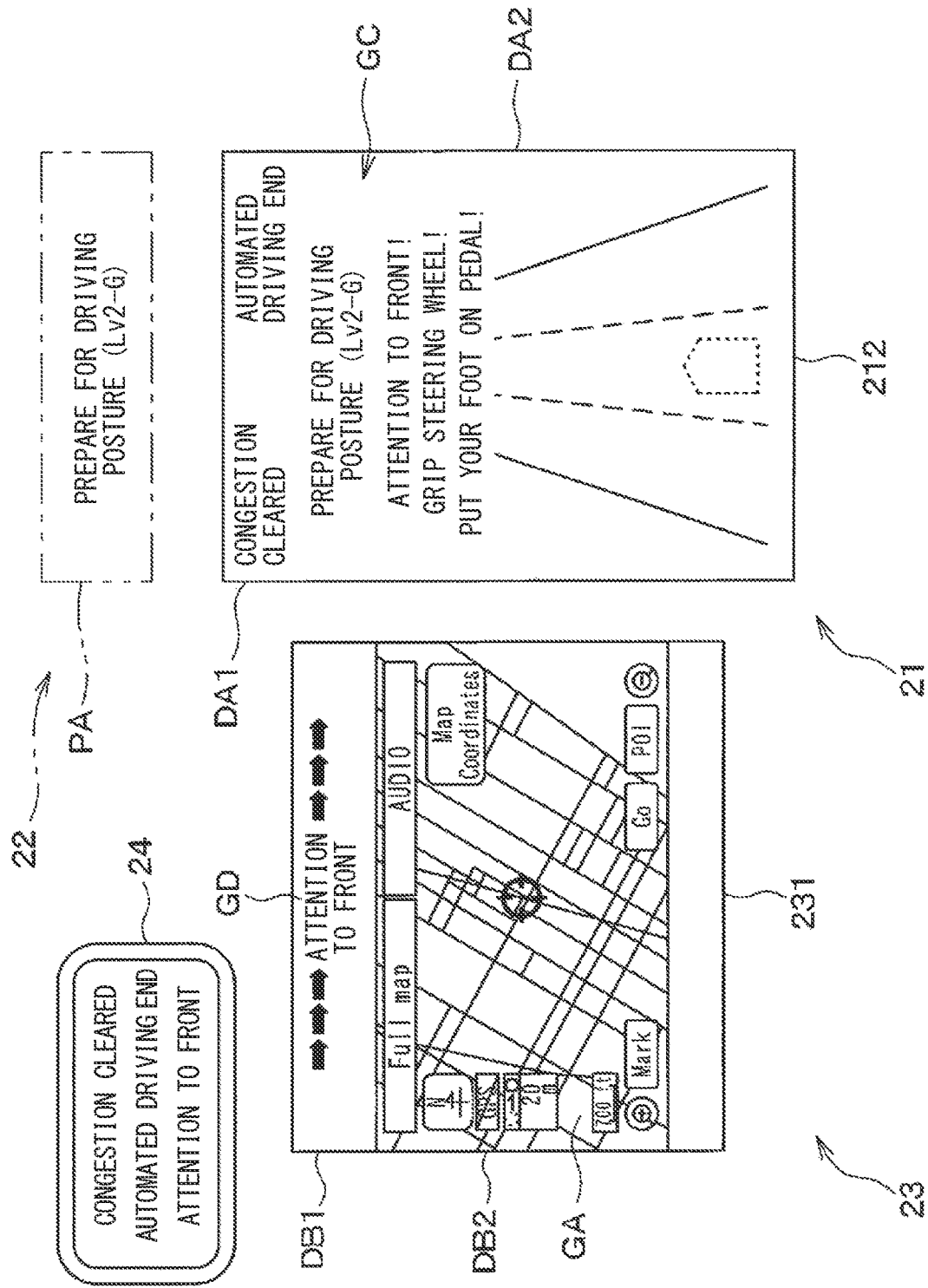
FIG. 6 is a schematic view illustrating a display example of the HMI device according to the first embodiment.

FIG. 6 illustrates a display example in a case where automated driving transitions to Level 2 [G mode] when the congestion clearing is detected while the terminal device 24 is being operated as a second task. Information presentation content by the meter display 212 and the HUD device 22 in this case are similar to those in the case of FIG. 5.

In the example of FIG. 6, the second task is not one that uses the CID device 23 but one that uses the terminal device 24. Therefore, in this example, the navigation screen GA is displayed in the screen area DB2. The navigation screen GA is displayed in a normal size. In the information display area DB1, the second attention information display GD that is "→→→→attention to front →→→→" is displayed up in the navigation screen GA. On the other hand, the terminal device 24 executes presentation operation of the attention information that is "congestion cleared, automated driving ends, attention to front" in cooperation with the HMI control device 25.

(Acceleration Approval)

With congestion clearing, the vehicle speed of the subject vehicle can increase. Specifically, for example, when the driving automation level is transitioned from automated driving in congestion to Level 2 [G mode] accompanying congestion clearing, the driving control device 18 can execute acceleration control. At this time, prior to execution of the acceleration control, it is preferable to request the driver for acceleration approval, which is to approve acceleration of the subject vehicle. This makes it possible to avoid offering the driver an uneasy feeling or an uncomfortable feeling as much as possible as much as possible due to unexpected acceleration.

Therefore, the attention information presentation unit 259 presents, by the HMI device 20, attention information for calling attention to execution of acceleration control in addition to the attention information for calling the driver's attention for congestion clearing. That is, the attention information presentation unit 259 causes the HMI device 20 to execute necessary information presentation in order to receive the acceleration approval by the driver after the presentation of the attention information regarding congestion clearing.

Figure 7:
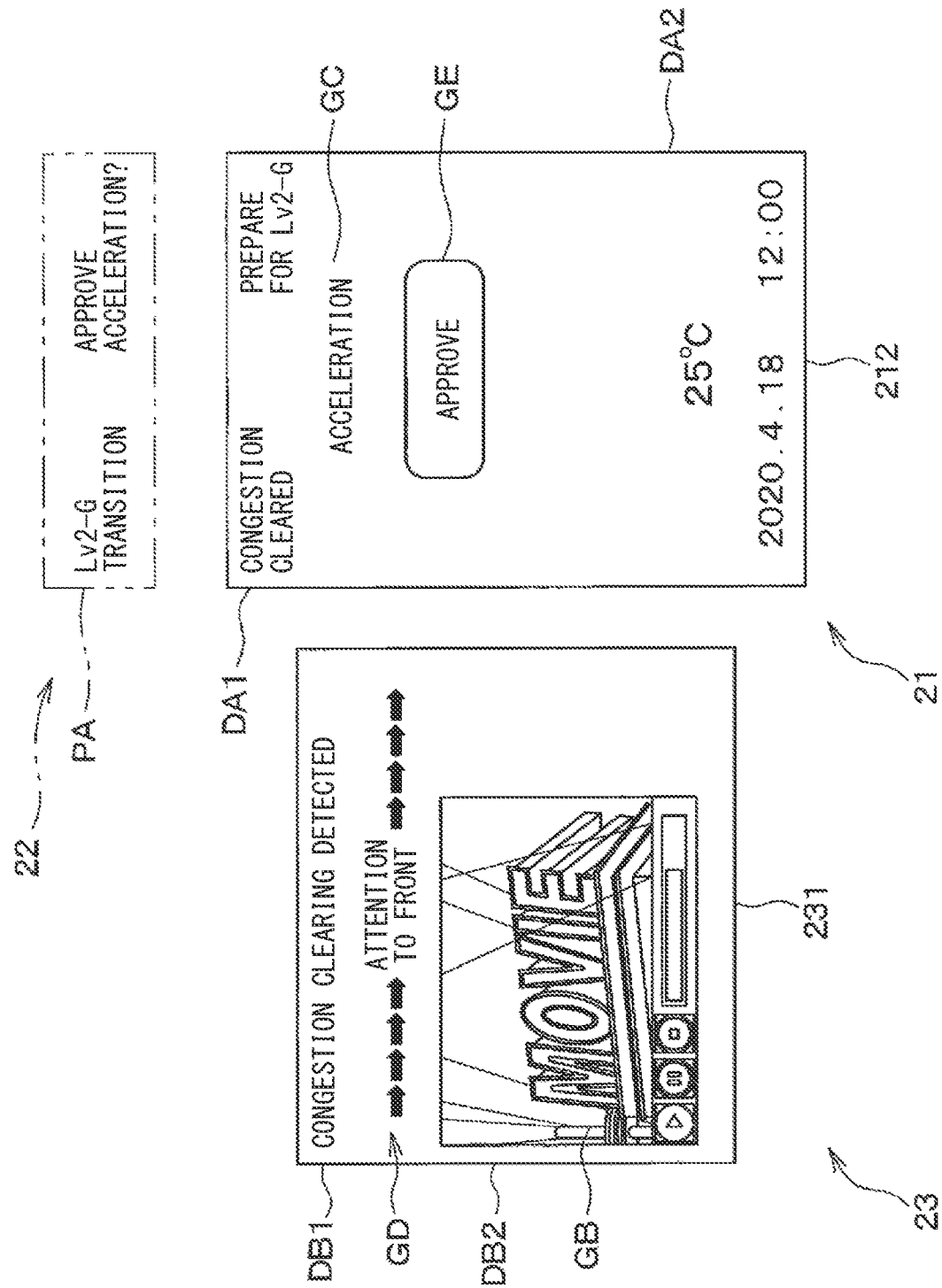
FIG. 7 is a schematic view illustrating a display example of the HMI device according to the first embodiment.

FIG. 7 illustrates a display example for receiving acceleration approval by the driver at the time when automated driving transitions to Level 2 [G mode] when the congestion clearing is detected while video content is being viewed with the CID device 23 as a second task. That is, FIG. 7 corresponds to a display example of later time following the display example illustrated in FIG. 5.

In this case, as illustrated in FIG. 7, in the meter display 212, the character information that is "congestion clearing, prepare for Lv2-G" is displayed in the level information display area DA1. This character information includes attention information for calling attention to congestion clearing, level-related information for clearly indicating a transition or a change of the driving automation level, and attention information for urging driving changeover. In the driving information display area DA2, the first attention information display GC including attention information related to acceleration that is "accelerating" is displayed.

Furthermore, in the driving information display area DA2, input request display GE indicating an approval button having a character string "approve" is displayed. The approval button can be operated for selection and input by using, for example, the meter switch 213 or a steering switch. The operation reception unit 255 receives operation of the approval button. Also in the projection area PA in the HUD device 22, attention information that is "Lv2-G transition, acceleration approved?" for urging approval button operation is displayed together with a transition notification of the driving automation level.

The operation notification unit 256 notifies the driving control device 18 of the operation state of the approval button received by the operation reception unit 255. That is, the operation notification unit 256 as the acceleration approval notification unit notifies the driving control device 18 of the acquisition situation of acceleration approval behavior. The acceleration approval behavior is driver behavior corresponding to acceleration approval by the driver, and is specifically operation behavior on the approval button.

The first behavior acquisition unit 183 acquires the operation state of the approval button notified from operation notification unit 256. That is, the first behavior acquisition unit 183 acquires the acceleration approval behavior after the HMI device 20 presents the attention information for calling attention to congestion clearing and the attention information regarding acceleration.

In a case where the acceleration approval behavior is acquired, the driver has already operated the approval button for acceleration approval. Therefore, in this case, it is assumed that the driver has mentally prepared for execution of acceleration control in the subject vehicle. On the other hand, in a case where the acceleration approval behavior is not acquired because the driver does not execute operation of the approval button, if the acceleration control similar to that in a case where the acceleration approval behavior is acquired is executed, unexpected acceleration can offer the driver an uneasy feeling or an uncomfortable feeling.

Therefore, the vehicle control unit 185 in the driving control device 18 controls the acceleration mode of the subject vehicle in such a manner to relax the acceleration mode more in a case where the acceleration approval behavior is not acquired than in a case where the acceleration approval behavior is acquired. That is, the acquisition situation of the acceleration approval behavior is included in the execution condition of driving control that relaxes the acceleration mode more in a case where the acceleration approval behavior is not acquired than in a case where the acceleration approval behavior is acquired by the driving control device 18.

As described above, in the present embodiment, the attention information presentation and the approval button display regarding automated driving end and acceleration control are executed using a front display device that enters the field of view of the driver in the driving posture. The "front display device" is a display device arranged in front of the driver, that is, on the travel destination side of the subject vehicle with respect to the driver, and is specifically the meter panel 21 and the HUD device 22. In the present embodiment, the CID display 231 including the second task screen GB displays the second attention information display GD for guiding the visual line to the front display device. Due to this, the driver's attention is directed forward and the driver's riding posture is brought close to the driving posture, whereby driving changeover preparation can be well promoted.

Thus, according to the present embodiment, it is possible not to offer the driver an uneasy feeling or an uncomfortable feeling as much as possible. The driver's consciousness regarding automated driving end and acceleration control is well enhanced. Therefore, according to the present embodiment, it becomes possible to perform driving changeover more smoothly.

(End of Second Task)

When the automated driving in congestion ends due to congestion clearing and the driving automation level decreases, the second task becomes unavailable. Therefore, it is necessary to end the second task when the automated driving in congestion ends.

On the other hand, as described above, the driver's consciousness at the end of the automated driving in congestion due to the congestion clearing is different depending on the driver's behavior at that time. Therefore, it becomes possible to achieve smoother driving changeover by considering the driver behavior such as a usage mode of the second task.

For example, the appropriate end timing of the second task may vary depending on driver behavior. Therefore, in the present embodiment, the display control unit 257, that is, the second task control unit 258 ends the second task at an end timing corresponding to the driver behavior after the presentation of the attention information acquired by the second behavior acquisition unit 253.

Specifically, for example, when driving changeover is not ready, the driver needs to prioritize the driving changeover preparation over the second task. On the other hand, when the driving changeover is ready, there is no problem in the driving changeover even if the second task can be used as late as possible. Furthermore, in a case where a subject vehicle passenger other than the driver exists and a display device capable of viewing video content or the like by the passenger is not mounted other than the CID device 23, it is preferable that second task content such as video content can be viewed as late as possible.

Therefore, when the driver behavior after presentation of the attention information acquired by the second behavior acquisition unit 253 is handover behavior, the second task control unit 258 ends the second task later than when the driver behavior is non-handover behavior. The "handover behavior" is at least part of driving changeover behavior, and is typically behavior of taking a driving posture. This makes it possible to urge the driver to perform driving changeover operation when the driving changeover is not ready, and improves convenience when the driving changeover preparation is ready.

For example, after the display illustrated in FIG. 5, when handover behavior is detected and thus it is determined that the driving changeover is ready, the display mode changes from as in FIG. 5 to as in FIG. 7. In this case, as illustrated in FIGS. 5 and 7, the display of the second task screen GB is maintained also during reception of the acceleration approval operation.

Figure 8:
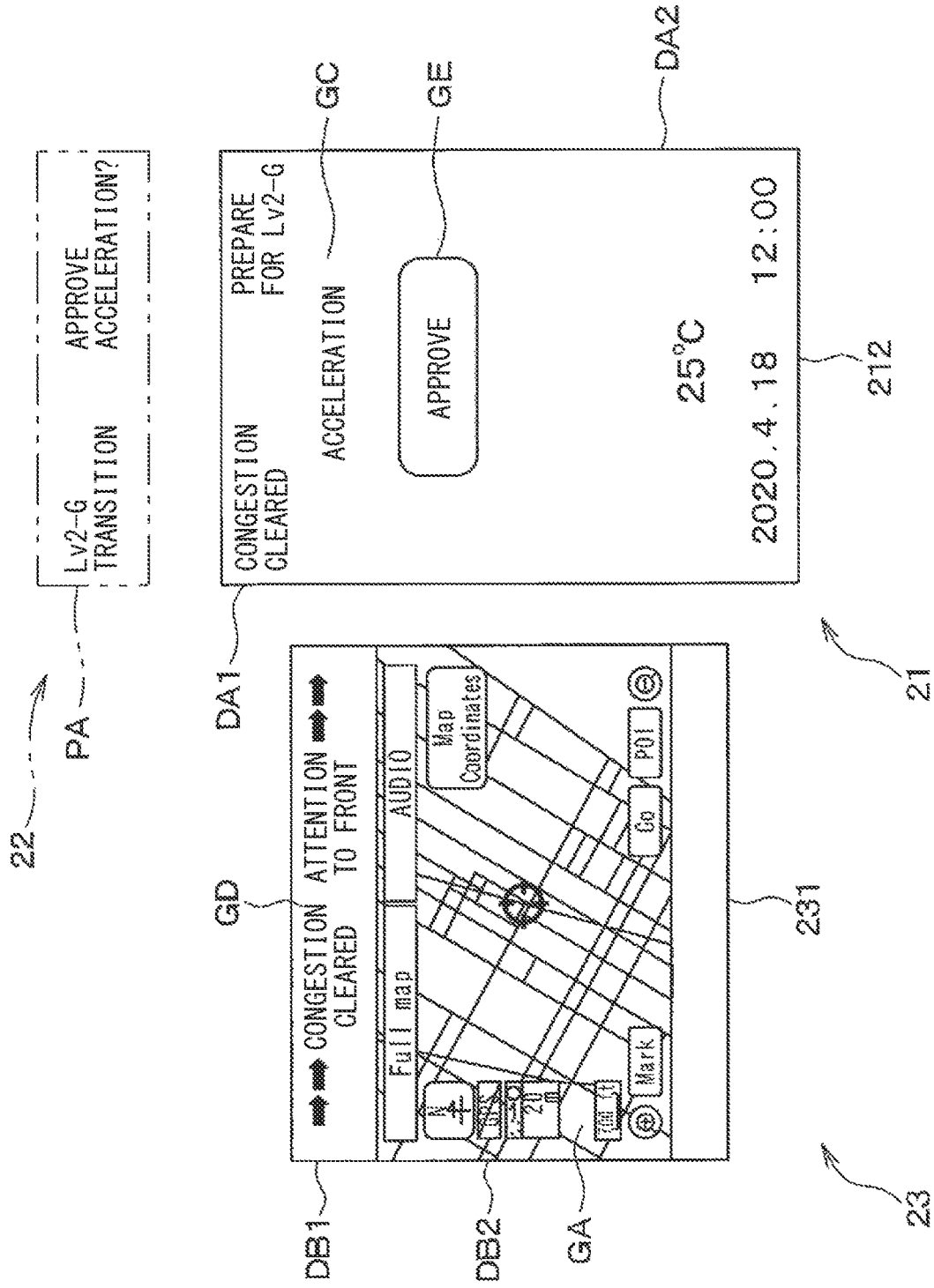
FIG. 8 is a schematic view illustrating a display example of the HMI device according to the first embodiment.

On the other hand, after the display illustrated in FIG. 5, when handover behavior is not detected and thus it is determined that the driving changeover is not ready, the display mode changes from as in FIG. 5 to not as in FIG. 7 but as in FIG. 8. In this case, at the time point of start of reception of the acceleration approval operation, the second task is ended, and the display of the screen area DB2 in the CID display 231 is switched from the second task screen GB to the navigation screen GA. In the information display area DB1, the second attention information display GD including attention information for calling attention to congestion clearing and driving changeover that is "→→ congestion clearing, attention to front →→" is displayed. Information presentation content by the meter display 212 and the HUD device 22 are similar to those in the case of FIG. 7.

(Operation Example)

Figure 9A:
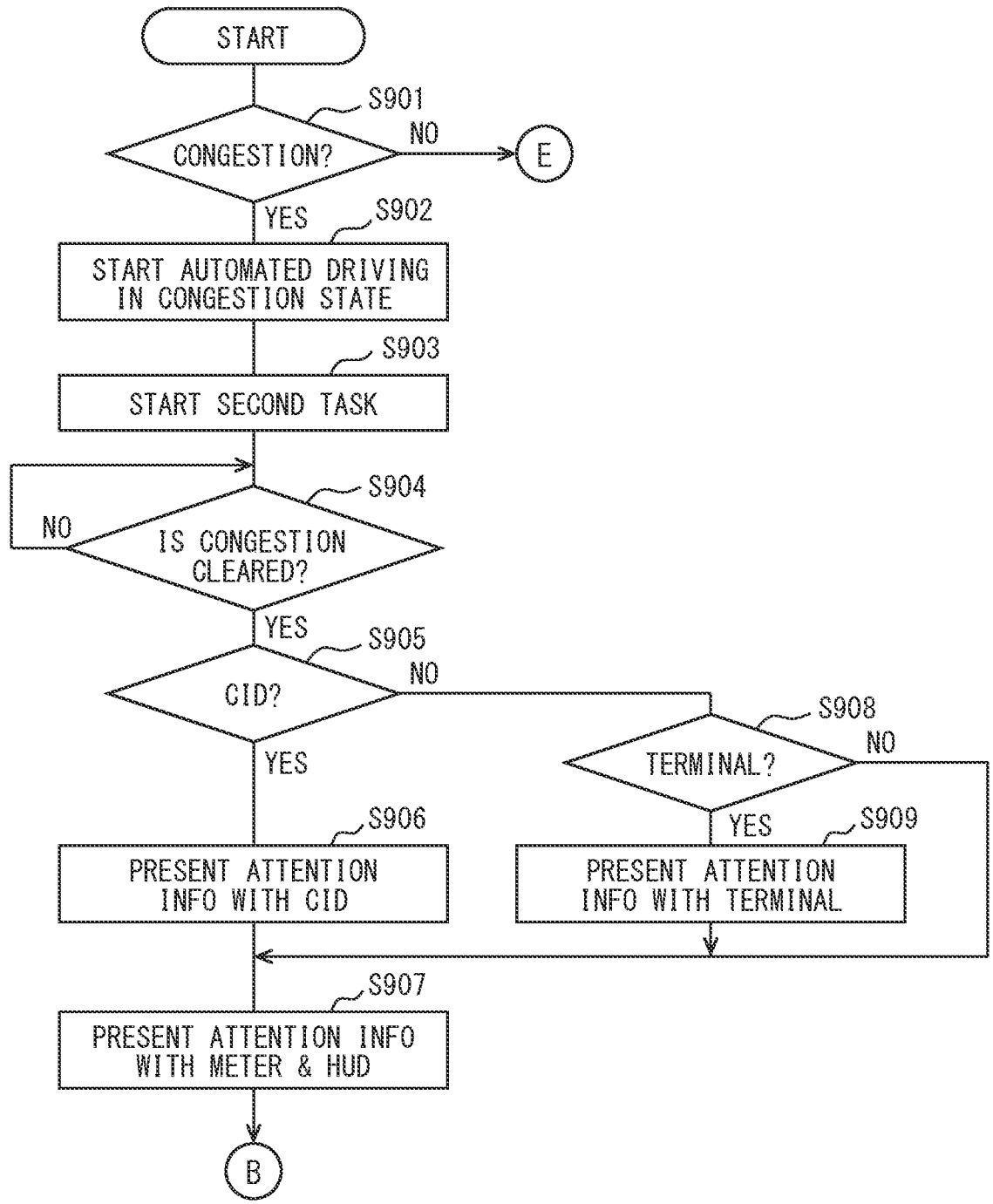
FIG. 9A is a flowchart illustrating an outline of operation of the in-vehicle system according to the first embodiment.

One specific example of the control operation or the control method described above and a control program corresponding to them will be described with reference to the flowcharts illustrated in FIGS. 9A, 9B, and 10 and the time chart illustrated in FIG. 9C. In the illustrated flowcharts, "S" is an abbreviation of "step". The device configuration, the control operation, the control method, and the control program according to the present embodiment will sometimes be simply collectively referred to as "the present embodiment" below.

The operation examples illustrated in FIGS. 9A, 9B, 9C, and 10 illustrate a case where the automated driving in congestion starts, then ends due to congestion clearing, and transitions to Level 2 [G mode]. In the present operation example, first, in step 901, the in-vehicle system 10 determines whether or not the subject vehicle has entered a congestion section.

When the subject vehicle has entered the congestion section (that is, step 901: YES), the processing proceeds to step 902 and thereafter. On the other hand, when the subject vehicle has not entered the congestion section (that is, step 901: NO), the processing in step 902 and thereafter are skipped, and this operation once ends.

In step 902, the in-vehicle system 10 starts automated driving in congestion. Then, the second task becomes available. In a case where the driver desires to use the second task, the second task starts in step 903 by operation on the HMI device 20 by the driver.

In step 904, the in-vehicle system 10 determines whether or not the congestion is cleared. Whether or not the congestion is cleared is determined in consideration of the following elements (A) to (C), for example. (A) Existence state of other traveling vehicles including a preceding vehicle around the subject vehicle. (B) Whether or not the subject vehicle is expected to accelerate to equal to or higher than a predetermined reference speed (for example, 40 km/h). (C) Whether or not congestion information has been acquired in the subject vehicle and the acquired congestion information indicates that the subject vehicle exists in the congestion section.

While the congestion is not determined to have been cleared, the determination result of step 904 becomes "NO", and the processing does not proceed to step 905. On the other hand, when the congestion is determined to have been cleared (that is, step 904: YES), the processing proceeds to step 905.

In step 905, the in-vehicle system 10 determines whether or not the driver is visually recognizing the CID display 231. When the driver is visually recognizing the CID display 231 (that is, step 905: YES), the processing proceeds to steps 906 and 907.

In step 906, the in-vehicle system 10 presents attention information on the CID device 23. In step 907, the in-vehicle system 10 presents attention information on the meter panel 21 and the HUD device 22.

When the driver is not visually recognizing the CID display 231 (that is, step 905: NO), the processing proceeds to step 908. In step 908, the in-vehicle system 10 determines whether or not the driver is visually recognizing the terminal device 24.

When the driver is visually recognizing the terminal device 24 (that is, step 908: YES), the processing proceeds to step 909 and then proceeds to step 907. In step 909, the in-vehicle system 10 presents the attention information on the terminal device 24. When the driver is not visually recognizing the terminal device 24 (that is, step 908: NO), the processing of step 909 is skipped, and the processing proceeds to step 907.

Thus, in the present embodiment, when the driver is visually recognizing the CID display 231, the HMI control device 25 presents the attention information on the meter panel 21, the HUD device 22, and the CID device 23. On the other hand, when the driver is visually recognizing terminal device 24, the HMI control device 25 presents the attention information on the meter panel 21, the HUD device 22, and the terminal device 24. When the driver is visually recognizing neither the CID display 231 nor the terminal device 24, there is a high possibility that the driver is visually recognizing the front. Therefore, in this case, the HMI control device 25 presents the attention information on the meter panel 21 and the HUD device 22.

After the processing of step 907, the processing proceeds to step 910. In step 910, the in-vehicle system 10 determines whether or not the driver takes a predetermined driving posture corresponding to Level 2 [G mode] by handover behavior.

When the driver takes the driving posture by presentation of the attention information (that is, step 910: YES), the processing proceeds to steps 911 and 912. In step 911, the in-vehicle system 10 starts the speed recovery processing illustrated in FIG. 10. The speed recovery processing will be described later.

In step 912, the in-vehicle system 10 determines whether or not a vehicle speed V of the subject vehicle has become equal to or greater than a predetermined value V0. The predetermined value V0 is, for example, 40 km/h. While the vehicle speed V is less than the predetermined value V0, the determination result of step 912 becomes "NO", and the processing does not proceed to step 913. On the other hand, when the vehicle speed V becomes equal to or higher than the predetermined value V0, the determination result of step 912 becomes "YES", and the processing proceeds to step 913 and thereafter.

In step 913, the in-vehicle system 10 ends the second task. In step 914, the in-vehicle system 10 ends the speed recovery processing. In step 915, the in-vehicle system 10 starts Level 2 [G mode].

On the other hand, when the driver does not take the driving posture even if the attention information is presented (that is, step 910: NO), the processing proceeds to steps 916 and 917, and then the processing proceeds to steps 914 and 915. In step 916, the in-vehicle system 10 ends the second task. In step 917, the in-vehicle system 10 starts the speed recovery processing.

Thus, in the present embodiment, when the driver takes the driving posture by the presentation of the attention information, the second task is ended after the vehicle speed V of the subject vehicle becomes equal to or higher than the predetermined value V0 by the speed recovery processing. On the other hand, in the present embodiment, when the driver does not take the driving posture even if the attention information is presented, the second task is immediately ended without waiting for the vehicle speed V of the subject vehicle to become equal to or higher than the predetermined value V0 by the speed recovery processing. FIG. 9C is an explanatory diagram for visually illustrating, in an easy-to-understand manner, a difference between second task end timing and speed recovery timing depending on whether or not the driver takes the driving posture by the presentation of the attention information. In FIG. 9C, the vertical axis represents the vehicle speed, and the horizontal axis represents the elapse of time. Steps corresponding to the speed recovery start timing are indicated by a broken line square and steps corresponding to the second task end timing are indicated by a solid line square in correspondence with the elapse of time on the horizontal axis. As illustrated in FIG. 9C, the second task end timing is different between a case where the driver takes the driving posture by presentation of the attention information (that is, step 910: YES→steps 911 and 913) and a case where the driver does not take the driving posture even if the attention information is presented (that is, step 910: NO→steps 916 and 917). Specifically, in the former case, the second task can be used later than in the latter case.

Figure 10:
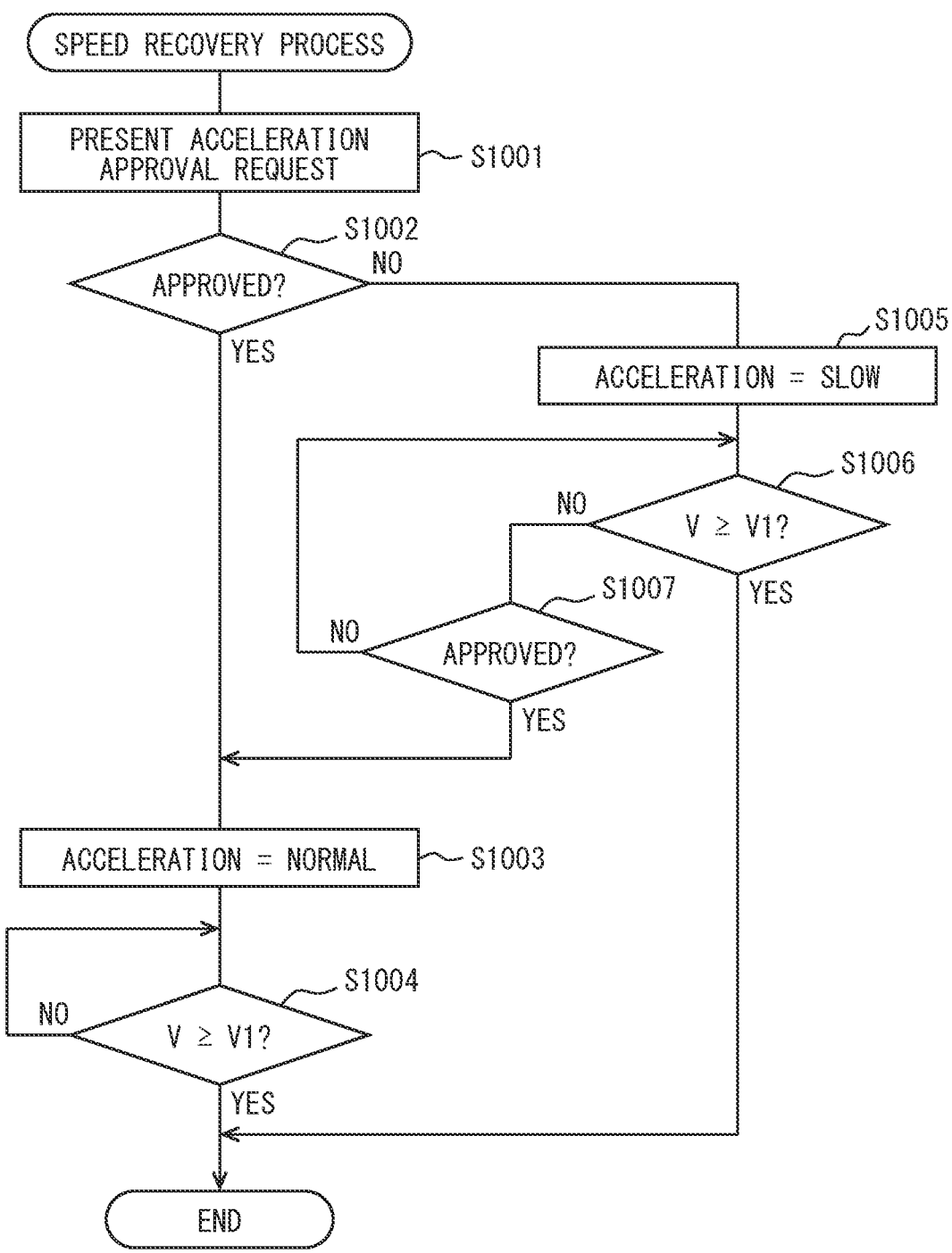
FIG. 10 is a flowchart illustrating an outline of the operation of the in-vehicle system according to the first embodiment.

FIG. 10 illustrates speed recovery processing at the time of congestion clearing. When the speed recovery processing starts, first, in step 1001, the in-vehicle system 10 presents an acceleration approval request to the driver. The "acceleration approval request" is to urge the driver to perform acceleration approval behavior. Specifically, as illustrated in FIGS. 7 and 8, the "acceleration approval request" includes displaying the input request display GE indicating the approval button having the character string "approve" in line with the first attention information display GC that is "accelerating".

Next, in step 1002, the in-vehicle system 10 determines whether or not the acceleration approval behavior, that is, the operation behavior of the approval button has been acquired. When the acceleration approval behavior is acquired (that is, step 1002: YES), the processing of steps 1003 and 1004 is executed.

In step 1003, the in-vehicle system 10 sets the acceleration mode, that is, the acceleration degree in the speed recovery processing to the normal mode. In step 1004, the in-vehicle system 10 determines whether or not the vehicle speed V of the subject vehicle has become equal to or greater than a predetermined value V1. The predetermined value V1 is, for example, 60 km/h. While the vehicle speed V is less than the predetermined value V1, the determination result of step 1004 becomes "NO", and the speed recovery processing does not end. On the other hand, when the vehicle speed V becomes equal to or higher than the predetermined value V1, the determination result of step 1004 becomes "YES", and the speed recovery processing ends (that is, step 914 in FIG. 9B).

When the acceleration approval behavior is not acquired (that is, step 1002: NO), the processing proceeds to steps 1005 and 1006. In step 1005, the in-vehicle system 10 sets the acceleration mode in the speed recovery processing to be more relaxed than in the normal mode. In step 1006, the in-vehicle system 10 determines whether or not the vehicle speed V of the subject vehicle has become equal to or greater than the predetermined value V1.

When the vehicle speed V of the subject vehicle is less than the predetermined value V1 (that is, step 1006: NO), the processing proceeds to step 1007. In step 1007, the in-vehicle system 10 determines whether or not the acceleration approval behavior has been acquired. When the acceleration approval behavior is acquired (that is, step 1007: YES), the processing proceeds to step 1003. On the other hand, when the acceleration approval behavior is not acquired (that is, step 1007: NO), the processing returns to step 1006. When the vehicle speed V reaches the predetermined value V1 without performing the acceleration approval operation (that is, step 1006: YES), the speed recovery processing ends (that is, step 914 in FIG. 9B).

Thus, while the driver does not perform acceleration approval operation, the speed recovery processing continues in an acceleration mode that is more relaxed than the normal mode. On the other hand, when the driver performs acceleration approval operation, the acceleration mode is set to the normal mode, and the speed recovery processing is executed in the normal mode.

Second Embodiment

Hereinafter, the second embodiment will be described with reference to FIG. 11. In the following description of the second embodiment, parts different from those of the first embodiment will be mainly described. In the first embodiment and the second embodiment, the same or equivalent parts are given the same reference numerals. Therefore, in the following description of the second embodiment, regarding components having the same reference numerals as those in the first embodiment, the description in the first embodiment can be appropriately incorporated unless there is a technical contradiction or a special additional description. The same applies to the third embodiment and the like described later.

The configuration of the in-vehicle system 10 according to the present embodiment is similar to that of the first embodiment. That is, the vehicle 1 and the in-vehicle system 10 according to the present embodiment have the configurations illustrated in FIGS. 1 and 2. However, the present embodiment is slightly different from the first embodiment in the operation mode and the functional configuration corresponding to this.

As described above, the consciousness of the driver who is using the second task becomes detached from the driving of the subject vehicle, or the riding posture becomes detached from the driving posture. The degree of the detachment may vary depending on the type of the second task. For example, in the second task using the terminal device 24, the field of view of the driver is further away from the front of the subject vehicle and the riding posture is also further away from the driving posture than in the second task using the CID device 23. In particular, during game operation using the terminal device 24, driver's consciousness and field of view are completely away from driving.

Therefore, in the present embodiment, the second task control unit 258 alters the end timing of the second task depending on the display device that executes the second task in the HMI device 20. Specifically, for example, the second task control unit 258 ends the second task using the terminal device 24 earlier than the second task using the CID device 23.

Figure 11:
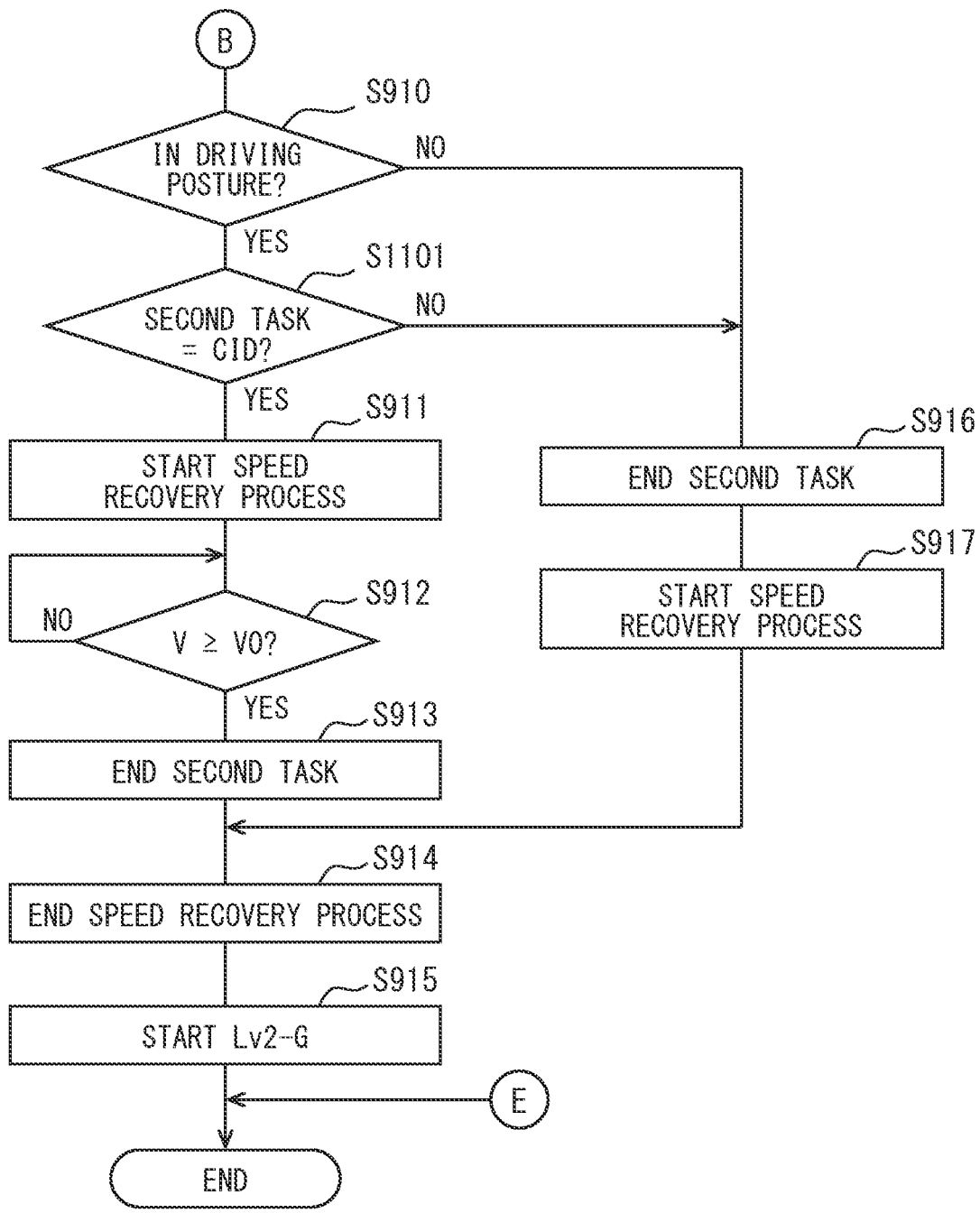
FIG. 11 is a flowchart illustrating an outline of operation of an in-vehicle system according to a second embodiment.

FIG. 11 is a flowchart illustrating an operation example corresponding to the present embodiment. The flowchart illustrated in FIG. 11 is the flowchart illustrated in FIG. 9B with partial modification. That is, the determination content of step 910 in FIG. 11 is similar to that in FIG. 9B. The processing content of steps 911 to 917 is similar to that in FIG. 9B.

In the present embodiment, processing in a case where the determination result of step 910 is "YES" is different from that of the first embodiment. Specifically, processing of step 1101 is inserted between steps 910 and 911. In step 1101, the in-vehicle system 10 determines whether or not the display device that executes the second task is the CID device 23. When the display device that executes the second task is the CID device 23 (that is, step 1101: YES), the processing proceeds to step 911. On the other hand, when the display device that executes the second task is not the CID device 23 (that is, step 1101: NO), the processing proceeds to step 916.

That is, in the present embodiment, when the display device that executes the second task is the CID device 23, the second task is ended after the vehicle speed V of the subject vehicle becomes equal to or higher than the predetermined value V0 by the speed recovery processing. On the other hand, in the present embodiment, when the display device that executes the second task is not the CID device 23, the second task is immediately ended without waiting for the vehicle speed V of the subject vehicle to become equal to or higher than the predetermined value V0 by the speed recovery processing.

Thus, in the present embodiment, the end timing of the second task is set depending on the type of the second task being executed. Therefore, according to the present embodiment, it is possible to more smoothly transfer the authority to the driver at the end of automated driving.

Third Embodiment

Hereinafter, the third embodiment will be described with reference to FIG. 12. The configuration of the in-vehicle system 10 according to the present embodiment is similar to that of the first embodiment and the second embodiment. The present embodiment is slightly different from the first embodiment and the second embodiment in the operation mode and the functional configuration corresponding to this.

When the driver takes a driving posture by presentation of attention information related to congestion clearing and the end of automated driving that accompanies, driver's consciousness is often directed to driving as it is. In this case, even if the second task is immediately ended, there is a low possibility to offer the driver a strange feeling or an uncomfortable feeling. Therefore, in the present embodiment, when the driver takes the driving posture by presentation of the attention information, the second task is immediately ended.

Figure 12:
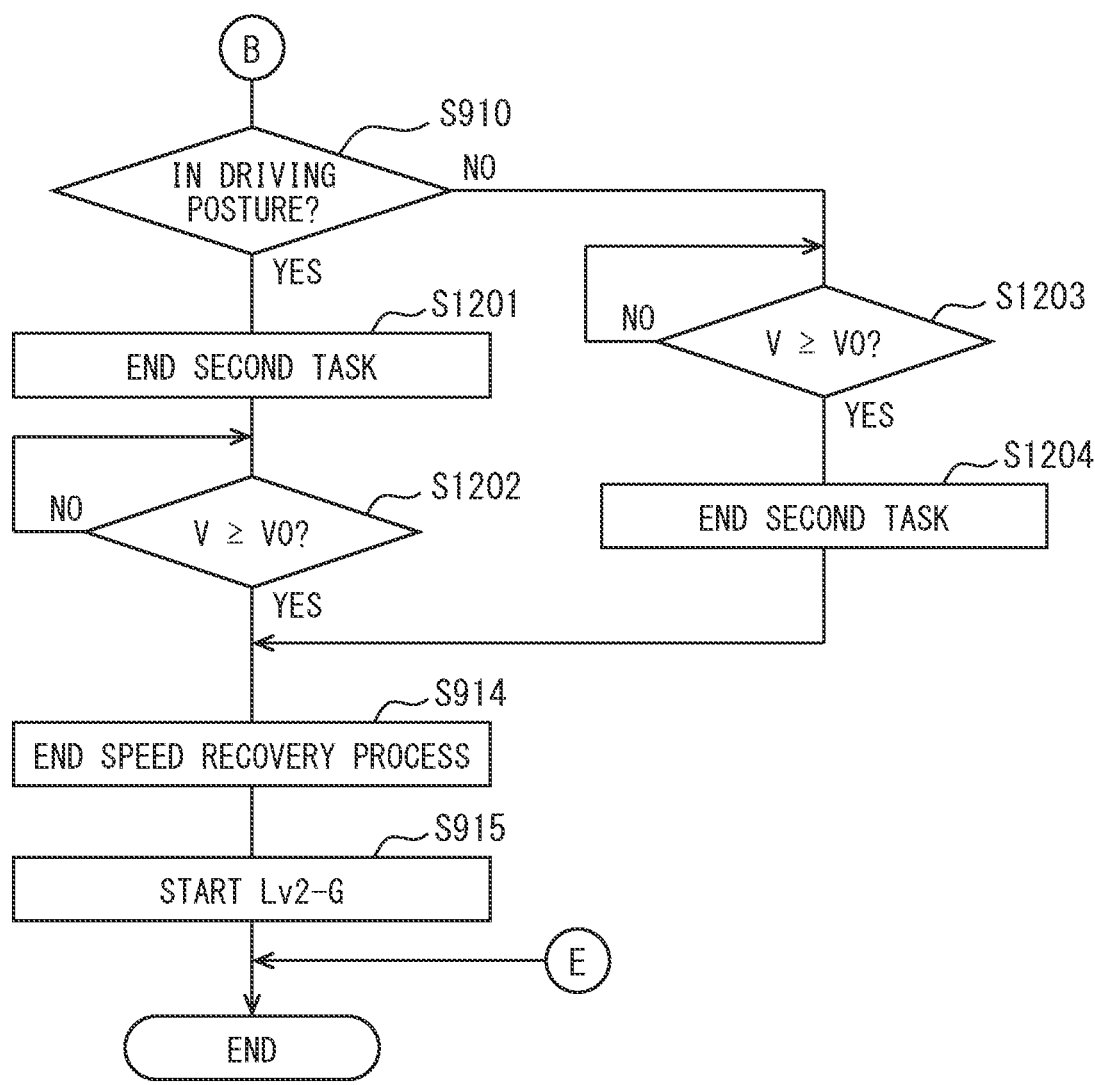
FIG. 12 is a flowchart illustrating an outline of operation of an in-vehicle system according to a third embodiment.

FIG. 12 is a flowchart illustrating an operation example corresponding to the present embodiment. The flowchart illustrated in FIG. 12 is the flowchart illustrated in FIG. 9B with partial modification. That is, the determination content of step 910 in FIG. 12 is similar to that in FIG. 9B. The processing content of steps 914 and 915 is similar to that in FIG. 9B.

When the driver takes the driving posture by presentation of the attention information (that is, step 910: YES), the processing proceeds to steps 1201 and 1202, and then the processing proceeds to steps 914 and 915. In step 1201, the in-vehicle system 10 ends the second task. In step 1202, the in-vehicle system 10 determines whether or not the vehicle speed V of the subject vehicle has become equal to or greater than the predetermined value V0. While the vehicle speed V is less than the predetermined value V0, the determination result of step 1202 becomes "NO", and the processing does not proceed to step 914. When the vehicle speed V becomes equal to or higher than the predetermined value V0, the determination result of step 1202 becomes "YES", and the processing proceeds to step 914 and thereafter.

On the other hand, when the driver does not take the driving posture even if the attention information is presented (that is, step 910: NO), the processing proceeds to steps 1203 and 1204, and then the processing proceeds to steps 914 and 915. In step 1203, the in-vehicle system 10 determines whether or not the vehicle speed V of the subject vehicle has become equal to or greater than the predetermined value V0. While the vehicle speed V is less than the predetermined value V0, the determination result of step 1203 becomes "NO", and the processing does not proceed to step 1204. On the other hand, when the vehicle speed V becomes equal to or higher than the predetermined value V0, the determination result of step 1203 becomes "YES", and the processing proceeds to step 1204 and thereafter. In step 1204, the in-vehicle system 10 ends the second task.

Fourth Embodiment

Hereinafter, the fourth embodiment will be described with reference to FIGS. 13 to 15. The configuration of the in-vehicle system 10 according to the present embodiment is similar to that of the first embodiment and the like. The present embodiment is slightly different from the first embodiment and the like in the operation mode and the functional configuration corresponding to this.

As described above, when the driver approves acceleration at the time of speed recovery accompanying congestion clearing, the vehicle control unit 185 can recover the vehicle speed of the subject vehicle to a predetermined target vehicle speed relatively early without offering an uneasy feeling or the like to the subject vehicle passenger including the driver. On the other hand, in a case where the acceleration approval is not made, by relaxing the mode of speed recovery, that is, acceleration in a case where the acceleration approval has not been made more than in a case where the acceleration approval has been made, it is possible not to offer the subject vehicle passenger including the driver an uneasy feeling or an uncomfortable feeling as much as possible.

Therefore, when an early recovery of the vehicle speed is executed by the acceleration approval, it is desirable to cause the driver's consciousness and the riding posture to correspond to the driving at an early stage. Therefore, when the acceleration approval behavior for approving acceleration of the subject vehicle is acquired by the second behavior acquisition unit 253 after presentation of the attention information, the second task control unit 258 ends the second task earlier than when the acceleration approval behavior is not acquired.

Figure 13:
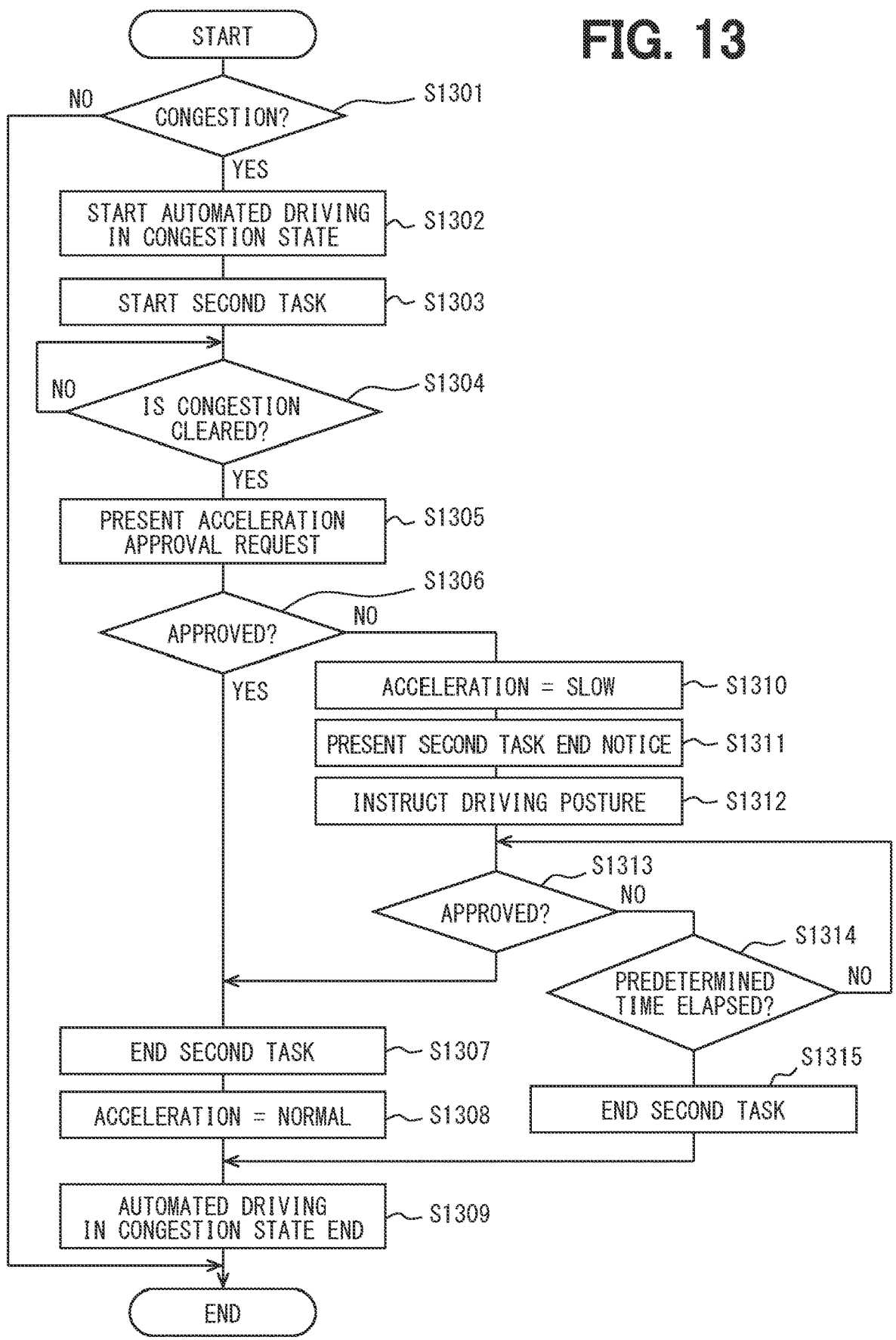
FIG. 13 is a flowchart illustrating an outline of operation of an in-vehicle system according to a fourth embodiment.

FIG. 13 is a flowchart illustrating an operation example corresponding to the present embodiment. In the present operation example, first, in step 1301, the in-vehicle system 10 determines whether or not the subject vehicle has entered a congestion section. The determination content of step 1301 is similar to that of step 901 in FIG. 9A.

When the subject vehicle has entered the congestion section (that is, step 1301: YES), the processing proceeds to step 1302 and thereafter. On the other hand, when the subject vehicle has not entered the congestion section (that is, step 1301: NO), the processing in step 1302 and thereafter are skipped, and this operation once ends.

In step 1302, the in-vehicle system 10 starts automated driving in congestion. Then, the second task becomes available. In a case where the driver desires to use the second task, the second task starts in step 1303 by operation on the HMI device 20 by the driver.

In step 1304, the in-vehicle system 10 determines whether or not the congestion is cleared. The determination content of step 1304 is similar to that of step 904 in FIG. 9A. While the congestion is not determined to have been cleared, the determination result of step 1304 becomes "NO", and the processing does not proceed to step 1305. On the other hand, when the congestion is determined to have been cleared (that is, step 1304: YES), the processing proceeds to step 1305.

In step 1305, the in-vehicle system 10 presents an acceleration approval request to the driver. FIG. 14 illustrates a display example in a case where automated driving transitions to Level 2 [G mode] when the congestion clearing is detected while video content is being viewed with the CID device 23 as a second task.

Figure 14:
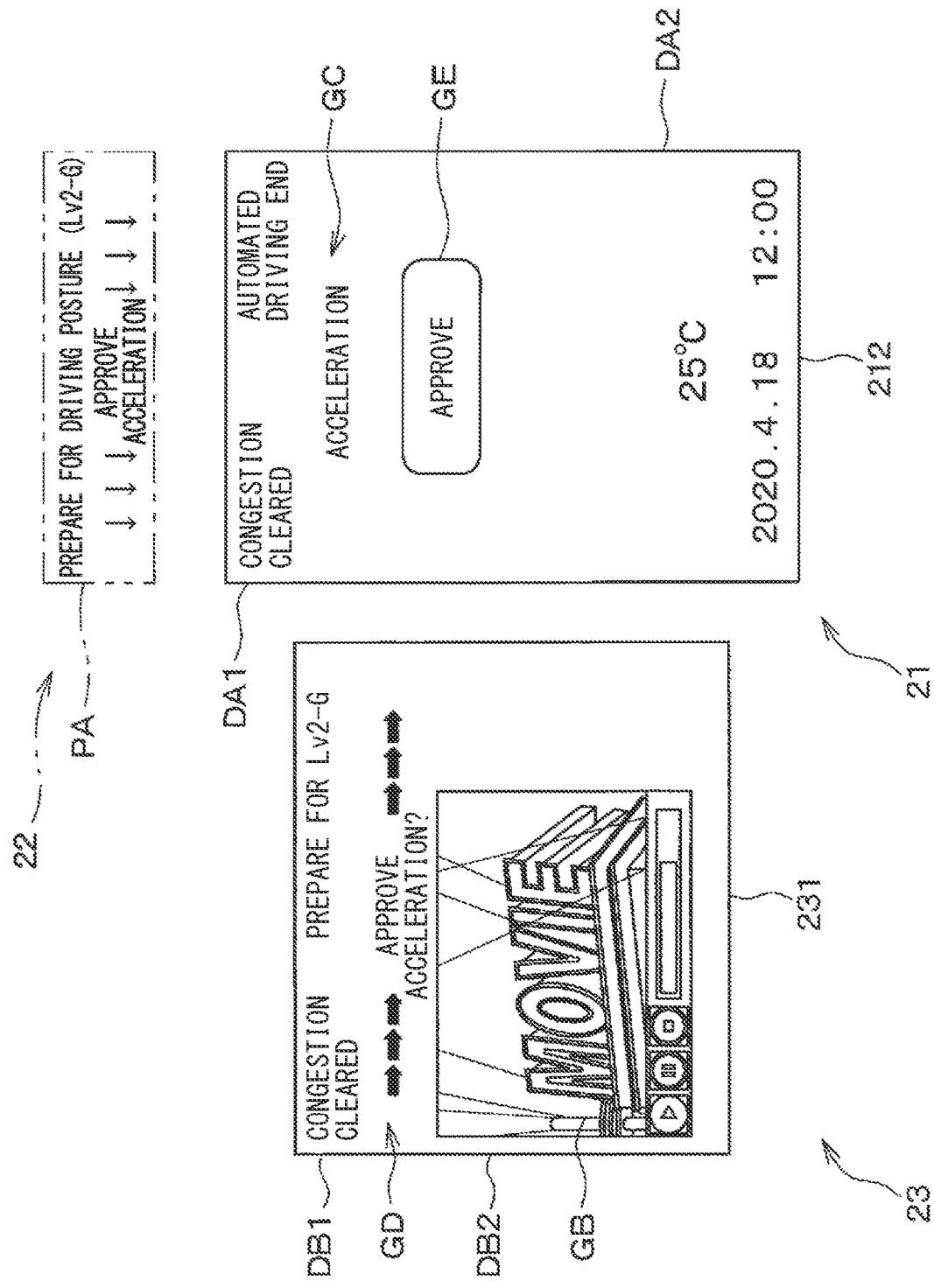
FIG. 14 is a schematic view illustrating a display example of an HMI device in the fourth embodiment.

As illustrated in FIG. 14, on the meter display 212, character information that is "congestion cleared, automated driving ended" is displayed in the level information display area DA1. This character information includes attention information for calling attention to congestion clearing, level-related information. In the driving information display area DA2, the first attention information display GC that is "accelerating" and the input request display GE indicating the approval button are displayed. In the projection area PA of the HUD device 22, character information that is "prepare for driving posture (Lv2-G)" and attention information that is approve acceleration III" for guiding the visual line to the meter display 212 below the projection area PA are displayed.

The character information that is "congestion clearing, prepare for Lv2-G" is displayed in the information display area DB1 in the CID display 231. In the screen area DB2, the second attention information display GD that is "→→→ approve acceleration? →→→" for urging approval button operation while guiding the visual line to the front display device is displayed up in the second task screen GB. At this time, in order to display, and improve the visibility of, the second attention information display GD, the second task screen GB is displayed in a reduced size.

With reference again to FIG. 13, in step 1306, the in-vehicle system 10 determines whether or not the acceleration approval behavior has been acquired. When the acceleration approval behavior is acquired (that is, step 1306: YES), the processing proceeds to steps 1307 and 1308. In step 1307, the in-vehicle system 10 ends the second task. In step 1308, the in-vehicle system 10 sets the acceleration mode to the normal mode, and starts the speed recovery processing.

With the start of the speed recovery processing, the vehicle speed of the subject vehicle increases from a low-speed range during congestion travel. When the vehicle speed reaches a predetermined value (for example, 60 km/h), the in-vehicle system 10 ends, in step 1309, the automated driving in congestion.

When the acceleration approval behavior is not acquired (that is, step 1306: NO), the processing proceeds to steps 1310 to 1313. In step 1310, the in-vehicle system 10 sets the acceleration mode in the speed recovery processing to be more relaxed than in the normal mode.

In step 1311, the in-vehicle system 10 presents a second task end notice. In step 1312, the in-vehicle system 10 presents a driving posture instruction that urges the driver to take a driving posture. FIG. 15 illustrates display examples corresponding to steps 1311 and 1312.

Figure 15:
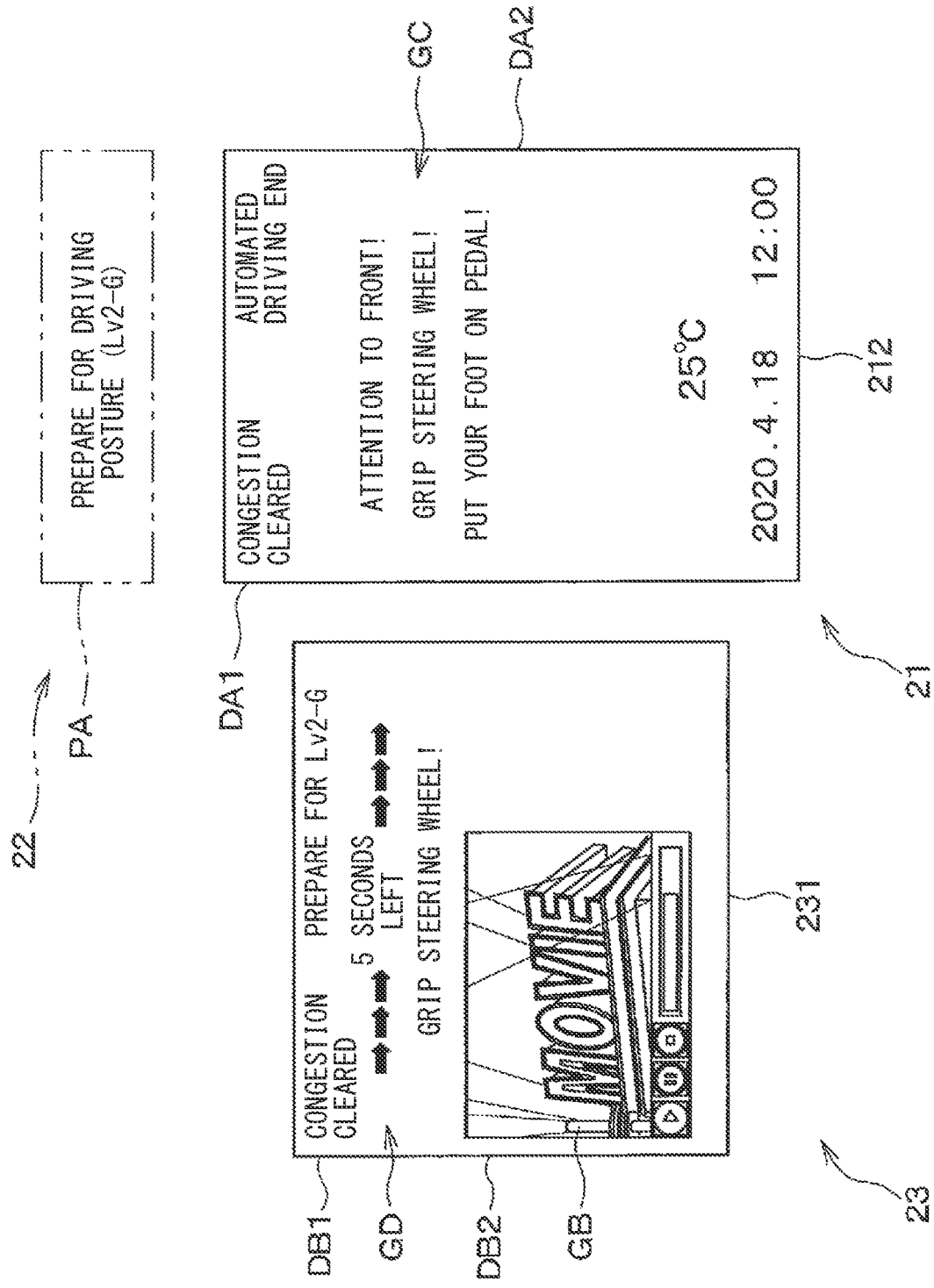
FIG. 15 is a schematic view illustrating a display example of the HMI device in the fourth embodiment.

As illustrated in FIG. 15, on the meter display 212, character information that is "congestion cleared, automated driving ended" is displayed in the level information display area DA1. In the driving information display area DA2, the first attention information display GC for a driving posture instruction that is "attention to front!", "grip steering wheel!", and "put your foot on pedal!" is displayed. The character information that is "prepare for driving posture (Lv2-G)" is displayed in the projection area PA of the HUD device 22.

The character information that is "congestion clearing, prepare for Lv2-G" is displayed in the information display area DB1 in the CID display 231. In the screen area DB2, the second attention information display GD including the second task end notice including required time information until the end of the second task that is "→→→ 5 seconds left →→→" and a driving posture instruction that is "grip steering wheel!" is displayed up in the second task screen GB. At this time, in order to display, and improve the visibility of, the second attention information display GD, the second task screen GB is displayed in the above-described reduced size or a minimum size, which is smaller.

With reference again to FIG. 13, in step 1313, the in-vehicle system 10 determines whether or not the acceleration approval behavior has been acquired. When the acceleration approval behavior is acquired (that is, step 1313: YES), the processing proceeds to step 1307. On the other hand, when the acceleration approval behavior is not acquired (that is, step 1313: NO), the processing proceeds to step 1314.

In step 1314, the in-vehicle system 10 determines whether or not a predetermined time has elapsed since the acceleration approval request is presented to the driver by the processing in step 1305. Before the predetermined time elapses (that is, step 1314: NO), the processing returns to step 1313. That is, reception end of acceleration approval is waited for a predetermined time while the acceleration state is more relaxed than in a case where the acceleration approval is made.

On the other hand, when the predetermined time has elapsed without the acceleration approval being made (that is, step 1314: YES), the processing proceeds to step 1315. In step 1315, the in-vehicle system 10 ends the second task. Thereafter, the processing proceeds to step 1309.

Fifth Embodiment

Hereinafter, the fifth embodiment will be described with reference to FIG. 16. The configuration of the in-vehicle system 10 according to the present embodiment is similar to that of the fourth embodiment. The present embodiment is slightly different from the fourth embodiment in the operation mode and the functional configuration corresponding to this.

When the driver approves acceleration at the time of speed recovery accompanying congestion clearing, it is assumed that the driver has sufficient recognition of driving changeover. Therefore, in this case, there is no particular inconvenience even if the driver is not called further attention to driving changeover. On the other hand, when acceleration approval is not made, the driver's driving consciousness is low, and it is necessary to call for continuous attention regarding driving changeover to the driver.

Therefore, when the acceleration approval behavior for approving acceleration of the subject vehicle is not acquired by the second behavior acquisition unit 253 after presentation of the attention information, the second task control unit 258 restricts the second task execution state more than when the acceleration approval behavior is acquired. The "restriction" of the second task execution state includes, for example, at least one of reduction of the second task screen GB, superimposition of the attention information onto the second task screen GB, and early second task end timing.

Figure 16:
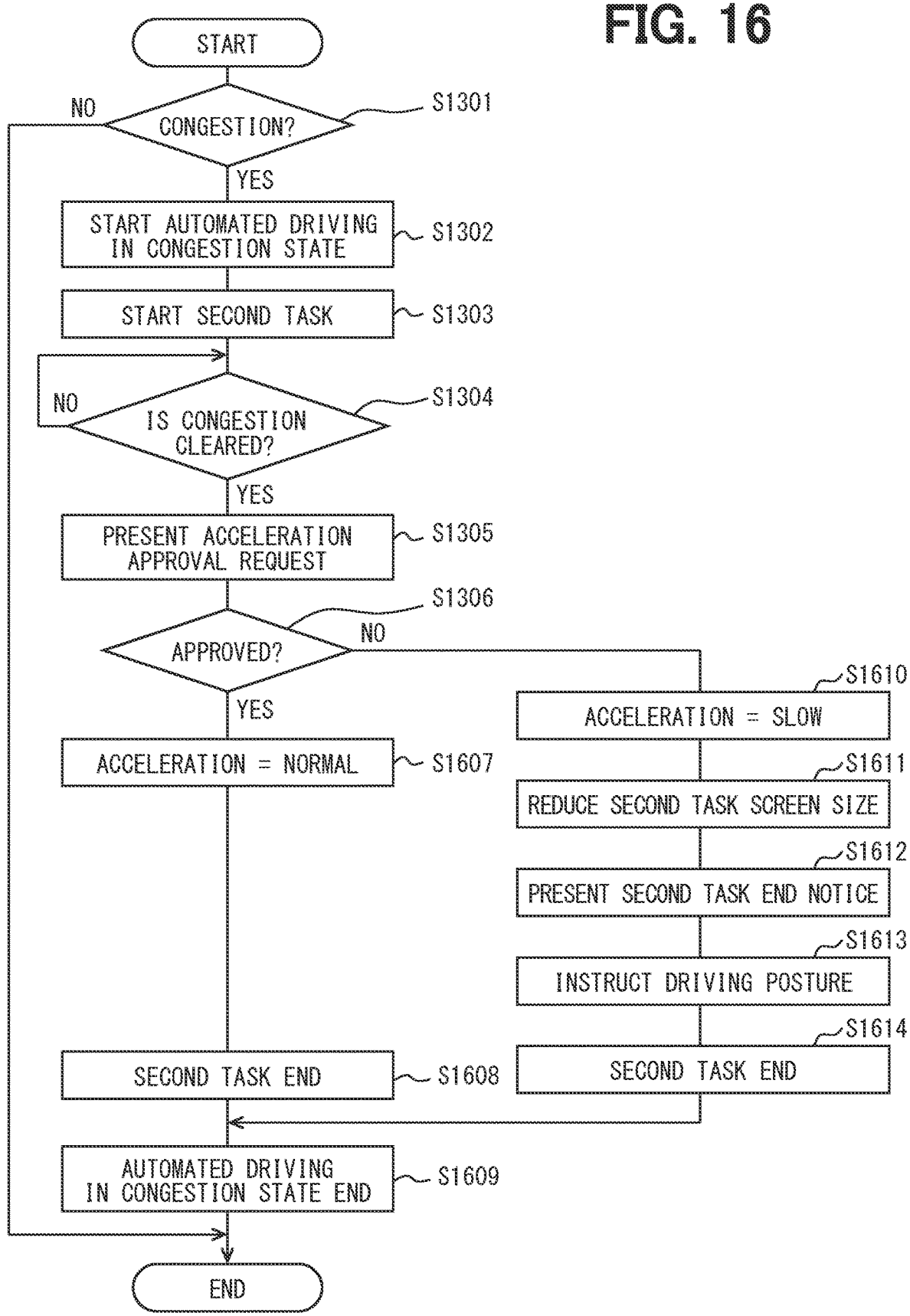
FIG. 16 is a flowchart illustrating an outline of operation of an in-vehicle system according to a fifth embodiment.

FIG. 16 is a flowchart illustrating an operation example corresponding to the present embodiment. The flowchart illustrated in FIG. 16 is the flowchart illustrated in FIG. 13 with partial modification. That is, the processing content of steps 1301 to 1305 in FIG. 16 is similar to that in FIG. 13. The determination content of step 1306 is similar to that in FIG. 13.

In the present embodiment, when the acceleration approval behavior is acquired (that is, step 1306: YES), the processing proceeds to steps 1607 and 1608. In step 1607, the in-vehicle system 10 sets the acceleration mode to the normal mode, and starts the speed recovery processing. When the vehicle speed reaches a predetermined reference speed (for example, 40 km/h), the second task ends in step 1608. Thereafter, when the vehicle speed reaches a predetermined value (for example, 60 km/h), the in-vehicle system 10 ends, in step 1609, the automated driving in congestion.

On the other hand, when the acceleration approval behavior is not acquired (that is, step 1306: NO), the processing proceeds to steps 1610 to step 1614, and then the processing proceeds to step 1609. In step 1610, the in-vehicle system 10 sets the acceleration mode in the speed recovery processing to be more relaxed than in the normal mode, and starts the speed recovery processing.

In step 1611, the in-vehicle system 10 reduces the size of the second task screen GB. Specifically, in a case where the size of the second task screen GB is the normal size before the processing in step 1611, the second task screen GB is reduced from the normal size to a reduced size by the processing in step 1611. On the other hand, in a case where the size of the second task screen GB is a reduced size before the processing in step 1611, the second task screen GB is reduced from the reduced size to the minimum size by the processing in step 1611.

In step 1612, the in-vehicle system 10 presents a second task end notice. In step 1613, the in-vehicle system 10 presents a driving posture instruction that urges the driver to take a driving posture. That is, the processing content of step 1612 and the processing content of 1613 are similar to those of steps 1311 and 1312, respectively, in FIG. 13.

When the vehicle speed reaches a predetermined reference speed (for example, 40 km/h), the second task ends in step 1614. Thereafter, when the vehicle speed reaches a predetermined value (for example, 60 km/h), the in-vehicle system 10 ends, in step 1609, the automated driving in congestion.

Sixth Embodiment

Hereinafter, the sixth embodiment will be described with reference to FIGS. 17A, 17B, and 18. The configuration of the in-vehicle system 10 according to the present embodiment is similar to that of the fifth embodiment. The present embodiment is slightly different from the fifth embodiment in the operation mode and the functional configuration corresponding to this.

In each of the above embodiments, an example in which only automated driving in congestion is executable as automated driving of Level 3 has been described. On the other hand, in the present embodiment, an example in which both automated driving in congestion and high-speed automated driving are executable in a specific road section as a limited domain will be described. The "high-speed automated driving" is automated driving that enables traveling in a predetermined high-speed range. The "high-speed automated driving" can also be referred to as "high-speed range automated driving". The "specific road section" is a road section set in advance to be capable of automated driving at SAE Level 3, and is typically, for example, a predetermined section set to an exclusive road such as an expressway. The predetermined high-speed range is, for example, equal to or greater than 60 km/h and equal to or lower than the legal speed.

Figure 17A:
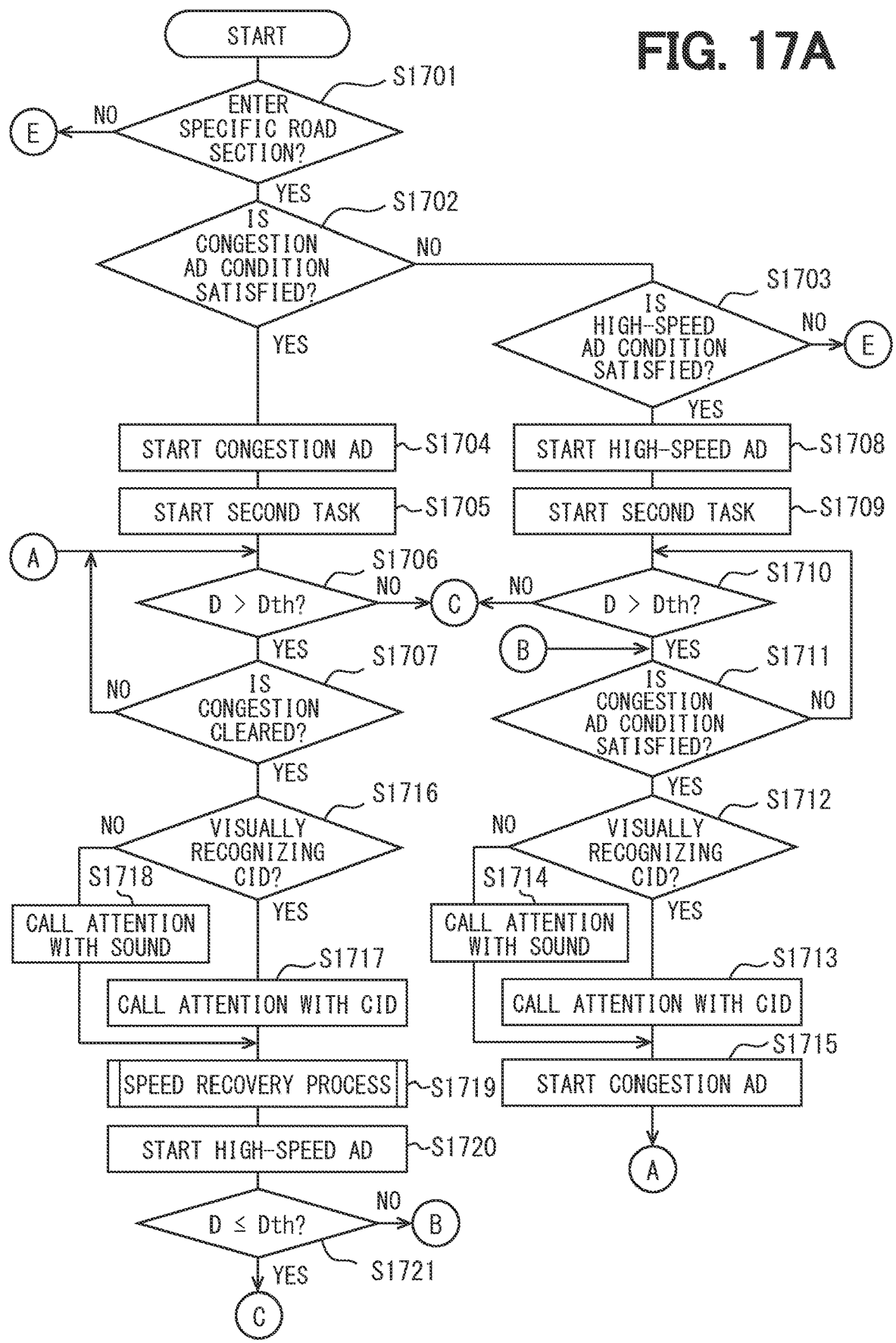
FIG. 17A is a flowchart illustrating an outline of operation of an in-vehicle system according to a sixth embodiment.
Figure 17B:
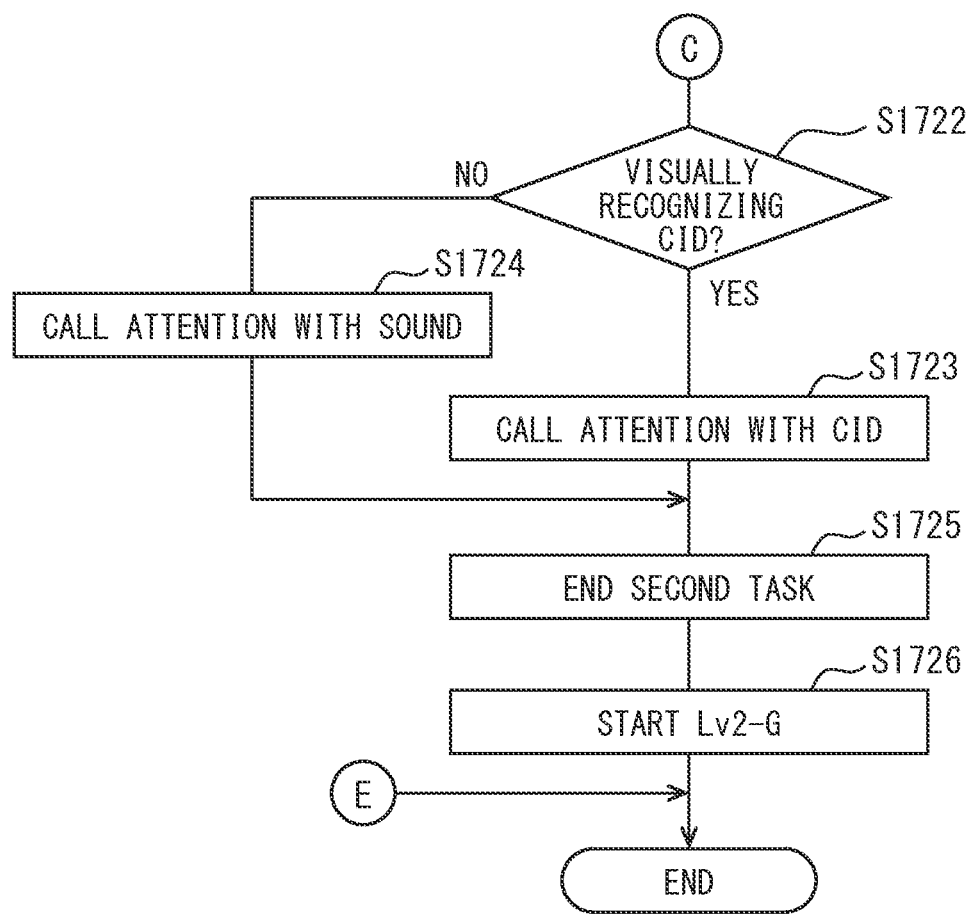
FIG. 17B is a flowchart illustrating an outline of the operation of the in-vehicle system according to the sixth embodiment.
Figure 18:
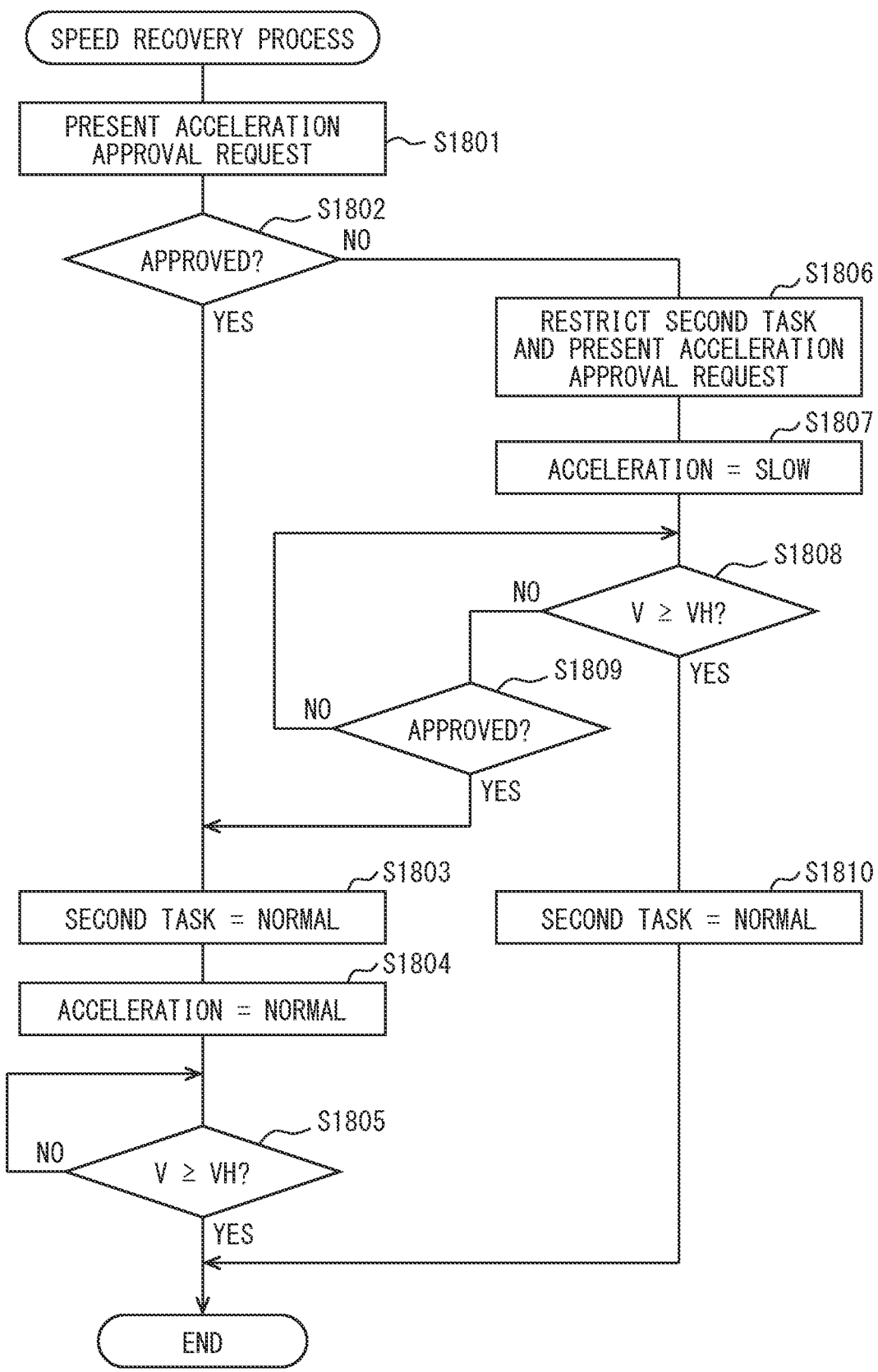
FIG. 18 is a flowchart illustrating an outline of the operation of the in-vehicle system according to the sixth embodiment.

The operation examples illustrated in FIGS. 17A, 17B, and 18 illustrate a case where automated driving in congestion or high-speed automated driving as automated driving of Level 3 is executed depending on the traffic situation in a specific road section, and a transition is made from Level 3 to Level 2 [G mode] by the end of the specific road section. In the figures, the automated driving in congestion is abbreviated as "congestion AD", and the high-speed automated driving is abbreviated as "high-speed AD".

In the present operation example, first, in step 1701, the in-vehicle system 10 determines whether or not the subject vehicle has entered the specific road section. When the subject vehicle has entered the specific road section (that is, step 1701: YES), the processing proceeds to step 1702 and thereafter. On the other hand, when the subject vehicle has not entered the specific road section (that is, step 1701: NO), the processing in step 1702 and thereafter are skipped, and this operation once ends.

In step 1702, the in-vehicle system 10 determines whether or not the start condition of the automated driving in congestion has been satisfied. The start condition of the automated driving in congestion includes at least that the subject vehicle has entered a congestion section. When the start condition of the automated driving in congestion is not satisfied (that is, step 1702: NO), the processing proceeds to step 1703.

In step 1703, the in-vehicle system 10 determines whether or not the start condition of the high-speed automated driving other than the entry to the specific road section determined in step 1701 has been satisfied. The start condition of the high-speed automated driving other than the entry into a specific road section includes, for example, that the current position of the subject vehicle is not within a regulated section due to generation of an obstructive cause such as an accident or construction. In a case where neither the start condition of the automated driving in congestion nor the start condition of the high-speed automated driving is satisfied (that is, step 1703: NO), all the processing after this are skipped, and this operation once ends.

In a case where the start condition of the automated driving in congestion is satisfied (that is, step 1702: YES), the processing proceeds to steps 1704 to 1706. In step 1704, the in-vehicle system 10 starts automated driving in congestion. Then, the second task becomes available. In a case where the driver desires to use the second task, the second task starts in step 1705 by operation on the HMI device 20 by the driver.

In step 1706, the in-vehicle system 10 determines whether or not the remaining distance D is longer than the predetermined value Dth. The remaining distance D is a planned travel distance from the current position of the subject vehicle to the end point in an automated driving possible section in which the subject vehicle is currently traveling. In the present embodiment, the automated driving in congestion, which is low-speed traveling, can also be used in the regulated section. Therefore, the automated driving possible section in the automated driving in congestion is a planned travel section from the current position of the subject vehicle to the final reach point in the specific road section where the subject vehicle is currently traveling. The "final reach point" is the closer one to the subject vehicle of the end point of the specific road section where the subject vehicle is currently traveling and a planned exit position of the subject vehicle from an exclusive road or the like including the specific road section. The "planned exit position" is, for example, an exit interchange or a junction from which the subject vehicle is planned to exit.

When the remaining distance D is longer than the predetermined value Dth (that is, step 1706: YES), the processing proceeds to step 1707. In step 1707, the in-vehicle system 10 determines whether or not the congestion is cleared. The determination content in step 1707 is similar to that in step 904 in FIG. 9A. While the congestion is not determined to have been cleared, the determination result of step 1707 becomes "NO", and the processing returns to step 1706. That is, while the remaining distance D does not become equal to or less than the predetermined value Dth and the congestion is not cleared, the automated driving in congestion is continued while the processing of steps 1706 and 1707 is repeated such as step 1706: YES→step 1707: NO→step 1706.

On the other hand, when the start condition of the high-speed automated driving is satisfied (that is, step 1703: YES), the processing proceeds to steps 1708 to 1710. In step 1708, the in-vehicle system 10 starts high-speed automated driving. Then, the second task becomes available. In a case where the driver desires to use the second task, the second task starts in step 1709 by operation on the HMI device 20 by the driver.

In step 1710, the in-vehicle system 10 determines whether or not the remaining distance D is longer than the predetermined value Dth. In the present embodiment, high-speed automated driving is not available in the regulated section. Therefore, the automated driving possible section in the high-speed automated driving is the specific road section where the subject vehicle is currently traveling from which the regulated section is subtracted. Therefore, for example, when the subject vehicle is planned to reach the regulated section, the remaining distance D in the high-speed automated driving is a planned travel distance from the current position of the subject vehicle to the start point of the latest regulated section existing ahead in the traveling of the subject vehicle.

When the remaining distance D is longer than the predetermined value Dth (that is, step 1710: YES), the processing proceeds to step 1711. In step 1711, the in-vehicle system 10 determines whether or not the start condition of the automated driving in congestion has been satisfied. The determination content in step 1711 is similar to that in step 1702. While the start condition of the automated driving in congestion is not satisfied, that is, while the vehicle is not caught in congestion during the high-speed automated driving, the determination result of step 1711 becomes "NO", and the processing returns to step 1710. That is, while the remaining distance D does not become equal to or less than the predetermined value Dth and the vehicle does not enter a congestion section, the high-speed automated driving is continued while the processing of step 1710 and step 1711 is repeated such as step 1710: YES→step 1711: NO→step 1710.

When the subject vehicle tries to enter a congestion section during high-speed automated driving, it is necessary to call attention to the driver to that effect. Therefore, when the start condition of the automated driving in congestion is satisfied during the high-speed automated driving, the determination result of step 1711 becomes "YES", and the processing proceeds to step 1712.

In step 1712, the in-vehicle system 10 determines whether or not the driver is visually recognizing the CID display 231. The determination content in step 1712 is similar to that in step 905 in FIG. 9.

When the driver is visually recognizing the CID display 231 (that is, step 1712: YES), the processing proceeds to step 1713. In step 1713, the in-vehicle system 10 presents, on the CID device 23, attention information regarding entry of the subject vehicle into the congestion section. In this case, the attention information is displayed on the screen of the CID display 231 and is also output by sound.

On the other hand, when the driver is not visually recognizing the CID display 231 (that is, step 1712: NO), the processing proceeds to step 1714. In step 1714, the in-vehicle system 10 presents attention information regarding the entry of the subject vehicle into the congestion section by sound through a speaker not illustrated provided in the HMI device 20. Note that in this case, when the driver is operating the terminal device 24 as a second task, presentation of the attention information by screen and/or sound output equipment provided in the terminal device 24 can also be executed.

After the attention information is presented in step 1713 or step 1714 in a mode corresponding to the driver behavior, that is, the driver's visual line direction, the processing proceeds to step 1715. In step 1715, the in-vehicle system 10 starts automated driving in congestion. Then, the processing proceeds to step 1706. While the remaining distance D does not become equal to or less than the predetermined value Dth and the congestion is not cleared, the automated driving in congestion is continued while the processing of steps 1706 and 1707 is repeated.

When the congestion is determined to have been cleared (that is, step 1707: YES), the processing proceeds to step 1716. In step 1716, the in-vehicle system 10 determines whether or not the driver is visually recognizing the CID display 231. The determination content in step 1716 is similar to that in step 1712.

When the driver is visually recognizing the CID display 231 (that is, step 1716: YES), the processing proceeds to step 1717. In step 1717, the in-vehicle system 10 presents, on the CID device 23, attention information regarding congestion clearing. In this case, the attention information is displayed on the screen of the CID display 231 and is also output by sound.

On the other hand, when the driver is not visually recognizing the CID display 231 (that is, step 1716: NO), the processing proceeds to step 1718. In step 1718, the in-vehicle system 10 presents attention information regarding the congestion clearing by sound through a speaker not illustrated provided in the HMI device 20. Note that in this case, when the driver is operating the terminal device 24 as a second task, presentation of the attention information by screen and/or sound output equipment provided in the terminal device 24 can also be executed.

After the attention information is presented in step 1717 or step 1718 in a mode corresponding to the driver behavior, that is, the driver's visual line direction, the processing proceeds to step 1719. In step 1719, the in-vehicle system 10 executes the speed recovery processing. Such speed recovery processing will be described later.

When the speed recovery processing ends, the processing proceeds to steps 1720 and 1721. In step 1720, the in-vehicle system 10 starts high-speed automated driving. In step 1721, the in-vehicle system 10 determines whether or not the remaining distance D in the high-speed automated driving is equal to or less than a predetermined value Dth. When the remaining distance D is longer than the predetermined value Dth (that is, step 1721: NO), the processing proceeds to step 1711. While the remaining distance D does not become equal to or less than the predetermined value Dth and the vehicle does not enter the congestion section, the high-speed automated driving is continued while the processing of steps 1710 and 1711 is repeated.

When the remaining distance D becomes equal to or less than the predetermined value Dth, it is necessary to call attention to the driver that the automated driving will soon end and driving changeover is necessary. Therefore, when the remaining distance D is determined to be equal to or less than the predetermined value Dth in steps 1706, 1710, and 1721, the processing proceeds to step 1722.

In step 1722 shown in FIG. 17B, the in-vehicle system 10 determines whether or not the driver is visually recognizing the CID display 231. The determination content in step 1716 is similar to that in step 1712.

When the driver is visually recognizing the CID display 231 (that is, step 1722: YES), the processing proceeds to step 1723. In step 1723, the in-vehicle system 10 presents, on the CID device 23, attention information regarding the end of automated driving and driving changeover. In this case, the attention information is displayed on the screen of the CID display 231 and is also output by sound.

On the other hand, when the driver is not visually recognizing the CID display 231 (that is, step 1722: NO), the processing proceeds to step 1724. In step 1724, the in-vehicle system 10 presents attention information regarding the end of automated driving and driving changeover by sound through a speaker not illustrated provided in the HMI device 20. Note that in this case, when the driver is operating the terminal device 24 as a second task, presentation of the attention information by screen and/or sound output equipment provided in the terminal device 24 can also be executed.

After the attention information is presented in step 1723 or step 1724 in a mode corresponding to the driver behavior, that is, the driver's visual line direction, the processing proceeds to steps 1725 and 1726. In step 1725, the in-vehicle system 10 ends the second task. In step 1726 the in-vehicle system 10 starts Level 2 [G mode].

FIG. 18 illustrates the content of the speed recovery processing in step 1719 in FIG. 17A. With reference to FIG. 18, first, in step 1801, the in-vehicle system 10 presents an acceleration approval request to the driver. The processing content of step 1801 is similar to that of step 1001 in FIG. 10.

Next, in step 1802, the in-vehicle system 10 determines whether or not the acceleration approval behavior has been acquired. When the acceleration approval behavior is acquired (that is, step 1802: YES), the processing proceeds to steps 1803 to 1805.

In step 1803, the in-vehicle system 10 sets the execution state of the second task to the normal state. Specifically, for example, when video content is being viewed on the CID device 23 as the second task being executed, the second task screen GB is set to the normal size. That is, when the processing proceeds to step 1803, the execution of the second task is not restricted.

In step 1804, the in-vehicle system 10 sets the acceleration mode in the speed recovery processing to the normal mode. In step 1805, the in-vehicle system 10 determines whether or not the vehicle speed V of the subject vehicle has become equal to or greater than a predetermined value VH. The predetermined value VH is, for example, 60 km/h. While the vehicle speed V is less than the predetermined value VH, the determination result of step 1805 becomes "NO", and the speed recovery processing does not end. On the other hand, when the vehicle speed V becomes equal to or higher than the predetermined value VH, the determination result of step 1805 becomes "YES", and the speed recovery processing ends.

When the acceleration approval behavior is not acquired (that is, step 1802: NO), the processing proceeds to steps 1806 to 1808. In step 1806, the in-vehicle system 10 continues the presentation of the acceleration approval request while restricting the execution of the second task. Specifically, for example, when video content is being viewed on the CID device 23 as the second task being executed, the second task screen GB is set to a reduced size or the minimum size.

In step 1807, the in-vehicle system 10 sets the acceleration mode in the speed recovery processing to be more relaxed than in the normal mode. In step 1808, the in-vehicle system 10 determines whether or not the vehicle speed V of the subject vehicle has become equal to or greater than the predetermined value VH.

When the vehicle speed V is less than the predetermined value VH (that is, step 1808: NO), the processing proceeds to step 1809. In step 1809, the in-vehicle system 10 determines whether or not the acceleration approval behavior has been acquired. When the acceleration approval behavior is acquired (that is, step 1809: YES), the processing proceeds to step 1803. On the other hand, when the acceleration approval behavior is not acquired (that is, step 1809: NO), the processing returns to step 1808.

Thus, while the driver does not perform acceleration approval operation, the speed recovery processing continues in an acceleration mode that is more relaxed than the normal mode together with the execution restriction of the second task and the presentation of the acceleration approval request. On the other hand, when the driver performs the acceleration approval operation, the acceleration mode and the execution mode of the second task are set to the normal mode, and the speed recovery processing is continued.

When the vehicle speed V of the subject vehicle reaches the predetermined value VH with the acceleration approval operation (that is, step 1808: YES) not performed by the driver, the speed recovery processing ends. At this time, in step 1810, the second task execution state is returned to the normal state.

(Modifications)

The present disclosure is not limited to the above embodiments. Hence, the above embodiments can be appropriately altered. Hereinafter, representative modifications will be described. In the following description of the modifications, differences from the above embodiments will be mainly described. In the above embodiments and modifications, the same or equivalent parts are given the same reference numerals. Therefore, in the following description of the modifications, regarding components having the same reference numerals as those in the embodiments, the description in the embodiments can be appropriately incorporated unless there is a technical contradiction or a special additional description.

The present disclosure is not limited at all to the specific device configuration described in the above embodiments. That is, for example, the vehicle 1 mounted with the in-vehicle system 10 is not limited to an ordinary automobile. Specifically, the vehicle 1 may be a large automobile such as a cargo truck. The number of wheels is not particularly limited, and may be a three-wheel automobile, or may be a six-wheel or eight-wheel automobile such as a cargo truck. The type of the vehicle 1 may be a conventional automobile including only an internal combustion engine, may be an electric vehicle or a fuel cell vehicle not including an internal combustion engine, or may be a so-called hybrid vehicle. The shape and structure of the vehicle body in the vehicle 1 are not limited to a box shape, that is, a substantially rectangular shape in plan view. The use of the vehicle 1, the position of the driver's seat 2, that is, the steering wheel 8, the number of passengers, and the like are also not particularly limited. The existence of the driver's seat 2 is also not essential. That is, the driver may be a subject vehicle passenger who is in charge of or executes the dynamic driving task. In other words, the seating position of the driver is also not particularly limited as long as the driver can execute the driving operation. A discretionary operation device such as a joystick can be used in place of or in addition to the steering wheel 8.

As a communication standard constituting the in-vehicle system 10, a communication standard other than CAN (international registered trademark), for example, FlexRay (international registered trademark) or the like can also be adopted. The communication standard constituting the in-vehicle system 10 is not limited to one type. For example, the in-vehicle system 10 may have a subnetwork line conforming to a communication standard such as LIN. LIN stands for local interconnect network.

The vehicle state sensor 11, the external state sensor 12, and the surrounding monitoring sensor 13 are also not limited to the above examples. For example, the surrounding monitoring sensor 13 may include sonar, that is, an ultrasonic sensor. Alternatively, the surrounding monitoring sensor 13 may include two or more types of a millimeter-wave radar sensor, a submillimeter-wave radar sensor, a laser radar sensor, and an ultrasonic sensor. The number of various sensors to be installed is also not particularly limited.

The locator 14 is also not limited to the above examples. For example, the locator 14 needs not have a configuration incorporating a gyro sensor and an acceleration sensor. Specifically, the inertia acquisition unit 142 may receive output signals from an angular velocity sensor and an acceleration sensor provided outside the locator 14 as the vehicle state sensor 11.

The DCM 15 can be omitted. That is, traffic information can be acquired by the navigation device 16. Alternatively, the navigation device 16 may have a configuration including the locator 14 and the DCM 15.

The navigation device 16 may be connected to the HMI control device 25 in such a manner to be able to perform information communication via a sub communication line different from the in-vehicle communication line 10A.

The navigation device 16 may have a display screen dedicated to navigation screen display different from the HMI device 20. Alternatively, the navigation device 16 may be provided as a component of the HMI device 20. Specifically, for example, the navigation device 16 may be integrated with the CID device 23.

The driver state detection unit 17 may be connected to the HMI control device 25 in such a manner to be able to perform information communication via a sub communication line different from the in-vehicle communication line 10A.

The driver state detection unit 17 is not limited to the configuration including the visual line detection unit 171, the posture detection unit 172, and the operation state acquisition unit 173. That is, for example, by image recognition using the configuration of the visual line detection unit 171, a function corresponding to the posture detection unit 172 can be achieved. The driver state detection unit 17 may include a biological information sensor that detects biological information such as a pulse of the driver. In this case, the components such as a detection electrode in the biological information sensor can be shared with the components that detect the gripping state of the steering wheel 8 in the operation state acquisition unit 173.

In the above embodiments, the in-vehicle system 10, that is, the driving control device 18 is configured to be able to execute the vehicle control operation corresponding to Levels 1 to 3. However, the present disclosure is not limited to such a mode. That is, for example, the present disclosure can be suitably applied to a case where the vehicle control operation corresponding to Levels 1 to 5 can be executed.

The HMI device 20 is not limited to the configuration including the meter panel 21, the HUD device 22, and the CID device 23. That is, for example, the meter panel 21 and the CID device 23 can be integrated. Alternatively, for example, the HUD device 22 can be omitted.

The meter 211 and the meter display 212 can be achieved by one piece of image display equipment. In this case, the meter 211 can be provided as display areas at both left and right ends of one piece of image display equipment that is a liquid crystal display or an organic EL display. That is, the meter 211 can be achieved by displaying images of a bezel, a pointer, a scale, and the like corresponding to a tachometer, a speedometer, a water temperature gauge, and the like. The meter display 212 can be provided as a display area other than the meter 211 in the image display equipment.

The HUD device 22 is not limited to the configuration in which an image is projected onto the predetermined projection area PA on the front windshield 9. Specifically, the HUD device 22 may be configured to project an image on a combiner that is a plate-like member erected on the dashboard 7, for example.

The input device 232 may have a pointing device or the like operated at hand by the driver in place of or in addition to the touchscreen superimposed on the CID display 231. The input device 232 may have a sound input device that detects an utterance of the driver.

In the above embodiments, the driving control device 18 and the HMI control device 25 have a configuration as a so-called in-vehicle microcomputer including a CPU. However, the present disclosure is not limited to such a configuration.

For example, the entire or a part of the driving control device 18 may be configured to include a digital circuit configured to enable the above-described operation, for example, an ASIC or an FPGA. ASIC stands for application specific integrated circuit. FPGA stands for field programmable gate array. That is, in the driving control device 18, the in-vehicle microcomputer part and the digital circuit part can coexist. The same applies to the HMI control device 25.

The program according to the present disclosure capable of executing various operations, procedures, or processing described in the above embodiments can be downloaded or upgraded via V2X communication by the DCM 15 or the like. V2X is an abbreviation of vehicle to X. Alternatively, such a program can be downloaded or upgraded via terminal equipment provided in a manufacturing factory, a maintenance factory, a shop, or the like of the vehicle 1. The storage destination of the program may be a memory card, an optical disk, a magnetic disk, or the like.

Thus, each functional configuration and method described above may be implemented by a dedicated computer provided by configuring a processor programmed to execute one or a plurality of functions embodied by a computer program, and a memory. Alternatively, each functional configuration and method described above may be implemented by a dedicated computer provided by configuring a processor with one or more dedicated hardware logic circuits. Alternatively, each functional configuration and method described above may be implemented by one or more dedicated computers configured by a combination of a processor programmed to execute one or a plurality of functions and a memory and a processor configured by one or more hardware logic circuits. The computer program may be stored in a computer-readable non-transitory tangible storage medium as an instruction executed by a computer. That is, each functional configuration and method described above can also be expressed as a computer program including a procedure for implementing this, or a non-transitory tangible storage medium storing the program.

The present disclosure is not limited to the specific functional configurations and operation examples described in the above embodiments. That is, for example, when the start condition of Level 2 is satisfied at the end of the automated driving in congestion, the processing may transition to Level 2. The automated driving in congestion and/or the high-speed automated driving may correspond to Level 4.

The level or category of driving automation is not limited to those designated in "SAE J3016". Specifically, in "SAE J3016", the level numerical value is designated to be larger as the driving automation level is higher. However, the present disclosure is not limited to such a mode. That is, the present disclosure can be similarly applied to a standard in which the highest driving automation level is set to "Level 1" for example, and the level numerical value is designated to become larger as the driving automation level decreases.

A determination condition of congestion entry or congestion clearing can be altered as appropriate. That is, for example, a vehicle speed condition for congestion entry determination and a vehicle speed condition for congestion clearing determination may be the same or may be different. The same applies to the "predetermined time" and the "predetermined travel distance".

In order to simplify the description, each of the above embodiments is based on a road traffic system in which both "high-speed automated driving" and "automated driving in congestion" are possible. However, in the road traffic system of each country, the execution conditions of automated driving such as the type of the automated driving, the maximum speed during automated driving, and the like can be appropriately considered depending on the domestic circumstances and the like. For this reason, the above-described embodiments can be appropriately modified to a specification conforming to the road traffic system of each country.

For example, automated driving in congestion may be executable only in a specific road section. Alternatively, automated driving in congestion may be executable on an automated driving possible road regardless of the presence of setting of a specific road section. The "automated driving possible road" is an automobile exclusive road having a legal maximum speed exceeding 60 km/h, and typically includes expressways.

In the specific example described in each of the above embodiments, the automated driving in congestion can be continued from when the subject vehicle enters a congestion section and the vehicle speed V of the subject vehicle becomes equal to or lower than a threshold speed (for example, 60 km/h) of congestion determination until when the vehicle speed V reaches the predetermined value V1 (for example, 40 km/h) by the speed recovery processing. That is, the automated driving in congestion can be executed in a low-speed range of less than 60 km/h or equal to or lower than 60 km/h including a temporary clearing state of congestion before the vehicle speed V recovers to the upper limit speed of the automated driving in congestion. Such automated driving in the low-speed range can be executed regardless of the presence of congestion. That is, for example, automated driving in congestion in each of the above embodiments can be regarded as "low-speed automated driving" that can be executed in a vehicle speed range of 60 km/h or less on an automated driving possible road. The "low-speed automated driving" may be executable regardless of the presence of generation of congestion.

Therefore, the disclosure according to Japanese Patent Application No. 2020-25305 or the present application which claims the priority of Japanese Patent Application No. 2020-25305 include a driving control device (18) and an HMI control device (25) having the following configurations.

The driving control device (18) controls a driving of a vehicle (1). The vehicle is capable of performing low-speed automated driving to travel following a preceding vehicle at a traveling speed equal to or less than a predetermined speed.

The driving control device includes:
 a congestion state determination unit (182) determining clearing of a congestion during a low-speed automated driving;
 a behavior acquisition unit (183) acquiring a behavior of a driver of the vehicle; and
 a vehicle control unit (185) that controls an acceleration or a deceleration of the vehicle.

The vehicle control unit decreases the acceleration of the vehicle in a case where an acceleration approval behavior that approves the acceleration of the vehicle is not acquired by the behavior acquisition unit after the congestion is determined to be cleared by the congestion state determination unit compared with a case where the acceleration approval behavior is acquired after the congestion is determined to be cleared.

The HMI control device (25) controls an HMI device (20), which presents information to a driver of a vehicle (1) in a recognizable manner. The vehicle is capable of performing low-speed automated driving as a first task and traveling following a preceding vehicle at a traveling speed equal to or lower than a predetermined speed.

The HMI control device includes:
 an attention information presentation unit (259) presenting attention information for calling attention of the driver when a congestion during a low-speed automated driving is determined to be cleared;
 a behavior acquisition unit (253) acquiring a behavior of the driver; and
 a second task control unit (258) ending a second task presented on the HMI device at an end timing corresponding to the behavior of the driver acquired by the behavior acquisition unit after presentation of the attention information.

The HMI control device (25) controls an HMI device (20), which presents information to a driver of a vehicle (1) in a recognizable manner. The vehicle is capable of performing low-speed automated driving as a first task and traveling following a preceding vehicle at a traveling speed equal to or lower than a predetermined speed.

The HMI control device includes:
 a behavior acquisition unit (253) acquiring a behavior of the driver; and
 an attention information presentation unit (259) presenting attention information for calling attention of the driver in a presentation mode corresponding to the behavior acquired by the behavior acquisition unit when a congestion during a low-speed automated driving is determined to be cleared.

The congestion state determination unit 182 may be provided in the locator 14, the navigation device 16, or the HMI control device 25. In this case, the driving control device 18 can be provided with, in place of the congestion state determination unit 182, a congestion state acquisition unit that acquires a determination result from the congestion state determination unit 182 provided in the locator 14.

The first behavior acquisition unit 183 may receive, from the HMI control device 25, a result of acquisition, that is, detection in the second behavior acquisition unit 253. Conversely, the second behavior acquisition unit 253 may receive, from the driving control device 18, a result of acquisition, that is, detection in the first behavior acquisition unit 183.

The screen display example is also not limited to each of the above specific examples. Specifically, for example, animation display of the second attention information display GD in FIG. 5 or the like makes it possible to further enhance the visual line guidance effect. In animation display, for example, it is possible to move an object having higher luminance than that of the other objects in the plurality of "→" in the visual line guidance direction, that is, the right direction toward the front display device. Alternatively, for example, the character string "attention to front" can be moved in the visual line guidance direction.

The second task display mode in the examples of FIGS. 7 and 8 can also be altered as appropriate. That is, for example, in the case of FIG. 7 in which driving changeover preparation is ready, the second task screen GB may be displayed in the normal size. On the other hand, in the case of FIG. 8 in which driving changeover preparation is not ready, the second task screen GB having a reduced size may be displayed in place of the navigation screen GA. That is, the size of the second task screen GB may be set depending on the degree of driving changeover preparation.

Each flowchart can be appropriately modified. For example, the predetermined value V0 in step 912 in FIG. 9B and the like may be variable depending on the type of the second task. That is, the predetermined value V0 can be set in such a manner that the second task in which the driver's consciousness is further away from driving ends earlier.

Figure 9B:
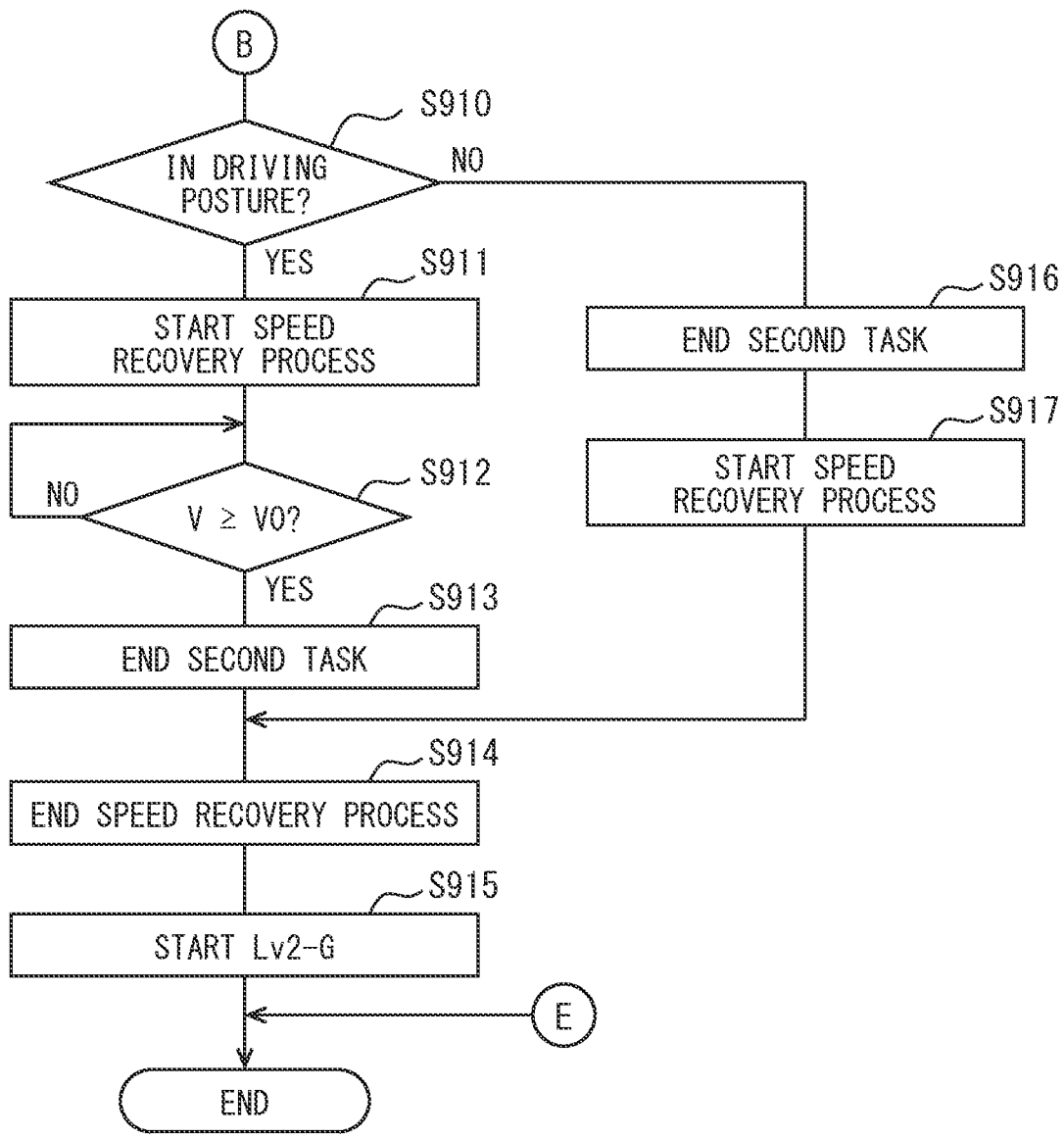
FIG. 9B is a flowchart illustrating an outline of the operation of the in-vehicle system according to the first embodiment.
Figure 9C:
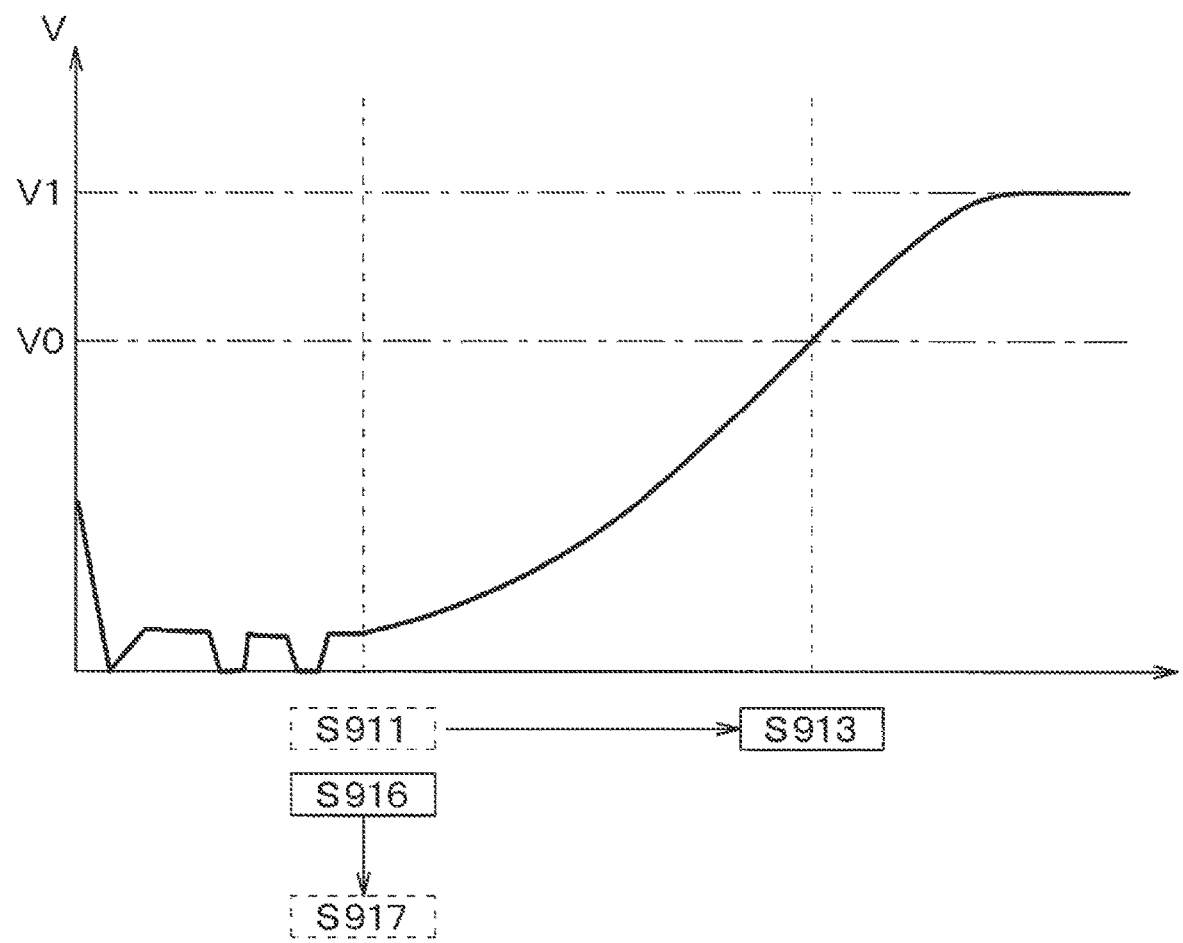
FIG. 9C is a time chart illustrating an outline of the operation of the in-vehicle system according to the first embodiment.

Specifically, for example, in FIG. 9B, the predetermined value V0 in the case of the second task using the terminal device 24 may be a value lower than the predetermined value V0 in the case of the second task using the CID device 23. In this case, the second task using the terminal device 24 ends earlier than the second task using the CID device 23. It is possible to more reliably transfer the authority by ending earlier the second task using the terminal device 24 in which the driver's consciousness is further away from driving.

Alternatively, for example, in FIG. 11, the predetermined value V0 in a case where the video content is a movie may be a value lower than the predetermined value V0 in a case where the video content is other than a movie. In this case, the second task ends earlier in the movie than in other than the movie. It is possible to more reliably transfer the authority by ending earlier the second task of movie viewing in which the driver's consciousness is further away from driving.

The timing of second task end in step 916 in FIG. 9B and the like may be set depending on the type of the second task. That is, the second task end timing can be set in such a manner that the second task in which the driver's consciousness is further away from driving ends earlier.

Specifically, for example, in FIG. 9B, the second task end timing can be set in such a manner that the second task using the terminal device 24 ends earlier than the second task using the CID device 23. It is possible to more reliably transfer the authority by ending earlier the second task using the terminal device 24 in which the driver's consciousness is further away from driving.

Alternatively, for example, in FIG. 11, the second task end timing may be set depending on the type of the terminal device 24 and/or the type of the second task using the terminal device 24. That is, for example, the second task end timing can be set in such a manner that the second task ends earlier when the terminal device 24 is a handheld game console than when the terminal device 24 is a mobile phone. The second task end timing can be set in such a manner that the second task ends earlier when texting with the mobile phone than when calling over the mobile phone. For example, the end timing of the second task can be set based on a lookup table or the like that designates a relationship between the second task type and the end timing.

In a case where there is no subject vehicle passenger other than the driver, there is no influence on convenience even if the second task is immediately ended at the time point when the driver's consciousness transitions from the second task to driving. Rather, in this case, it is useless to continue second task content such as video content reproduction after the driver's consciousness has transitioned from the second task to driving.

Therefore, the processing may proceed from FIG. 9A to FIG. 9B when a subject vehicle passenger other than the driver exists, and the processing may proceed from FIG. 9A to FIG. 12 when a subject vehicle passenger other than the driver does not exist. In this case, a determination step of "only driver?" is provided after the processing of step 907 in FIG. 9A. In this example, when the determination result of the determination step is "NO", the processing proceeds to FIG. 9B. On the other hand, when the determination result of the determination step is "YES", the processing proceeds to FIG. 12.

The acceleration approval request in the speed recovery processing may be performed stepwise in a plurality of times. Specifically, for example, a first acceleration approval request for speed recovery up to 40 km/h, a second acceleration approval request for speed recovery up to 50 km/h, and a third acceleration approval request for speed recovery up to 60 km/h can be carried out stepwise. In this case, step 911 in FIG. 9B is divided into three parts of "first speed recovery processing" for speed recovery up to 40 km/h, "second speed recovery processing" for speed recovery up to 50 km/h, and "third speed recovery processing" for speed recovery up to 60 km/h. In the "first speed recovery processing", V1 in FIG. 10=40 km/h. In the "second speed recovery processing", V1 in FIG. 10=50 km/h. In the "third speed recovery processing", V1 in FIG. 10=60 km/h.

Other Embodiments

As another embodiment, the following is possible. There is a case where the driver does not satisfy a driver requirement when congestion is cleared (that is, step 904: YES). This driver requirement is a requirement necessary for the driver to become in a state of being capable of driving operation before driving changeover, such as the driving posture (that is, step 910: YES), holding of the steering wheel, and the surrounding monitoring situation. In this case, in the speed recovery processing (that is, step 917), acceleration of the subject vehicle can be relaxed regardless of the presence of a driver acceleration approval request (that is, the determination result in step 1002). This makes it possible to provide a margin for driving changeover.

Still another embodiment will be described with reference to the device configuration views illustrated in FIGS. 1 and 2 and the time charts illustrated in FIGS. 19 to 30. The vertical axes and the horizontal axes in FIGS. 19 to 30 are similar to those in FIG. 9C. Hereinafter, for each of the plurality of additional embodiments, a scene in which the automated driving at Level 3 (that is, automated driving in congestion or low-speed automated driving) is ended and the driving transitions to Level 2 by the speed recovery accompanying the congestion clearing will be described as a specific example.

With reference to FIGS. 19 to 30, in the following additional embodiments, congestion determination speed included in a congestion start determination condition is VJ (for example, 10 km/h) for the sake of simplicity of description. The upper limit speed of the automated driving is VH (for example, 60 km/h). The upper limit speed VH corresponds to the predetermined value V1 in FIGS. 9C and 10. That is, during automated driving, the vehicle speed of the subject vehicle is restricted to equal to or lower than the upper limit speed VH. Then, in order to set the vehicle speed of the subject vehicle higher than the upper limit speed VH, the automated driving ends when the vehicle speed reaches a region equal to or higher than the upper limit speed VH by acceleration control. T0 is determination time for congestion clearing, and corresponds to the processing time point of step 911 in the examples of FIGS. 9A to 10. T1 is end time of the automated driving, that is, the transition time of the driving automation level from Level 3 to Level 2.

Additional Embodiment 1

Figure 19:
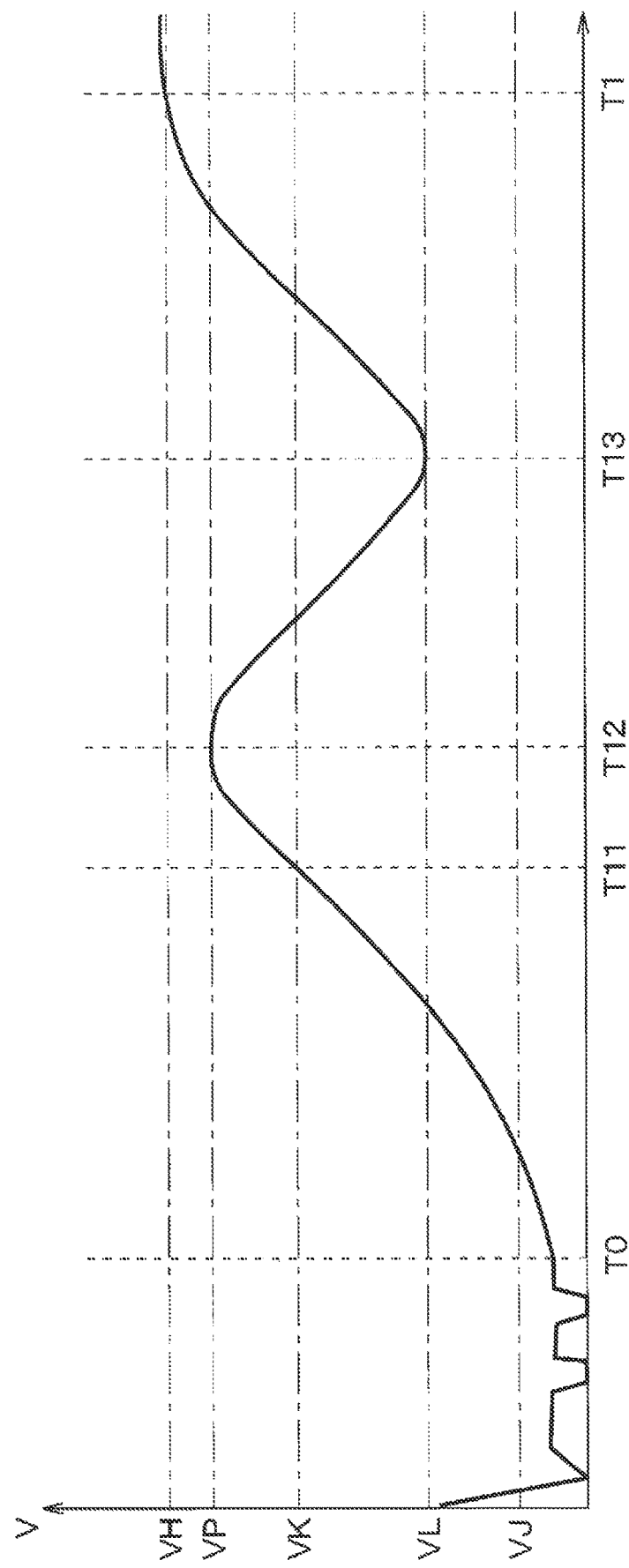
FIG. 19 is a time chart illustrating an outline of operation of an in-vehicle system according to an additional embodiment 1.
Figure 20:
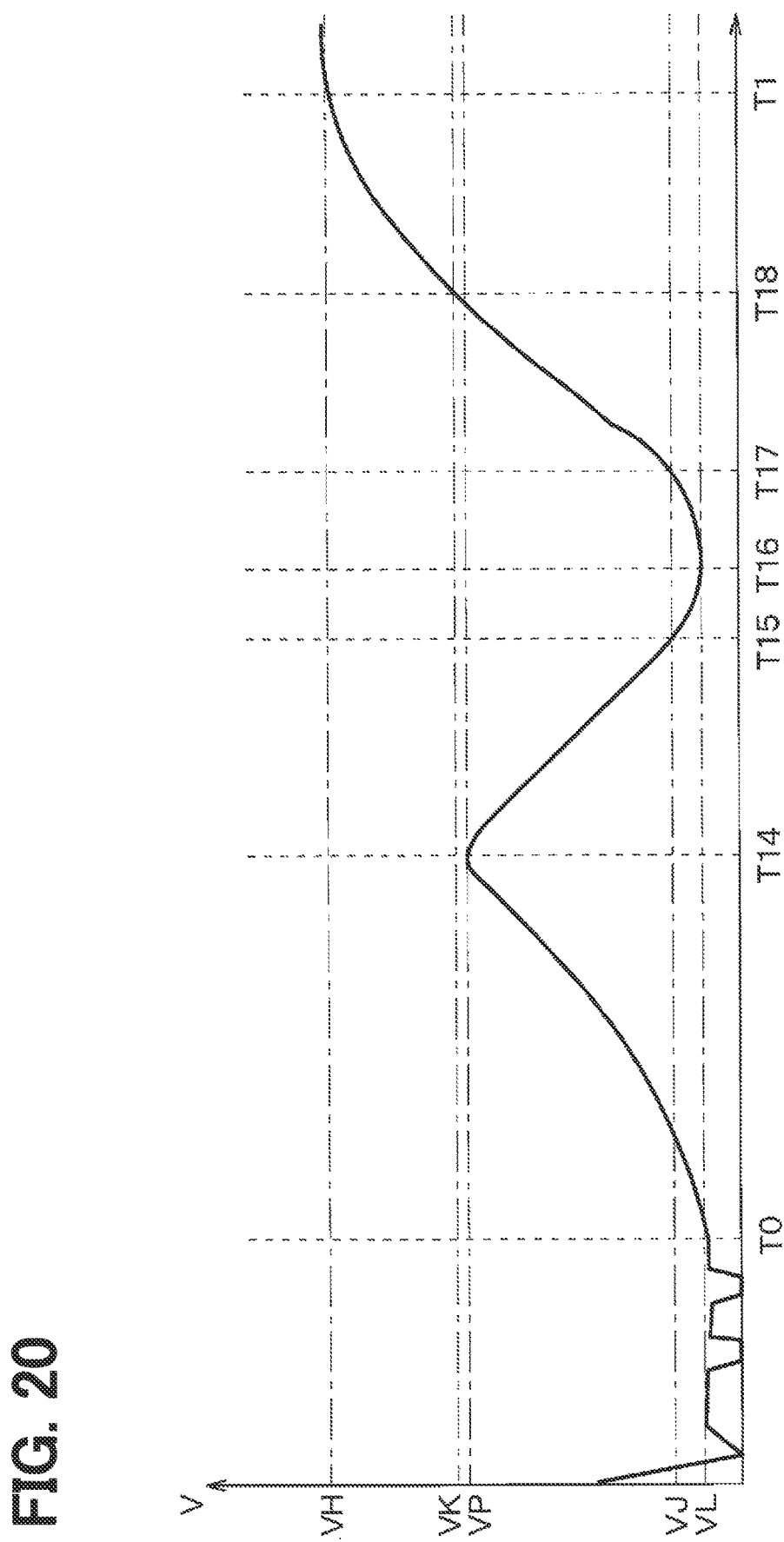
FIG. 20 is a time chart illustrating an outline of the operation of the in-vehicle system according to the additional embodiment 1.

FIGS. 19 and 20 are time charts corresponding to the operation of the present additional embodiment. As illustrated in FIGS. 19 and 20, when congestion is determined to have been cleared at time T0 and the speed recovery processing starts, the vehicle speed of the subject vehicle increases. When the vehicle speed reaches the upper limit speed VH at time T1, the automated driving at Level 3 ends, and the driving automation level transitions from Level 3 to Level 2.

The example of FIG. 19 assumes that the vehicle speed of the subject vehicle changes in the following course. The vehicle speed of the subject vehicle starts increasing at time T0 and reaches a reference speed VK at time T11. The reference speed VK is a speed higher than the congestion determination speed VJ and lower than the upper limit speed VH as the "predetermined speed", and can also be referred to as "intermediate speed" or "second task end speed". Specifically, the reference speed VK is, for example, a mean speed of the congestion determination speed VJ and the upper limit speed VH or a speed higher than this, and is typically 40 km/h. The reference speed VK corresponds to the predetermined value V0 in FIGS. 9B and 9C.

Although the vehicle speed of the subject vehicle continues to increase at and after time T11, it once reaches a peak at time T12 before reaching the upper limit speed VH and then turns to decrease. In the present example, a peak speed VP at time T12 is a speed lower than the upper limit speed VH, specifically, a speed between the reference speed VK and the upper limit speed VH.

At and after time T12, the vehicle speed of the subject vehicle decreases until reaching a minimum speed VL at time T13. In this example, the minimum speed VL is a speed higher than the congestion determination speed VJ and lower than the reference speed VK. The vehicle speed of the subject vehicle starts increasing again at and after time T13 and reaches the upper limit speed VH at time T1. When the vehicle speed of the subject vehicle reaches the upper limit speed VH, the automated driving ends, and the driving automation level is switched to Level 2.

The example of FIG. 20 assumes that the vehicle speed of the subject vehicle changes in the following course. First, the increase starts at time T0, reaches a peak at time T14 before reaching the upper limit speed VH, and then turns to decrease. In the present example, the peak speed VP at time T14 is lower than the reference speed VK. The vehicle speed of the subject vehicle started to decrease at and after time T14 decreases to the congestion determination speed VJ at time T15 and then reaches the minimum speed VL at time T16. In this example, the minimum speed VL is lower than the congestion determination speed VJ. The vehicle speed of the subject vehicle starts increasing again at and after time T16, and increases to the congestion determination speed VJ at time T17. That is, from time T15 to time T17, the subject vehicle travels in congestion in a generated re-congestion section. The vehicle speed of the subject vehicle started to increase at and after time T16, and reaches the reference speed VK at time T18. Thereafter, when the vehicle speed of the subject vehicle reaches the upper limit speed VH at time T1, the automated driving ends, and the driving automation level is switched to Level 2.

In the present additional embodiment, similarly to the first embodiment, when the driver behavior after the presentation of the attention information acquired by the second behavior acquisition unit 253 is handover behavior, the second task control unit 258 ends the second task later than when the driver behavior is non-handover behavior. That is, when the driver takes the driving posture by handover behavior, the second task control unit 258 permits continuation of the second task until the vehicle speed of the subject vehicle reaches the predetermined reference speed VK by the speed recovery at the time of congestion clearing.

Specifically, when the driver does not take the driving posture, the second task control unit 258 ends the second task at time T0. On the other hand, when the driver takes the driving posture, the second task control unit 258 permits execution of the second task until time T11 or time T18 after time T0, and ends the second task at time T11 or time T18. This makes it possible to urge the driver to perform driving changeover operation when the driving changeover is not ready, and improves convenience when the driving changeover preparation is ready.

As in the examples of FIGS. 19 and 20, there may be a case where the acceleration control is intermittently repeated in the subject vehicle during a period from time T0 when it is determined that the congestion is cleared and the speed recovery processing is started to time T1 when the vehicle speed of the subject vehicle reaches the upper limit speed VH and the automated driving is ended. In this regard, in the present additional embodiment, the second task control unit 258 does not permit the second task again after once ending the second task at time T0 or time T11, and maintains the end of the second task until time T1 when the automated driving is ended. That is, the second task control unit 258 does not permit execution of the second task even if the vehicle speed of the subject vehicle increases to the upper limit speed VH after ending the second task in association with congestion clearing and another congestion is generated before ending the automated driving. This makes it possible to avoid annoyance due to restart and re-end of the second task in a short time, and improves convenience.

Additional Embodiment 2

In the additional embodiment 1, in a case where the automated driving is ended due to congestion clearing, once the second task is ended, the second task end is maintained regardless of subsequent speed change history (that is, regardless of whether or not the peak speed VP exceeds the reference speed VK and presence of re-congestion). However, whether or not the second task should be made available again when re-congestion is generated after congestion is once cleared during automated driving may vary depending on the traffic circumstances in each country, the user needs, or the like.

In this regard, in the present additional embodiment, execution of the second task at the time of re-congestion is permitted depending on the speed change history after the second task is once ended in association with congestion clearing. Specifically, in the present additional embodiment, whether or not to make the second task available again during the re-congestion is distinguished depending on whether or not the peak speed VP exceeds the reference speed VK. More specifically, when the vehicle speed of the subject vehicle reaches the reference speed VK due to the speed recovery at the time of congestion clearing, the second task control unit 258 does not permit execution of the second task even if the vehicle speed increases to the upper limit speed VH thereafter and the another congestion is generated before the automated driving ends.

Figure 21:
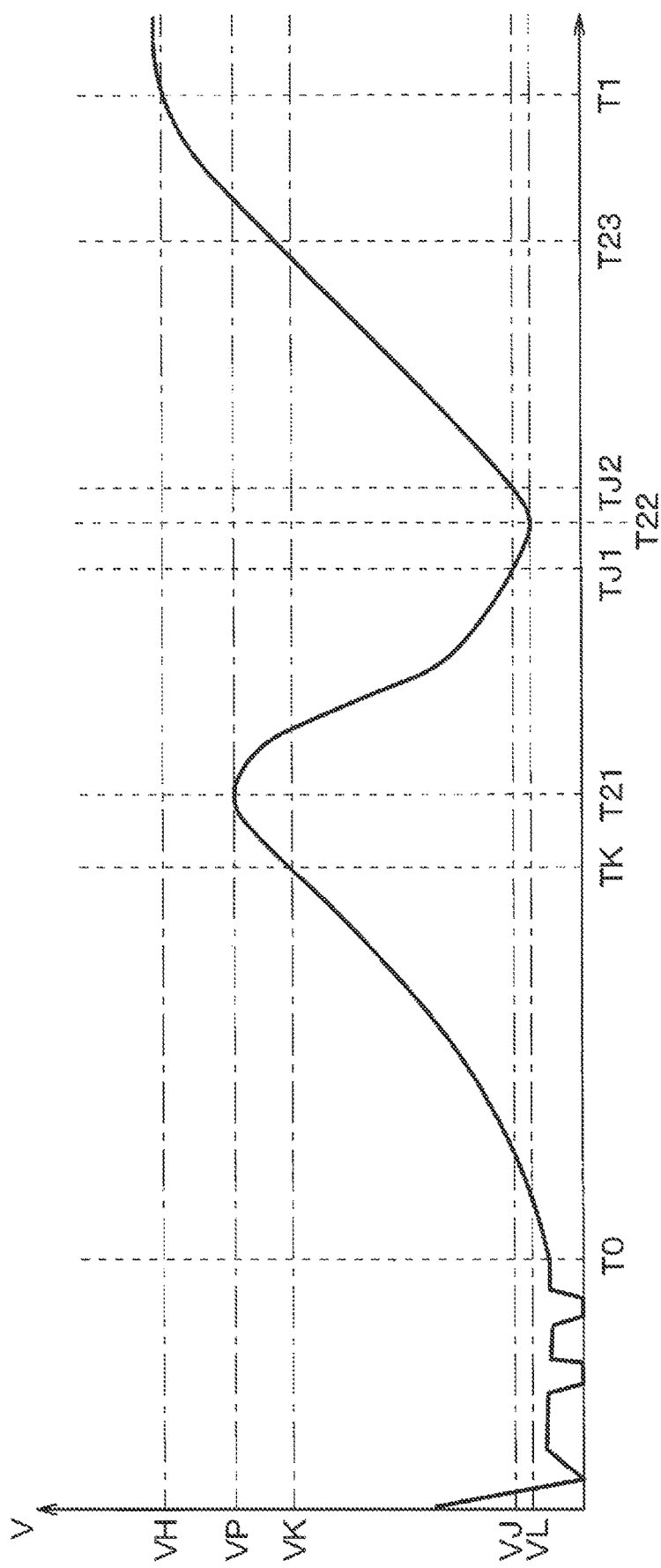
FIG. 21 is a time chart illustrating an outline of operation of an in-vehicle system according to an additional embodiment 2.
Figure 22:
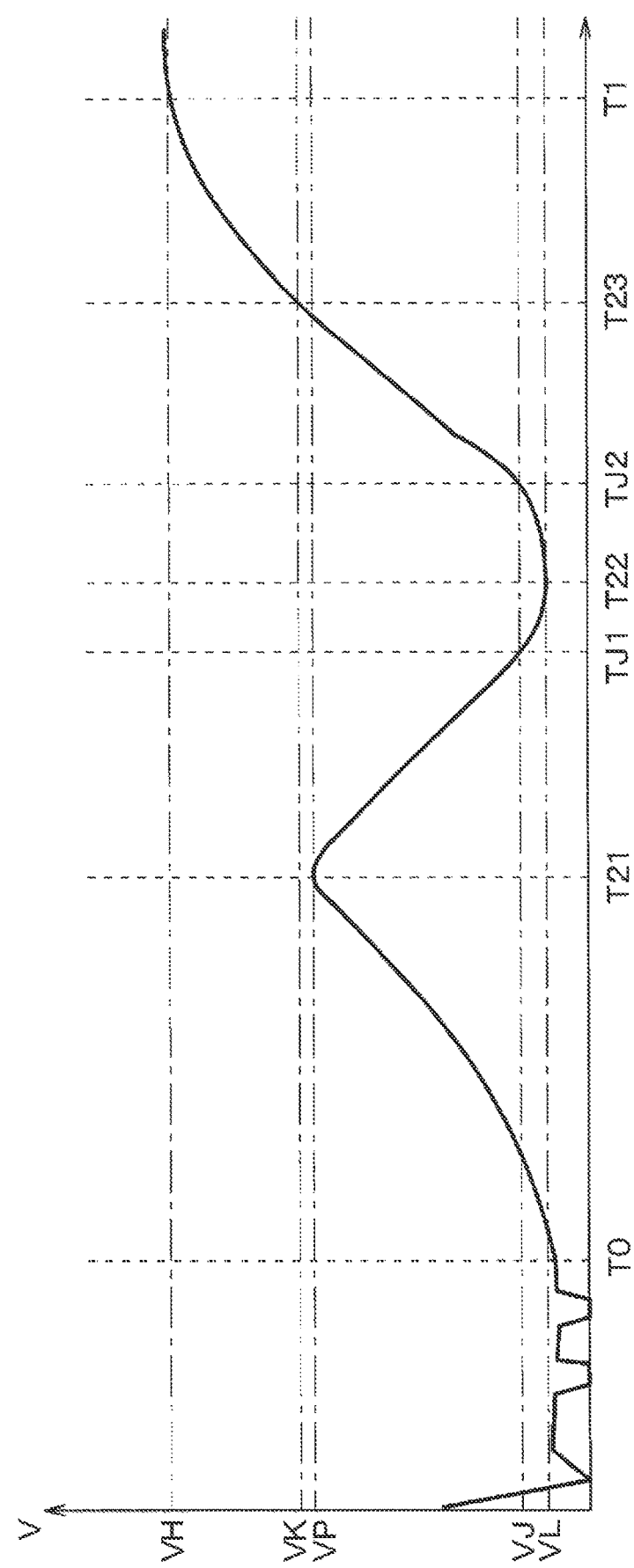
FIG. 22 is a time chart illustrating an outline of the operation of the in-vehicle system according to the additional embodiment 2.

FIGS. 21 and 22 illustrate examples of speed change history corresponding to the present additional embodiment. The examples of FIGS. 21 and 22 assume that the vehicle speed of the subject vehicle changes in the following course. The vehicle speed of the subject vehicle first starts to increase at time T0, once reaches the peak speed VP at time T21, then turns to decrease, and reaches the minimum speed VL at time T22. In a time period TJ1 to TJ2 around time T22, the vehicle travels at an extremely low speed equal to or lower than the congestion determination speed VJ, that is, travels in congestion. The vehicle speed of the subject vehicle starts increasing again at and after time T22, and reaches the reference speed VK at time T23. Thereafter, when the vehicle speed of the subject vehicle reaches the upper limit speed VH at time T1, the automated driving ends, and the driving automation level is switched to Level 2.

In the example of FIG. 21, the peak speed VP is higher than the reference speed VK. That is, the vehicle speed of the subject vehicle reaches the reference speed VK at time TK before time T21. Therefore, the second task ends at time TK at the latest and TO at the earliest depending on whether or not the driver takes the driving posture. On the other hand, in the example of FIG. 22, the peak speed VP is lower than the reference speed VK. Therefore, if the driver takes the driving posture, the second task can be continued until time T23.

As in the example of FIG. 21, in a case where the speed recovery is started from time TO due to congestion clearing and the speed can be accelerated to the reference speed VK at time TK, the possibility of generation of re-congestion having a length that allows the user to enjoy the second task for a certain period of time thereafter decreases. Therefore, in this case, even if the second task end is maintained until the end of the automated driving after the second task is ended at time TO or time TK, there is a high possibility that the driver does not particularly feel uncomfortable. On the other hand, as in the example of FIG. 22, in a case where the speed is decelerated again without recovering to the reference speed VK, the possibility of generation of re-congestion having a length that allows the user to enjoy the second task for a certain period of time thereafter increases.

Therefore, in the present embodiment, when the peak speed VP exceeds the reference speed VK, that is, when the vehicle speed of the subject vehicle exceeds the reference speed VK even once after the second task is once ended, the execution of the second task in re-congestion TJ1 to TJ2 is not permitted. Specifically, in the example of FIG. 21 where the peak speed VP exceeds the reference speed VK, the execution of the second task in the re-congestion TJ1 to TJ2 in a short time is not permitted. This makes it possible to avoid annoyance due to restart and re-end of the second task in a short time. On the other hand, in the example of FIG. 22 in which the peak speed VP does not exceed the reference speed VK, the re-congestion TJ1 to TJ2 for a relatively long time is generated, and accordingly, execution of the second task is permitted. When the driver does not take the driving posture at time TJ2 or a time point before a predetermined time, the second task ends again at time TJ2. On the other hand, when the driver takes a driving posture at time TJ2 or a time point before a predetermined time, the second task can be continued until time T23.

Additional Embodiment 3

In the present additional embodiment, similarly to the additional embodiment 2, whether or not to make the second task available again during the re-congestion is distinguished depending on whether or not the peak speed VP exceeds the reference speed VK. However, contrary to the additional embodiment 2, in the present additional embodiment, when the peak speed VP does not reach the reference speed VK, even if the vehicle speed increases to the upper limit speed VH thereafter and another congestion is generated before the automated driving ends, the execution of the second task is not permitted.

Figure 23:
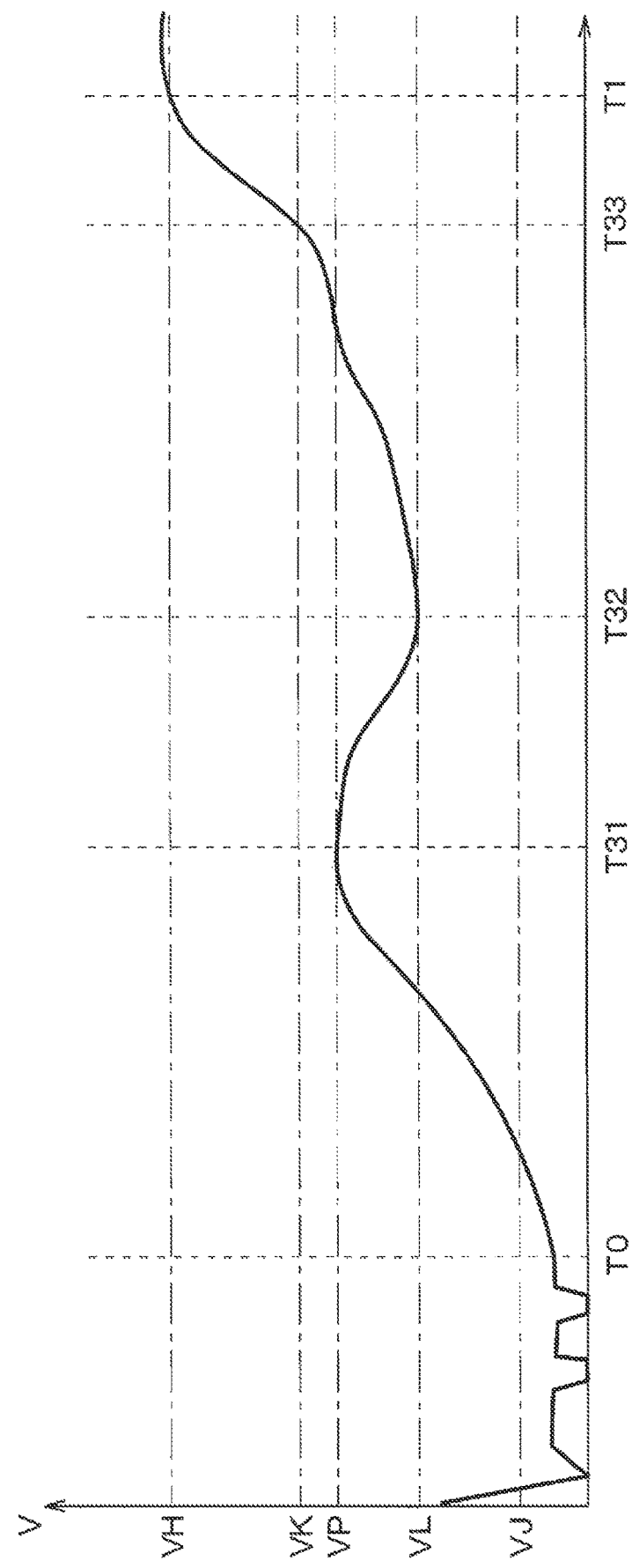
FIG. 23 is a time chart illustrating an outline of operation of an in-vehicle system according to an additional embodiment 3.
Figure 24:
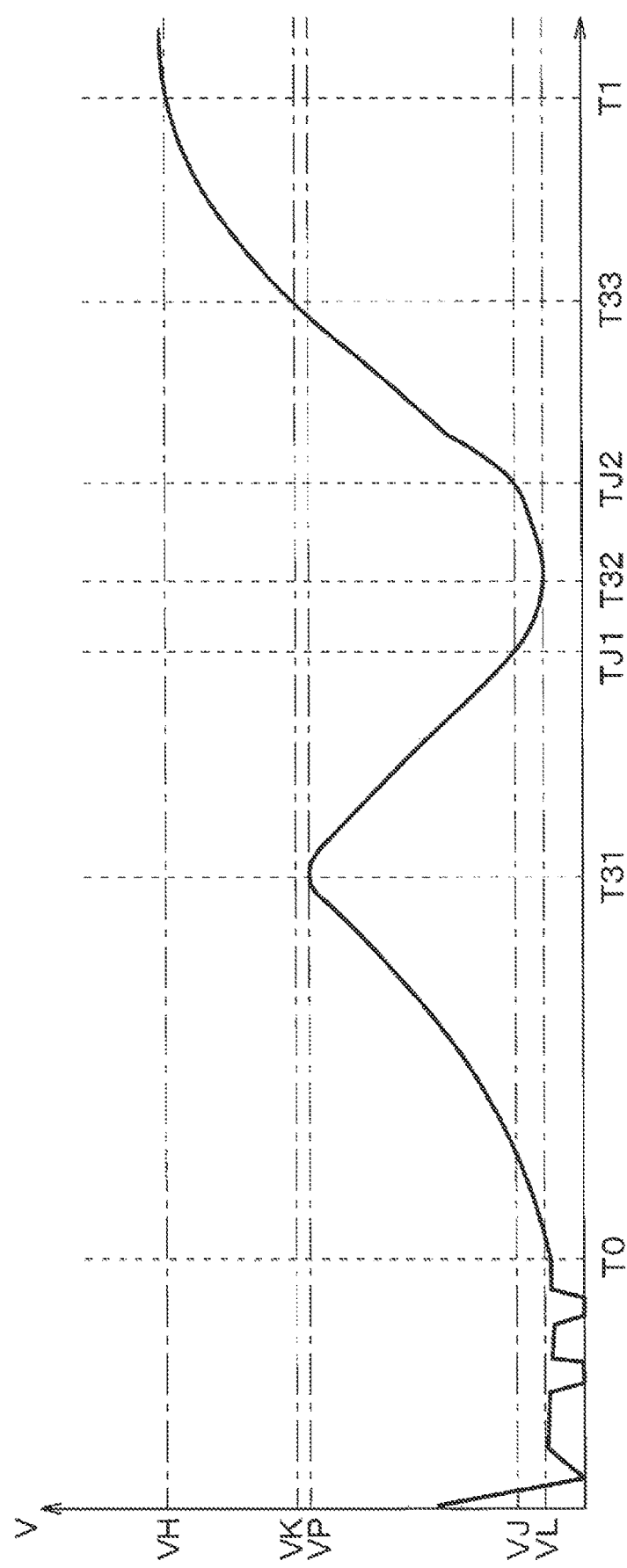
FIG. 24 is a time chart illustrating an outline of the operation of the in-vehicle system according to the additional embodiment 3.
Figure 25:
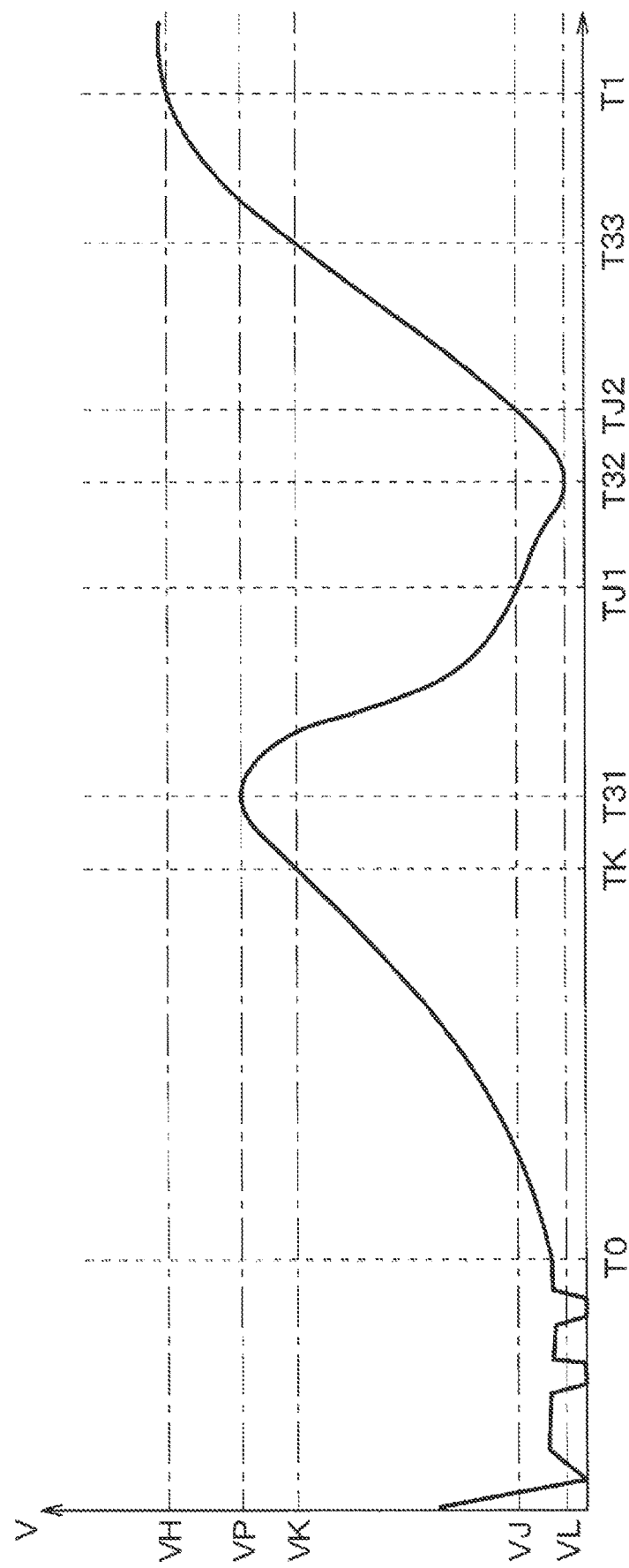
FIG. 25 is a time chart illustrating an outline of the operation of the in-vehicle system according to the additional embodiment 3.

FIGS. 23 to 25 illustrate examples of the speed change history corresponding to the present additional embodiment.

The examples of FIGS. 23 to 25 assume that the vehicle speed of the subject vehicle changes in the following course. The vehicle speed of the subject vehicle first starts to increase at time TO, once reaches the peak speed VP at time T31, then turns to decrease, and reaches the minimum speed VL at time T32. The vehicle speed of the subject vehicle starts increasing again at and after time T32, and reaches the reference speed VK at time T33. Thereafter, when the vehicle speed of the subject vehicle reaches the upper limit speed VH at time T1, the automated driving ends, and the driving automation level is switched to Level 2.

In the example of FIG. 23, the peak speed VP is lower than the reference speed VK. The minimum speed VL is higher than the congestion determination speed VJ. Furthermore, the decrease width from the peak speed VP to the minimum speed VL is also small. Then, at and after time T32, the vehicle speed of the subject vehicle increases relatively slowly until time T33. In this example, when the driver takes the driving posture by handover behavior, the second task control unit 258 permits continuation of the second task also at and after time TO until time T33 when the vehicle speed of the subject vehicle reaches the reference speed VK. On the other hand, when the driver does not take the driving posture, the second task control unit 258 ends the second task at time T0 and maintains the end state of the second task until time T1.

In the examples of FIGS. 24 and 25, congested travel at equal to or lower than the congestion determination speed VJ is generated in the time period TJ1 to TJ2 around time T32. However, in the example of FIG. 24, the peak speed VP is lower than the reference speed VK. On the other hand, in the example of FIG. 25, the peak speed VP is higher than the reference speed VK.

As in the example of FIG. 25, for a scene in which the speed is recovered until reaching the reference speed VK, but thereafter, the speed decelerates to equal to or lower than the congestion determination speed VJ, for example, it is conceivable a case where the congestion is once cleared, and then the vehicle enters long-term congestion again. Then, in the example of FIG. 24, the execution of the second task in the re-congestion, that is, the time period TJ1 to TJ2 is not permitted. On the other hand, in the example of FIG. 25, the execution of the second task in the re-congestion, that is, the time period TJ1 to TJ2 is permitted. In this manner, with the second task permission condition again of becoming equal to or higher than the reference speed VK, it is possible to provide the driver with execution of the second task suitable for an actual congestion scene, and convenience is improved. When the driver does not take the driving posture at time TJ2 or a time point before a predetermined time, the second task ends again at time TJ2. On the other hand, when the driver takes a driving posture at time TJ2 or a time point before a predetermined time, the second task can be continued until time T33.

Additional Embodiment 4

In the present additional embodiment, unlike the additional embodiments 2 and 3, the second task can be used again during re-congestion regardless of the speed change history. That is, the second task control unit 258 permits execution of the second task in a case where after ending the second task in association with congestion clearing, the vehicle speed of the subject vehicle increases to the upper limit speed VH and another congestion is generated before the automated driving ends.

Figure 26:
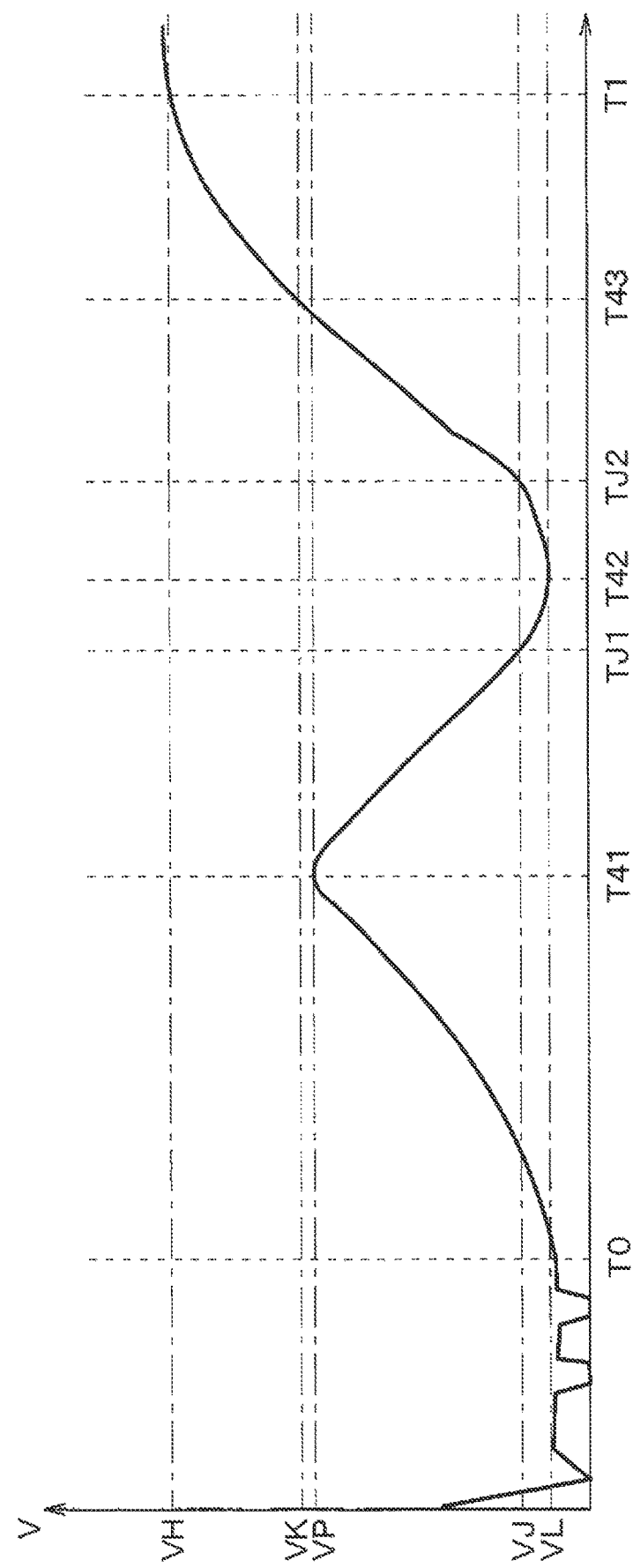
FIG. 26 is a time chart illustrating an outline of operation of an in-vehicle system according to an additional embodiment 4.
Figure 27:
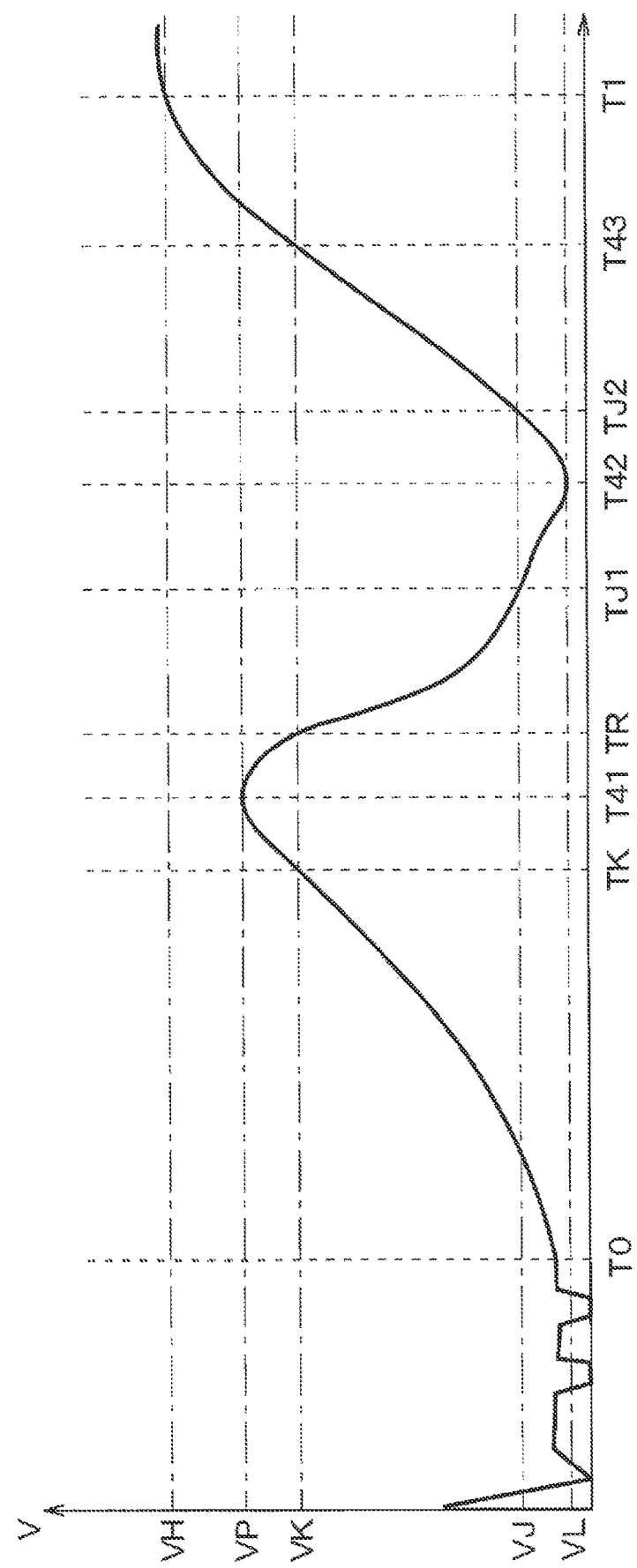
FIG. 27 is a time chart illustrating an outline of the operation of the in-vehicle system according to the additional embodiment 4.

FIGS. 26 and 27 illustrate examples of the speed change history corresponding to the present additional embodiment. The examples of FIGS. 26 and 27 assume that the vehicle speed of the subject vehicle changes in the following course. The vehicle speed of the subject vehicle first starts to increase at time T0, once reaches the peak speed VP at time T41, then turns to decrease, and reaches the minimum speed VL at time T42. In the time period TJ1 to TJ2 around time T42, congested travel at equal to or lower than the congestion determination speed VJ is generated. The vehicle speed of the subject vehicle starts increasing again at and after time T42, and reaches the reference speed VK at time T43. Thereafter, when the vehicle speed of the subject vehicle reaches the upper limit speed VH at time T1, the automated driving ends, and the driving automation level is switched to Level 2.

In the present additional embodiment, the second task can be executed at least in the time period TJ1 to TJ2 during the congestion travel in re-congestion section. Specifically, in the examples of FIGS. 26 and 27, the second task can be executed again at time TJ1 even if the second task is once ended at time T0 because the driver does not take the driving posture. In the example of FIG. 27, the second task can be executed again at time TJ1 even if the driver takes the driving posture, the vehicle speed of the subject vehicle reaches the reference speed VK at time TK, and the second task is once ended. Therefore, the display control unit 257 executes information presentation regarding the re-congestion at time TJ1 or a predetermined time before time TJ1.

When the driver does not take the driving posture at time TJ2 or a time point before a predetermined time, the second task ends again at time TJ2. On the other hand, when the driver takes a driving posture at time TJ2 or a time point before a predetermined time, the second task can be continued until time T43. In the example of FIG. 26, when the driver takes the driving posture, the second task can be executed in the period of time T0 and T43.

Here, in the example of FIG. 26, the peak speed VP is lower than the reference speed VK. That is, in the case of this example, the vehicle speed of the subject vehicle does not reach the reference speed VK due to the speed recovery started from time T0. In a case of such a relatively slow speed recovery, there is a high possibility that the subject vehicle will again travel at a low speed or travel in congestion. Therefore, there is a high possibility that the driver does not take the driving posture until time T43 when the vehicle speed of the subject vehicle reaches the reference speed VK.

On the other hand, in the example of FIG. 27, the peak speed VP is higher than the reference speed VK. In this example, there is a high possibility that the driver takes a driving posture at the stage when the vehicle speed of the subject vehicle reaches the reference speed VK due to a driving changeover request at the time of speed recovery started from time T0. However, as illustrated in FIG. 27, in a case where the speed decrease at and after time T41 when the vehicle reaches the peak speed VP is relatively steep, there is a high possibility that the subject vehicle travels at a low speed again or travels in congestion again. It is not convenient for the driver to keep taking the driving posture while there is a high possibility of entering congestion again.

Therefore, as in the example of FIG. 27, in a case where the peak speed VP is equal to or higher than the reference speed VK, the display control unit 257 executes predetermined information presentation at time TR when the speed decelerates to the reference speed VK after reaching the peak speed VP and started decelerating. The predetermined information presentation includes information presentation indicating that the second task execution permission is waited until generation of congestion again although the speed is once decelerated. The predetermined information presentation includes information presentation indicating that the driver does not need to take the driving posture at the present stage.

That is, when the vehicle speed of the subject vehicle exceeds the reference speed VK and then becomes equal to or lower than the reference speed VK again, the display control unit 257 notifies the driver that the execution of the second task is not permitted immediately and the execution of the second task is permitted due to re-congestion. Specifically, for example, the display control unit 257 notifies information that "has decelerated once, but you can't execute the second task until congestion is generated again" by display onto the meter display 212 or the like and/or sound. The display control unit 257 notifies information that "relax until next notification" by display onto the meter display 212 or the like and/or sound. This makes it possible to enhance convenience for the driver.

Additional Embodiment 5

The following additional embodiment is the above-described additional embodiment 4 with partial modification. That is, in the following additional embodiment, the second task can be used again during re-congestion depending on the generation situation of re-congestion after the congestion is once cleared and the speed recovery is started at time T0. To simplify the description, the following description of the additional embodiment assumes that the second task ends at time T0 because the driver does not take the driving posture.

Even if the congestion (that is, first congestion described later) that triggered the start of the current automated driving is cleared and the speed recovery is started, there is a possibility that re-congestion is generated as described above. However, there is a possibility that such re-congestion is cleared again in a very short time. For this reason, if the second task is immediately available every time re-congestion is generated, there is a concern that the driver gets annoyed due to restart and re-end of the second task in a short time.

Therefore, in the following additional embodiment, a predetermined restriction condition is added to the second task execution permission at the time of re-congestion. Specifically, in the present additional embodiment, the second task control unit 258 does not permit execution of the second task even if the second congestion is generated after ending the second task in association with clearing of the first congestion. The "first congestion" is the first congestion during automated driving. Note that the "first congestion" may be from before the start of the automated driving or from after the start of the automated driving. The "second congestion" is the next congestion to the first congestion. In other words, the "second congestion" is congestion that is generated next to the first congestion, before the vehicle speed of the subject vehicle increases to the upper limit speed VH and the automated driving ends after the first congestion was cleared. On the other hand, the second task control unit 258 permits execution of the second task when the vehicle speed of the subject vehicle increases to the upper limit speed VH after clearing of the second congestion and the another congestion is generated before the automated driving ends.

Figure 28:
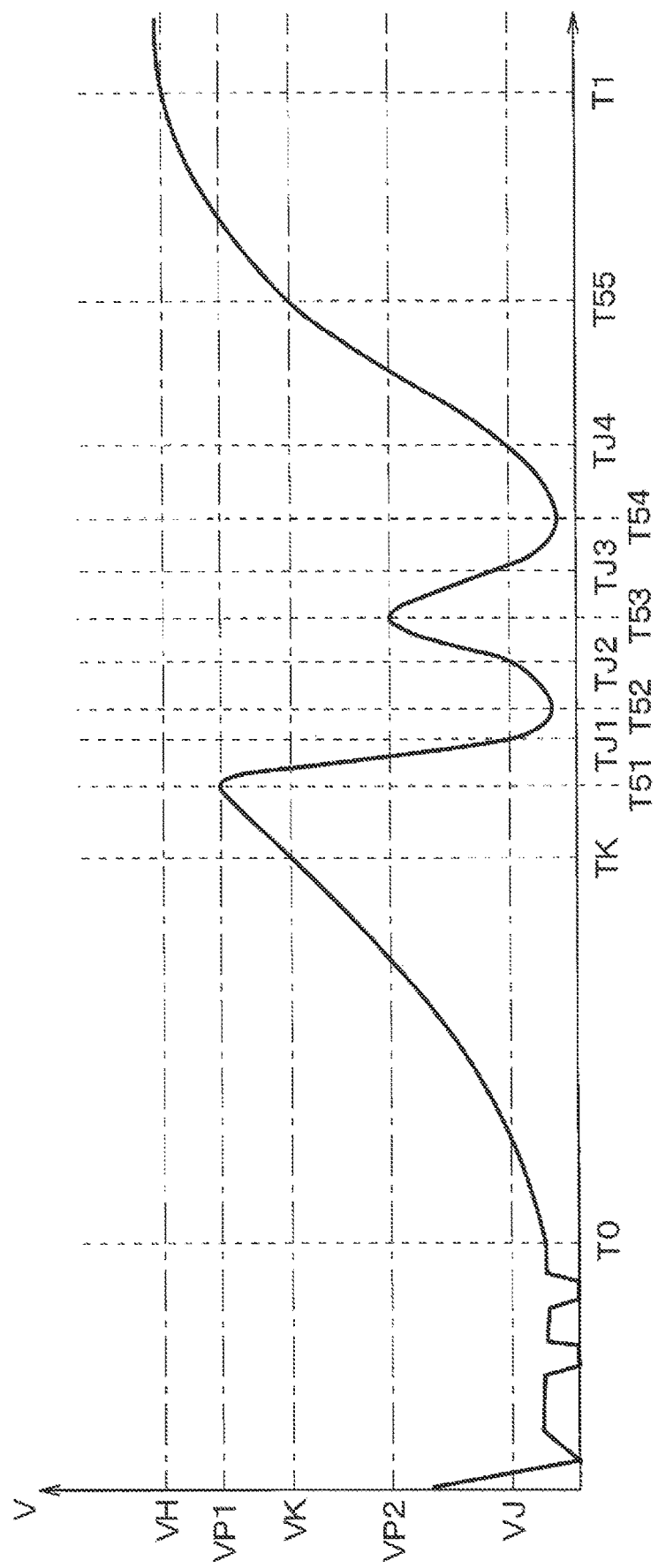
FIG. 28 is a time chart illustrating an outline of operation of an in-vehicle system according to an additional embodiment 5.

FIG. 28 is a time chart for explaining the operation corresponding to the present additional embodiment. The example of FIG. 28 assumes that the vehicle speed of the subject vehicle changes in the following course. First, the vehicle speed of the subject vehicle first starts to increase at time T0, once reaches the peak speed VP1 at time T51, then turns to decrease, and reaches the minimum speed at time T52. VP1<VH. In the time period TJ1 to TJ2 around time T52, congested travel at equal to or lower than the congestion determination speed VJ is generated. The vehicle speed of the subject vehicle starts increasing again at and after time T52, reaches the peak speed VP2 at T53, starts decreasing again, and reaches the minimum speed at time T54. VP2<VH. In the time period TJ3 to TJ4 around time T54, congested travel at equal to or lower than the congestion determination speed VJ is generated. The vehicle speed of the subject vehicle starts increasing again at and after time T54, and reaches the reference speed VK at time T55. Thereafter, when the vehicle speed of the subject vehicle reaches the upper limit speed VH at time T1, the automated driving ends, and the driving automation level is switched to Level 2.

The present additional embodiment does not permit execution of the second task when the second congestion TJ1 to TJ2 is generated, but permits execution of the second task when the third congestion TJ3 to TJ4 is generated. Thus, in the present additional embodiment, the second task is not permitted again only by becoming once equal to or lower than the congestion determination speed VJ after the first congestion is cleared. Due to this, by permitting the second task again from the timing when re-congestion can be determined to be surely congestion, it becomes possible as much as possible to avoid causing the driver to get annoyed.

Additional Embodiment 6

The present additional embodiment is the above-described additional embodiment 5 with partial modification. That is, similarly to the additional embodiment 5, also in the present additional embodiment, a predetermined restriction condition is added to the second task execution permission at the time of re-congestion. However, the restriction condition is different from that of the additional embodiment 5.

Figure 29:
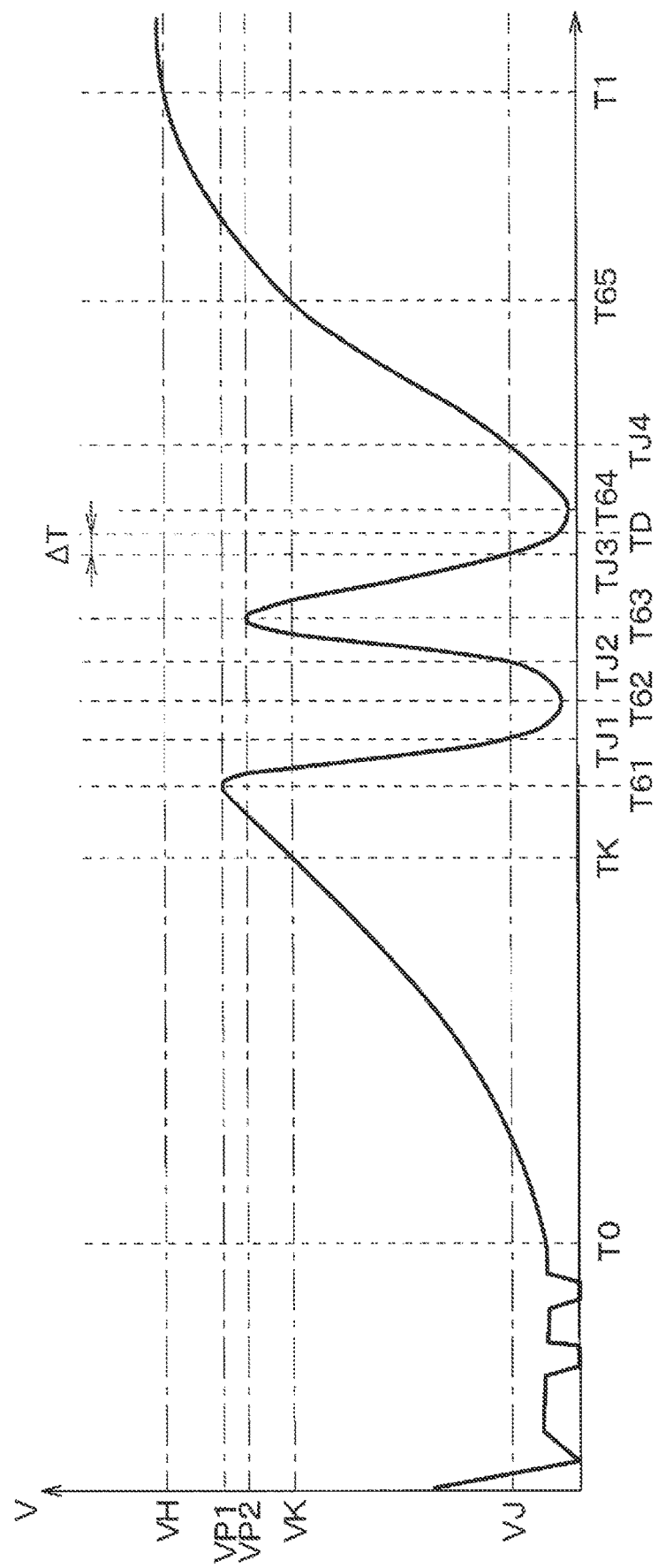
FIG. 29 is a time chart illustrating an outline of operation of an in-vehicle system according to an additional embodiment 6.

FIG. 29 is a time chart for explaining the operation corresponding to the present additional embodiment. The example of FIG. 29 assumes that the vehicle speed of the subject vehicle changes in the following course. The vehicle speed of the subject vehicle first starts to increase at time T0, once reaches the peak speed VP1 at time T61, then turns to decrease, and reaches the minimum speed at time T62. VK<VP1<VH. In the time period TJ1 to TJ2 around time T62, congested travel at equal to or lower than the congestion determination speed VJ is generated. The vehicle speed of the subject vehicle starts increasing again at and after time T62, reaches the peak speed VP2 at T63, starts decreasing again, and reaches the minimum speed at time T64. VK<VP2<VH. In the time period TJ3 to TJ4 around time T64, congested travel at equal to or lower than the congestion determination speed VJ is generated. The vehicle speed of the subject vehicle starts increasing again at and after time T64, and reaches the reference speed VK at time T65. Thereafter, when the vehicle speed of the subject vehicle reaches the upper limit speed VH at time T1, the automated driving ends, and the driving automation level is switched to Level 2.

When re-congestion is generated after the speed exceeds the reference speed VK due to the speed recovery accompanying congestion clearing, there is a high possibility that the re-congestion is cleared relatively early. Therefore, the second task control unit 258 sets waiting time $\Delta T$ in a case where the execution of the second task is permitted after the second task is once ended.

That is, when the vehicle speed of the subject vehicle becomes equal to or lower than the congestion determination speed VJ, the second task control unit 258 does not immediately permit execution of the second task. The second task control unit 258 permits execution of the second task at time TD when the state of being equal to or lower than the congestion determination speed VJ continues for a predetermined time (that is, the waiting time $\Delta T$). This makes it possible to avoid annoyance due to repetition of restart and re-end of the second task in a short time, and improves convenience.

The present additional embodiment, similarly to the additional embodiment 5, does not permit execution of the second task when the second congestion TJ1 to TJ2 is generated, but permits execution of the second task when the third congestion TJ3 to TJ4 is generated. Therefore, in the typical example illustrated in FIG. 29, the waiting time $\Delta T$ is not provided for the second congestion but is provided for the third congestion.

Furthermore, in consideration of the possibility that the more the number of times of re-congestion is, the earlier the re-congestion clearing becomes, in the present additional embodiment, the second task control unit 258 sets the waiting time to be longer according to an increase in the number of times of congestion during automated driving. That is, the second task control unit 258 sets the waiting time $\Delta T$ for the Nth congestion to be longer than the waiting time $\Delta T$ for the Mth congestion. N=M+1. Specifically, the second task control unit 258 sets the waiting time $\Delta T$ to be longer as the value of the counter for counting the number of times of re-congestion increases. Such a counter is reset at the time of end of the automated driving, and is set to an initial value at the time point of start of the automated driving.

Additional Embodiment 7

Figure 30:
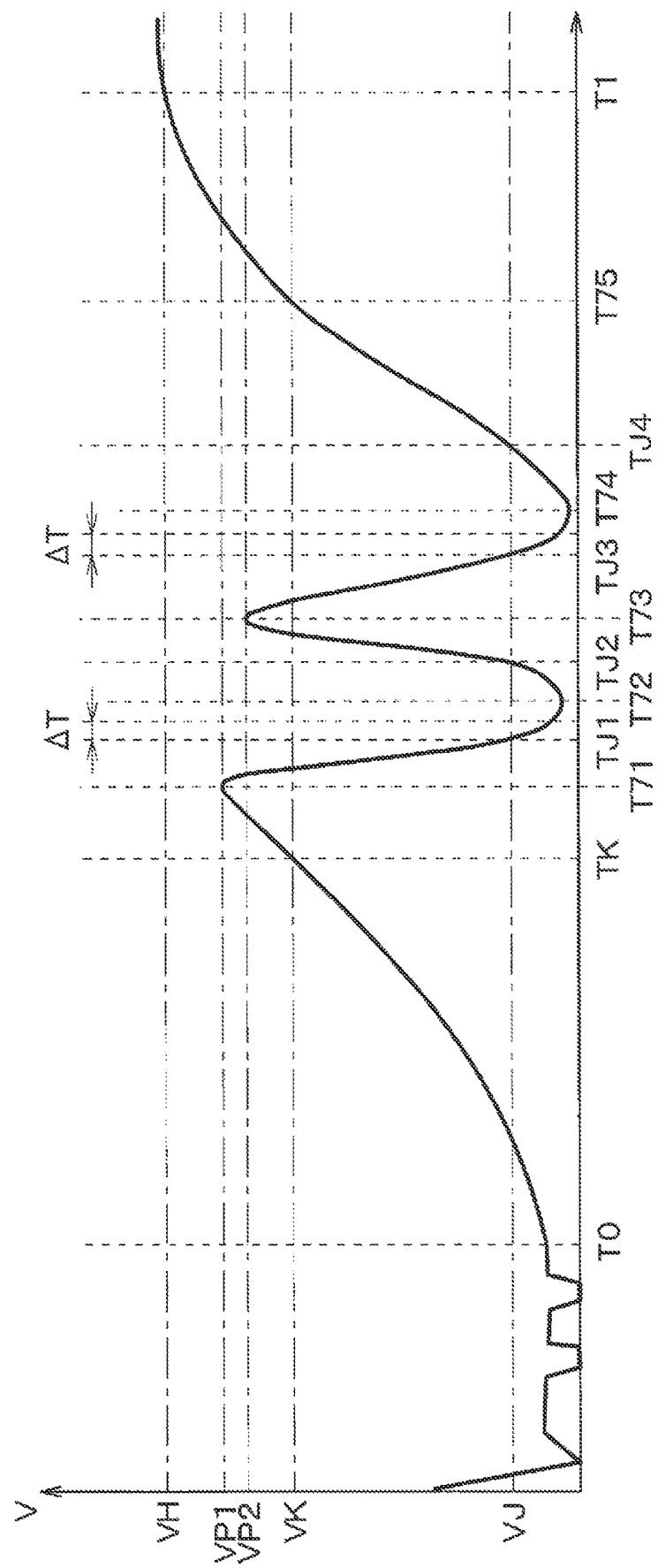
FIG. 30 is a time chart illustrating an outline of operation of an in-vehicle system according to an additional embodiment 7.

The present additional embodiment is the above-described additional embodiment 6 with partial modification. FIG. 30 is a time chart for explaining the operation corresponding to the present additional embodiment. A vehicle speed fluctuation mode in the example of FIG. 30 is similar to that in the example of FIG. 29. That is, times T71 to T75 in FIG. 30 correspond to times T61 to T65, respectively, in FIG. 29.

In the present additional embodiment, as illustrated in FIG. 30, the waiting time $\Delta T$ is also provided for the second congestions TJ1 and TJ2. According to this, in a case where the second congestion is short in time as to end during the waiting time $\Delta T$, execution of the second task in the second congestion is not permitted. On the other hand, in a case where the second congestion is estimated to be long by a predetermined degree, execution of the second task is permitted. Due to this, by permitting the second task again from the timing when re-congestion can be determined to be surely congestion, it is possible to reduce annoyance to the driver. That is, similar effects to those of the additional embodiment 5 can be achieved.

In the present additional embodiment, as illustrated in FIG. 30, the waiting time $\Delta T$ for the third congestion is set longer than the waiting time $\Delta T$ for the second congestion. That is, the second task control unit 258 sets the waiting time $\Delta T$ for the Nth congestion to be longer than the waiting time $\Delta T$ for the Mth congestion as in the additional embodiment 6. N=M+1. Due to this, by permitting the second task again from the timing when re-congestion can be determined to be surely congestion, it becomes possible as much as possible to avoid causing the driver to get annoyed.

Other Additional Embodiments

Note that appropriate modifications can be made to each of the above-described additional embodiments. Specifically, for example, the congestion determination speed VJ or the reference speed VK may be the same as the threshold speed described above.

Similar expressions such as "acquisition", "calculation", "estimation", "detection", "sensing", and "determination" can be appropriately replaced with one another within a range free from technical conflict. Also, "detection", "sensing", and "extraction" can be appropriately replaced with one another within a range free from technical conflict. The inequality signs in each determination processing may be with equality signs or without equality signs. That is, for example, "equal to or greater than a predetermined value" can be altered to "greater than a predetermined value". Similarly, "equal to or less than a predetermined value" can be altered to "less than a predetermined value".

The element(s) of each of the above embodiments is/are not necessarily essential unless it is specifically stated that the element(s) is/are essential in the above embodiments or the element(s) is/are obviously essential in principle. When numerical values such as the number, amount, and range of elements are mentioned, the present disclosure is not limited to the specific numerical values unless otherwise specified as essential or obviously limited to the specific numerical values in principle. Similarly, when the shape, direction, positional relationship, and the like of an element or the like are mentioned, the present disclosure is not limited to the shape, direction, positional relationship, and the like unless the shape, direction, positional relationship, and the like are described as essential or limited to a specific shape, a specific direction, a specific positional relationship, and the like in principle.

The modifications are not limited to the above-described examples. For example, all or part of one embodiment and all or part of another embodiment can be combined together as long as there is no technical conflict. There is no particular limitation on the number of combinations. Similarly, all or part of one of the modifications and all or part of another one of the modifications may be combined with together as long as there is no technical conflict. Furthermore, all or part of the above-described embodiments and all or part of the above-described modifications may be combined together other as long as there is no technical conflict.

(Summary)

The present disclosure described in the above embodiments and modifications includes the following aspects regarding the HMI control device, the HMI control method, and the HMI control program. Note that each of the following aspects can be applied in combination with each other as long as they do not technically conflict.

The HMI control device (25) is configured to control the HMI device (20) that presents information to a driver of a vehicle (1) in a recognizable manner. The vehicle is capable of automated driving in congestion state and travels following a preceding vehicle at a traveling sped equal to or lower than a predetermined speed in congestion state.

The HMI control method is a method of controlling the HMI device (20) that presents information to a driver of a vehicle (1) in a recognizable manner. The vehicle is capable of automated driving in congestion state and travels following a preceding vehicle at a traveling sped equal to or lower than a predetermined speed in congestion state.

The HMI control program is a program executed by the HMI control device (25). The HMI device controls the HMI device (20) that presents information to a driver of a vehicle (1) in a recognizable manner. The vehicle is capable of automated driving in congestion state and travels following a preceding vehicle at a traveling sped equal to or lower than a predetermined speed in congestion state.

According to a first aspect, the HMI control device includes:
  an attention information presentation unit (259) presenting attention information for calling attention of the driver when a congestion is determined to be cleared, clearing of the congestion being an end condition of the automated driving executed in congestion state;
  a behavior acquisition unit (253) acquiring a behavior of the driver; and
  a second task control unit (258) ending a second task presented on the HMI device at an end timing corresponding to the behavior of the driver acquired by the behavior acquisition unit after presentation of the attention information.

The HMI control method and processing executed by the HMI control device include:
  an attention information presentation step presenting attention information for calling attention of the driver when a congestion is determined to be cleared, clearing of the congestion being an end condition of the automated driving executed in congestion state;
  a behavior acquisition step acquiring a behavior of the driver; and
  a second task control step ending a second task presented on the HMI device at an end timing corresponding to the behavior of the driver acquired by the behavior acquisition unit after presentation of the attention information.

According to a second aspect, the second task control unit or the second task control step ends the second task earlier in a case where an acceleration approval behavior that approves acceleration of the vehicle is acquired by the behavior acquisition unit or the behavior acquisition step after the presentation of the attention information compared with a case where the acceleration approval behavior is not acquired.

According to a third aspect, the HMI control device further includes an acceleration approval notification unit (256). The HMI control method and the processing executed by the HMI control device further include acceleration approval notification step. The acceleration approval notification unit or the acceleration approval notification step notifies an acquisition situation of the acceleration approval behavior to a driving control device (18) that performs a driving control of the vehicle. The acquisition situation of the acceleration approval behavior is included in an execution condition of the driving control. In the driving control, the driving control device decreases an acceleration of the vehicle in a case where the acceleration approval behavior is not acquired compared with a case where the acceleration approval behavior is acquired.

According to a fourth aspect, the second task control unit or the second task control step ends the second task later in a case where the behavior acquired by the behavior acquisition unit or the behavior acquisition step after the presentation of the attention information is a handover behavior compared with a case where the acquired behavior is non-handover behavior different from the handover behavior.

The handover behavior hands over at least a part of the automated driving to the driver.

According to a fifth aspect, during speed recovery in response to clearing of the congestion, the second task control unit or the second task control step permits continuation of the second task until the traveling speed of the vehicle reaches a predetermined reference speed when the behavior acquired by the behavior acquisition unit or the behavior acquisition step after the presentation of the attention information is a handover behavior that hands over at least a part of the automated driving to the driver.

According to a sixth aspect, after the second task control unit or the second task control step ends the second task in association with clearing of the congestion, when a new congestion occurs before the traveling speed of the vehicle increases to the predetermined speed and thereby the automated driving of the vehicle ends, the second task control unit or the second task control step does not permit an execution of the second task.

According to a seventh aspect, after the second task control unit or the second task control step ends the second task in association with clearing of the congestion and the traveling speed of the vehicle increases to a predetermined reference speed set to be lower than the predetermined speed during speed recovery in response to the clearing of the congestion, when a new congestion occurs before the traveling speed of the vehicle increases to the predetermined speed and thereby the automated driving of the vehicle ends, the second task control unit or the second task control step does not permit an execution of the second task.

According to an eighth aspect, after the second task control unit or the second task control step ends the second task in association with clearing of the congestion, when a new congestion occurs before the traveling speed of the vehicle increases to the predetermined speed and thereby the automated driving of the vehicle ends, the second task control unit or the second task control step permits an execution of the second task.

According to a ninth aspect, after the second task control unit or the second task control step ends the second task in association with clearing of the congestion occurred during the automated driving, when a new congestion occurs before the traveling speed of the vehicle increases to the predetermined speed and thereby the automated driving of the vehicle ends, the second task control unit or the second task control step does not permit an execution of the second task. When a new congestion occurs before the traveling speed of the vehicle increases to the predetermined speed and thereby the automated driving of the vehicle ends after clearing of the new congestion, the second task control unit or the second task control step permits the execution of the second task.

According to a tenth aspect, the second task control unit or the second task control step provides a waiting time in a case where the execution of the second task is permitted after the second task is once ended.

According to an eleventh aspect, the second task control unit or the second task control step increases a length of the waiting time with an increase in a quantity of times of the congestion occurred during the automated driving.

According to a twelfth aspect, the second task control unit or the second task control step changes the end timing corresponding to a display device (23, 24) that executes the second task with the HMI device.

According to a thirteenth aspect, an HMI control device (25) that controls an HMI device (20) is provided. The HMI device presents information to a driver of a vehicle (1) in a recognizable manner. The vehicle is capable of performing automated driving in congestion state as a first task and travels following a preceding vehicle at a traveling speed equal to or lower than a predetermined speed in congestion state.

The HMI control device includes:
a behavior acquisition unit (253) acquiring a behavior of the driver; and
an attention information presentation unit (259) presenting attention information for calling attention of the driver when a congestion is determined to be cleared, clearing of the congestion being an end condition of the automated driving executed in congestion state.

The HMI control method is a method of controlling the HMI device (20) that presents information to a driver of a vehicle (1) in a recognizable manner. The vehicle is capable of performing automated driving in congestion state as a first task and travels following a preceding vehicle at a traveling speed equal to or lower than a predetermined speed in congestion state.

The HMI control program is a program executed by the HMI control device (25), which controls the HMI device (20). The HMI device presents information to a driver of a vehicle (1) in a recognizable manner. The vehicle is capable of performing automated driving in congestion state as a first task and travels following a preceding vehicle at a traveling speed equal to or lower than a predetermined speed in congestion state.

The HMI control method and processing executed by the HMI control device include:
behavior acquisition step acquiring a behavior of the driver; and
attention information presentation step presenting attention information for calling attention of the driver in a presentation mode corresponding to the behavior acquired by the behavior acquisition unit when a congestion is determined to be cleared, and clearing of the congestion being an end condition of the automated driving executed in congestion state.

According to a fourteenth aspect, the HMI control device further includes a second task control unit (258) that controls an execution state of a second task in the HMI device during the automated driving executed in congestion state. The second task control unit restricts the execution state of the second task at a higher level in a case where an acceleration approval behavior that approves acceleration of the vehicle is not acquired by the behavior acquisition unit after presentation of the attention information compared with a case where the acceleration approval behavior is acquired by the behavior acquisition unit after presentation of the attention information.

The HMI control method and processing executed by the HMI control device further include second task control step that controls an execution state of a second task in the HMI device during the automated driving executed in congestion state. The second task control step restricts the execution state of the second task at a higher level in a case where an acceleration approval behavior that approves acceleration of the vehicle is not acquired by the behavior acquisition step after presentation of the attention information compared with a case where the acceleration approval behavior is acquired by the behavior acquisition step after presentation of the attention information.

According to a fifteenth aspect, the HMI control device further includes an acceleration approval notification unit (256). The HMI control method and the processing executed by the HMI control device further include acceleration approval notification step. The acceleration approval notification unit or the acceleration approval notification step notifies an acquisition situation of the acceleration approval behavior to a driving control device (18) that performs a driving control of the vehicle. The acquisition situation of the acceleration approval behavior is included in an execution condition of the driving control. In the driving control, the driving control device decreases an acceleration of the vehicle in a case where the acceleration approval behavior is not acquired compared with a case where the acceleration approval behavior is acquired.

According to a sixteenth aspect, the attention information presentation unit or the attention information presentation step changes the presentation mode of the attention information corresponding to the behavior acquired by the behavior acquisition unit or the behavior acquisition step.

According to a seventeenth aspect, the behavior acquisition unit or the behavior acquisition step acquires a visual line direction of the driver. The attention information presentation unit or the attention information presentation step changes information presentation devices (21 to 24) that present the attention information corresponding to the visual line direction acquired by the behavior acquisition unit.

The present disclosure described in the above embodiments and modifications includes the following aspects regarding the HMI control method and the HMI control program. Note that each of the following aspects can be applied in combination with each other as long as they do not technically conflict.

An HMI control method is a method of controlling an HMI device (20) that presents information to a driver of a vehicle (1) in a recognizable manner. The vehicle is capable of automated driving as a first task and traveling following a preceding vehicle at a traveling speed equal to or lower than a predetermined speed. The HMI control program is a program executed by an HMI control device (25), which controls an HMI device (20). The HMI device presents information to a driver of a vehicle (1) in a recognizable manner. The vehicle is capable of automated driving as a first task and traveling following a preceding vehicle at a traveling speed equal to or lower than a predetermined speed.

According to a first aspect, the HMI control method and the processing executed by the HMI control device include:
attention information presentation step presenting attention information for calling attention of the driver when a congestion is determined to be cleared;
behavior acquisition step acquiring a behavior of the driver; and
second task control step ending a second task presented on the HMI device at an end timing corresponding to the behavior of the driver acquired by the behavior acquisition step after presentation of the attention information.

According to a second aspect, the second task control step ends the second task earlier in a case where an acceleration approval behavior that approves acceleration of the vehicle is acquired by the behavior acquisition step after the presentation of the attention information compared with a case where the acceleration approval behavior is not acquired.

According to a third aspect, the HMI control method and the processing executed by the HMI control device further include acceleration approval notification step. The acceleration approval notification step notifies an acquisition situation of the acceleration approval behavior to a driving control device (18) that performs a driving control of the vehicle. The acquisition situation of the acceleration approval behavior is included in an execution condition of the driving control. In the driving control, the driving control device decreases an acceleration of the vehicle in a case where the acceleration approval behavior is not acquired compared with a case where the acceleration approval behavior is acquired.

According to a fourth aspect, the second task control step ends the second task later in a case where the behavior acquired by the behavior acquisition step after the presentation of the attention information is a handover behavior compared with a case where the acquired behavior is non-handover behavior different from the handover behavior. The handover behavior hands over at least a part of the automated driving to the driver.

According to a fifth aspect, during speed recovery in response to clearing of the congestion, the second task control step permits continuation of the second task until the traveling speed of the vehicle reaches a predetermined reference speed when the behavior acquired by the behavior acquisition step after the presentation of the attention information is a handover behavior that hands over at least a part of the automated driving to the driver.

According to a sixth aspect, after the second task control step ends the second task in association with clearing of the congestion, when a new congestion occurs before the traveling speed of the vehicle increases to the predetermined speed and thereby the automated driving of the vehicle ends, the second task control step does not permit an execution of the second task.

According to a seventh aspect,
after the second task control step ends the second task in association with clearing of the congestion and the traveling speed of the vehicle increases to a predetermined reference speed set to be lower than the predetermined speed during speed recovery in response to the clearing of the congestion, when a new congestion occurs before the traveling speed of the vehicle increases to the predetermined speed and thereby the automated driving of the vehicle ends, the second task control step does not permit an execution of the second task.

According to an eighth aspect, after the second task control step ends the second task in association with clearing of the congestion, when a new congestion occurs before the traveling speed of the vehicle increases to the predetermined speed and thereby the automated driving of the vehicle ends, the second task control step permits an execution of the second task.

According to a ninth aspect, after the second task control step ends the second task in association with clearing of the congestion occurred during the automated driving, when a new congestion occurs before the traveling speed of the vehicle increases to the predetermined speed and thereby the automated driving of the vehicle ends, the second task control step does not permit an execution of the second task. When a new congestion occurs before the traveling speed of the vehicle increases to the predetermined speed and thereby the automated driving of the vehicle ends after clearing of the new congestion, the second task control step permits the execution of the second task.

According to a tenth aspect, the second task control step provides a waiting time in a case where the execution of the second task is permitted after the second task is once ended.

According to an eleventh aspect, the second task control step increases a length of the waiting time with an increase in a quantity of times of the congestion occurred during the automated driving.

According to a twelfth aspect, the second task control step changes the end timing corresponding to a display device (23, 24) that executes the second task with the HMI device.

According to a thirteenth aspect, the HMI control method and the processing executed by the HMI control device include:
behavior acquisition step acquiring a behavior of the driver; and
attention information presentation step presenting attention information for calling attention of the driver in a presentation mode corresponding to the behavior acquired by the behavior acquisition step when a congestion is determined to be cleared.

According to a fourteenth aspect, the HMI control method and the processing executed by the HMI control device further include a second task control step controlling an execution state of a second task in the HMI device during the automated driving. The second task control step restricts the execution state of the second task at a higher level in a case where an acceleration approval behavior that approves acceleration of the vehicle is not acquired by the behavior acquisition step after presentation of the attention information compared with a case where the acceleration approval behavior is acquired by the behavior acquisition step after presentation of the attention information.

According to a fifteenth aspect, the HMI control method and the processing executed by the HMI control device further include acceleration approval notification step. The acceleration approval notification step notifies an acquisition situation of the acceleration approval behavior to a driving control device (18) that performs a driving control of the vehicle. The acquisition situation of the acceleration approval behavior is included in an execution condition of the driving control. In the driving control, the driving control device decreases an acceleration of the vehicle in a case where the acceleration approval behavior is not acquired compared with a case where the acceleration approval behavior is acquired.

According to a sixteenth aspect, the attention information presentation step changes the presentation mode of the attention information corresponding to the behavior acquired by the behavior acquisition step.

According to a seventeenth aspect, the behavior acquisition step acquires a visual line direction of the driver. The attention information presentation step changes information presentation devices (21 to 24) that present the attention information corresponding to the visual line direction acquired by the behavior acquisition step.

The present disclosure described in the above embodiments and modifications includes the following aspects regarding the driving control device, the driving control method, and the driving control program. Note that each of the following aspects can be applied in combination with each other as long as they do not technically conflict.

The driving control method is a method of controlling driving of a vehicle (1). The vehicle is capable of automated driving in congestion state and travels following a preceding vehicle at a traveling speed equal to or lower than a predetermined speed in congestion state. The driving control program is a program executed by a driving control device (18), which controls driving of a vehicle (1). The vehicle is capable of automated driving in congestion state and travels following a preceding vehicle at a traveling speed equal to or lower than a predetermined speed in congestion state.

According to a first aspect, the driving control device includes:

a congestion state determination unit (182) determining clearing of a congestion, clearing of the congestion being an end condition of the automated driving executed in congestion state;
a behavior acquisition unit (183) acquiring a behavior of a driver of the vehicle; and
a vehicle control unit (185) that controls an acceleration or a deceleration of the vehicle.

The vehicle control unit decreases the acceleration of the vehicle in a case where an acceleration approval behavior that approves the acceleration of the vehicle is not acquired by the behavior acquisition unit after the congestion is determined to be cleared by the congestion state determination unit compared with a case where the acceleration approval behavior is acquired after the congestion is determined to be cleared.

The driving control method and processing executed by the driving control device include:
congestion state determination step determining clearing of a congestion, clearing of the congestion being an end condition of the automated driving executed in congestion state;
behavior acquisition step acquiring a behavior of a driver of the vehicle; and
vehicle control step that controls an acceleration or a deceleration of the vehicle.

The vehicle control step decreases the acceleration of the vehicle in a case where an acceleration approval behavior that approves the acceleration of the vehicle is not acquired by the behavior acquisition step after the congestion is determined to be cleared by the congestion state determination step compared with a case where the acceleration approval behavior is acquired after the congestion is determined to be cleared.

According to a second aspect, when the congestion is determined to be cleared by the congestion state determination unit or the congestion state determination step, an HMI device (20), which presents information to the driver in a recognizable manner, presents attention information that calls attention of the driver. The behavior acquisition unit or the behavior acquisition step acquires the acceleration approval behavior after presentation of the attention information by the HMI device. The HMI device changes a presentation mode of the attention information corresponding to the behavior acquired by the behavior acquisition unit or the behavior acquisition step.

According to a third aspect, the behavior acquisition unit or the behavior acquisition step acquires a visual line direction of the driver as the behavior of the driver, and information presentation devices (21 to 24) that present the attention information are changed corresponding to the visual line direction of the driver.

According to a fourth aspect, the HMI device restricts an execution state of a second task during the automated driving, which corresponds to a first task, at a higher level in a case where the acceleration approval behavior is not acquired by the behavior acquisition unit or the behavior acquisition step after the presentation of the attention information compared with a case where the acceleration approval behavior is acquired by the behavior acquisition unit or the behavior acquisition step after the presentation of the attention information.

What is claimed is:
1. An HMI control device that controls an HMI device, the HMI device presenting information to a driver of a vehicle in a recognizable manner, the vehicle being capable of performing automated driving as a first task and traveling following a preceding vehicle at a traveling speed equal to or lower than a predetermined speed, the HMI control device comprising:
- an attention information presentation unit presenting attention information for calling attention of the driver when a congestion is determined to be cleared;
- a behavior acquisition unit acquiring a behavior including a posture of the driver and determining whether the posture of the driver corresponds to a standard driving posture; and
- a second task control unit ending, after the presentation of the attention information, a second task presented on the HMI device at a first end timing when the behavior of the driver acquired by the behavior acquisition unit does not correspond to the standard driving posture;
- wherein, when the behavior of the driver acquired by the behavior acquisition unit corresponds to the standard driving posture, the second task control unit ends the second task at a second end timing set to be later than the first end timing.

2. The HMI control device according to claim 1, wherein the second task control unit ends the second task earlier in a case where an acceleration approval behavior that approves acceleration of the vehicle is acquired by the behavior acquisition unit after the presentation of the attention information compared with a case where the acceleration approval behavior is not acquired.

3. The HMI control device according to claim 2, further comprising
- an acceleration approval notification unit notifying an acquisition situation of the acceleration approval behavior to a driving control device that performs a driving control of the vehicle,
- wherein
- the acquisition situation of the acceleration approval behavior is included in an execution condition of the driving control, and
- in the driving control, the driving control device decreases an acceleration of the vehicle in a case where the acceleration approval behavior is not acquired compared with a case where the acceleration approval behavior is acquired.

4. The HMI control device according to claim 1, wherein the second task control unit ends the second task later in a case where the behavior acquired by the behavior acquisition unit after the presentation of the attention information includes a handover behavior compared with a case where the acquired behavior includes non-handover behavior different from the handover behavior, and
- the handover behavior corresponds to handing over at least a part of the automated driving to the driver.

5. The HMI control device according to claim 1, wherein, during speed recovery in response to clearing of the congestion, the second task control unit permits continuation of the second task until the traveling speed of the vehicle reaches a predetermined reference speed when the behavior acquired by the behavior acquisition unit after the presentation of the attention information includes a handover behavior that corresponds to handing over at least a part of the automated driving to the driver.

6. The HMI control device according to claim 1, wherein, after the second task control unit ends the second task in association with clearing of the congestion, when a new congestion occurs before the traveling speed of the vehicle increases to the predetermined speed and thereby the automated driving of the vehicle ends, the second task control unit does not permit an execution of the second task.

7. The HMI control device according to claim 1, wherein, after the second task control unit ends the second task in association with clearing of the congestion and the traveling speed of the vehicle increases to a predetermined reference speed set to be lower than the predetermined speed during speed recovery in response to the clearing of the congestion, when a new congestion occurs before the traveling speed of the vehicle increases to the predetermined speed and thereby the automated driving of the vehicle ends, the second task control unit does not permit an execution of the second task.

8. The HMI control device according to claim 1, wherein, after the second task control unit ends the second task in association with clearing of the congestion, when a new congestion occurs before the traveling speed of the vehicle increases to the predetermined speed and thereby the automated driving of the vehicle ends, the second task control unit permits an execution of the second task.

9. The HMI control device according to claim 8, wherein, after the second task control unit ends the second task in association with clearing of the congestion occurred during the automated driving, when a new congestion occurs before the traveling speed of the vehicle increases to the predetermined speed and thereby the automated driving of the vehicle ends, the second task control unit does not permit an execution of the second task, and
- when a new congestion occurs before the traveling speed of the vehicle increases to the predetermined speed and thereby the automated driving of the vehicle ends after clearing of the new congestion, the second task control unit permits the execution of the second task.

10. The HMI control device according to claim 9, wherein the behavior acquisition unit acquires a visual line direction of the driver, and
- the attention information presentation unit changes an information presentation device that present the attention information corresponding to the visual line direction acquired by the behavior acquisition unit.

11. The HMI control device according to claim 8, wherein the second task control unit provides a waiting time in a case where the execution of the second task is permitted after the second task is once ended.

12. The HMI control device according to claim 11, wherein
- the second task control unit increases a length of the waiting time with an increase in a quantity of times of the congestion occurred during the automated driving.

13. The HMI control device according to claim 1, wherein the second task control unit changes the end timing corresponding to a display device that executes the second task with the HMI device.

14. The HMI control device according to claim 1, wherein the attention information presentation unit changes a presentation mode of the attention information corresponding to the behavior acquired by the behavior acquisition unit.

15. An HMI control device that controls an HMI device, the HMI device presenting information to a driver of a vehicle in a recognizable manner, the vehicle being capable of performing automated driving as a first task and traveling following a preceding vehicle at a traveling speed equal to or lower than a predetermined speed, the HMI control device comprising:
- a behavior acquisition unit acquiring a behavior of the driver;
- an attention information presentation unit presenting attention information for calling attention of the driver in a presentation mode corresponding to the behavior acquired by the behavior acquisition unit when a congestion is determined to be cleared, and presenting an acceleration approval inquiry to inquire of the driver whether to approve acceleration of the vehicle after the congestion is determined to be cleared; and
- a second task control unit controlling an execution state of a second task in the HMI device during the automated driving, the second task including displaying video content on the HMI device;
- wherein, after the presentation of the attention information when the congestion is determined to be cleared, the second task control unit restricts the execution state of the second task at a higher level in a case where an acceleration approval behavior of the driver, which approves acceleration of the vehicle, is not acquired by the behavior acquisition unit as a response to the acceleration approval inquiry, as compared with a case where the acceleration approval behavior is acquired by the behavior acquisition unit as the response to the acceleration approval inquiry, and
- wherein a driving control device that performs driving control of the vehicle increases acceleration of the vehicle in response to the behavior acquisition unit receiving the acceleration approval behavior.

16. The HMI control device according to claim 15, further comprising
- an acceleration approval notification unit notifying an acquisition situation of the acceleration approval behavior to the driving control device that performs the driving control of the vehicle,
- wherein
- the acquisition situation of the acceleration approval behavior is included in an execution condition of the driving control, and
- in the driving control, the driving control device decreases acceleration of the vehicle in a case where the acceleration approval behavior is not acquired compared with a case where the acceleration approval behavior is acquired.

17. The HMI control device according to claim 15, wherein
- the attention information presentation unit changes the presentation mode of the attention information corresponding to the behavior acquired by the behavior acquisition unit.

18. The HMI control device according to claim 15, wherein
- the restricting of the execution state of the second task includes at least one of (i) reducing a screen size of the second task, (ii) superimposing the attention information on a display screen of the second task, or (iii) ending the second task at an earlier time.

19. A driving control device controlling a driving of a vehicle, the vehicle being capable of performing automated driving to travel following a preceding vehicle at a traveling speed equal to or less than a predetermined speed, the driving control device comprising:
- a congestion state determination unit determining clearing of a congestion;
- a behavior acquisition unit acquiring a behavior of a driver of the vehicle; and
- a vehicle control unit that controls an acceleration or a deceleration of the vehicle,
- wherein
- the vehicle control unit decreases the acceleration of the vehicle in a case where an acceleration approval behavior that approves the acceleration of the vehicle is not acquired by the behavior acquisition unit after the congestion is determined to be cleared by the congestion state determination unit compared with a case where the acceleration approval behavior is acquired after the congestion is determined to be cleared,
- the vehicle control unit increases the acceleration of the vehicle in response to the acceleration approval behavior approving the acceleration of the vehicle being acquired by the behavior acquisition unit after the congestion is determined to be cleared by the congestion state determination unit,
- when the congestion is determined to be cleared by the congestion state determination unit, an HMI device, which presents information to the driver in a recognizable manner, presents attention information to call attention of the driver and presents an acceleration approval inquire to inquire of the driver whether to approve acceleration of the vehicle after the congestion is determined to be cleared,
- the behavior acquisition unit acquires the acceleration approval behavior after the HMI device presents the attention information,
- the HMI device changes a presentation mode of the attention information corresponding to the behavior acquired by the behavior acquisition unit, and
- after the presentation of the attention information when the congestion is determined to be clear, the HMI device restricts an execution state of a second task including displaying video content on the HMI device during the automated driving, which corresponds to a first task, at a higher level in a case where the acceleration approval behavior of the driver, which approves the acceleration of the vehicle, is not acquired by the behavior acquisition unit as a response to the acceleration approval inquire, as compared with a case where the acceleration approval behavior is acquired by the behavior acquisition unit as the response to the acceleration approval inquire.

20. The driving control device according to claim 19, wherein
- the behavior acquisition unit acquires a visual line direction of the driver as the behavior of the driver, and
- an information presentation device that presents the attention information is changed corresponding to the visual line direction of the driver.

21. The driving control device according to claim 19, wherein
- the restricting of the execution state of the second task includes at least one of (i) reducing a screen size of the second task, (ii) superimposing the attention information on a display screen of the second task, or (iii) ending the second task at an earlier time.

22. An HMI control program product stored in a computer-readable non-transitory storage medium, the HMI control program product comprising instructions to be executed by at least one processor to control an HMI device, the HMI device presenting information to a driver of a vehicle in a recognizable manner, the vehicle being capable of performing automated driving as a first task and traveling following a preceding vehicle at a traveling speed equal to or lower than a predetermined speed, the instructions comprising:

presenting attention information for calling attention of the driver when a congestion is determined to be cleared;

acquiring a behavior including a posture of the driver and determining whether the posture of the driver corresponds to a standard driving posture; and ending, after presenting the attention information, a second task presented on the HMI device at a first end timing when the acquired behavior of the driver does not correspond to the standard driving posture;

ending the second task at a second end timing set to be later than the first end timing when the acquired behavior of the driver corresponds to the standard driving posture.

* * * * *